(12) United States Patent
Fujisawa et al.

(10) Patent No.: US 7,533,392 B2
(45) Date of Patent: May 12, 2009

(54) DISC APPARATUS

(75) Inventors: Shinichi Fujisawa, Tokyo (JP);
Hidenori Fuma, Saitama (JP)

(73) Assignee: Teac Corporation, Tokyo (JP)

( * ) Notice: Subject to any disclaimer, the term of this patent is extended or adjusted under 35 U.S.C. 154(b) by 496 days.

(21) Appl. No.: 11/019,682

(22) Filed: Dec. 22, 2004

(65) Prior Publication Data

US 2005/0144629 A1 Jun. 30, 2005

(30) Foreign Application Priority Data

Dec. 25, 2003 (JP) ............................. 2003-430134

(51) Int. Cl.
*G11B 17/04* (2006.01)
(52) U.S. Cl. .................................. 720/626
(58) Field of Classification Search ................ 720/619, 720/620, 623, 614, 626; 369/77.1, 75.2
See application file for complete search history.

(56) References Cited

U.S. PATENT DOCUMENTS

| | | | | |
|---|---|---|---|---|
| 6,826,765 B2 * | 11/2004 | Takai et al. | ................. | 720/619 |
| 6,826,766 B2 * | 11/2004 | Tuchiya | ....................... | 720/620 |
| 6,839,898 B2 * | 1/2005 | Saji et al. | ................... | 720/619 |
| 7,134,127 B2 * | 11/2006 | Aoki et al. | ................... | 720/619 |
| 7,159,225 B2 * | 1/2007 | Sakano et al. | ............... | 720/614 |
| 7,194,746 B2 * | 3/2007 | Shirakawa et al. | .......... | 720/608 |
| 2001/0030926 A1 * | 10/2001 | Tanaka et al. | ............. | 369/75.2 |
| 2003/0095491 A1 * | 5/2003 | Adachi et al. | .............. | 369/77.1 |

FOREIGN PATENT DOCUMENTS

| | | |
|---|---|---|
| JP | 62229567 | 10/1987 |
| JP | 1227258 | 9/1989 |
| JP | 3022247 | 1/1991 |
| JP | 3280264 | 12/1991 |
| JP | 2000163624 | 6/2000 |
| JP | 2002-117604 | 4/2002 |
| JP | 2002203353 | 7/2002 |

* cited by examiner

*Primary Examiner*—Tianjie Chen
(74) *Attorney, Agent, or Firm*—Weingarten, Schurgin, Gagnebin & Lebovici LLP

(57) ABSTRACT

In the course of the loading of a disc in a slot-in type of disc apparatus, if a user intends to forcefully pull out the disc, there is a possibility that it is wrongly recognized that the disc has been normally loaded, and then a clamping head of a spindle motor collides against a surface of the disc to damage it. In order to solve this problem, during the loading operation of the disc, a safety mechanism for allowing a clamping operation in response to what the disc has reached a normally clamped position. The safety mechanism may be a mechanical stopper or an electrical detector.

11 Claims, 52 Drawing Sheets

DISC APPARATUS

This application claims priority to a Japanese application No. 2003-430134 filed Dec. 25, 2003.

BACKGROUND OF THE INVENTION

1. Field of the Invention

The present invention relates to a disc apparatus which drives an optical disc (for example, CD-R/RW, DVD-R/RW, DVD-RAM, DVD+R/RW, etc.) as a recording medium which records a large amount of information in information equipment, such as various computer systems.

2. Description of the Related Art

Generally, a conventional disc apparatus built in a personal computer (hereinafter, often referred to as "PC") or the like has a disc tray for loading a disc. The disc tray is configured to advance or retreat. Also, a disc loaded into the disc tray is driven in a main body of the disc apparatus to perform recording or reproducing of information.

On the other hand, as a type that does not utilize a disc tray, a so-called slot-in type of disc apparatus also shows a tendency to be frequently employed. This type of disc apparatus is suitable to make a PC slim and small. Since this type of disc apparatus does not utilize a disc tray in loading or unloading a disc into or from a main body of the apparatus, when an operator inserts the larger half of the disc into the main body, a loading mechanism of the apparatus main body is then adapted to operate to automatically load the disc (for example, Japanese Unexamined Patent Application Publication No. 2002-117604).

Hereinafter, the related arts will now be explained referring to a drawing.

FIG. 60 is a top plan view schematically showing a disc apparatus 101 according to the related arts.

When a user pushes a disc D from a bezel 103 with his/her hand, the circumferential edge of the disc D comes into contact with a holder 118 at the tip of a disc support arm 117. Then, the disc support arm 117 is pushed from a position M1 to a position M2.

After a while, when a leading arm 150 rotates about a follower pin 157, the disc D arrives at a position enough to be received into the disc apparatus 101 by a force exerted by a roller 160 at the tip of the leading arm 150 being brought into contact with the circumferential edge of the disc D. The position at which the disc D arrives is the position M2 that is a drive starting position of the loading mechanism.

When the disc support arm 117 reaches the position M2, a limit switch (not shown) which interlocks with the disc support arm 117 is turned on.

The limit switch is connected to a microcomputer (not shown), and the microcomputer receives a turn-on signal from the limit switch to control driving of a loading motor (not shown). The loading motor (not shown) drives a rack main body 143 toward the inside of the disc apparatus 101, so that the rack main body 143 is driven in a direction of pulling the leading arm 150.

The follower pin 157 is moved toward the inside of the disc apparatus 101 along a guide groove 143e, so that it rotates about the pivot pin 158 from a position Q1 toward a position Q2.

After a while, the roller 160 at the tip of the leading arm 150 comes into contact with the circumferential edge of the disc D at the position Q2.

When the leading arm 150 further rotates, the disc D continues to move toward the inside of the disc apparatus 101, and the center of the disc D arrives at a turntable 110, a spindle motor (not shown) ascends in a direction vertical to a recording surface of the disc D.

As a result, the disc D is clamped by means of a clamping head 107 which is anchored to the turntable 110.

When the clamping operation is completed, a rear end of the rack main body 143 arrives at a position L2, and the rear end of the rack main body 143 pushes a loading completion detecting switch 180.

The loading completion detecting switch 180 is connected to a microcomputer (not shown), and the microcomputer receives a push signal from the loading completion detecting switch 180 to stop driving a loading motor (not shown).

The ejection of a disc is realized by allowing a loading motor (not shown) to rotate in a direction reverse to the rotational direction of the loading motor at the time of the loading operation.

First, the rack main body 143 is driven toward the bezel 103, thereby releasing a clamping state between the disc D and the clamping head 107.

Next, the disc support arm 117 linked to the rack main body 143 pushes out the disc D.

Finally, when the disc support arm 117 reaches at the position M1, the rear end of the rack main body 143 arrives at a position L1 and the rear end of the rack main body 143 releases the pressing of the ejection completion detecting switch 181.

The ejection completion detecting switch 181 is connected to a microcomputer (not shown), and the microcomputer receives a releasing signal from the ejection completion detecting switch 181 to stop driving the loading motor (not shown).

In other words, the loading completion detecting switch 180 is a sensor for detecting the completion of a loading operation, and the ejection completion detecting switch 181 is a sensor for detecting the completion of an ejecting operation.

A lever arm 144 is provided with a locking mechanism for safety. When the locking mechanism is pulled and unlocked by a force beyond a prescribed level, the length of the lever arm 144 increases.

When the disc is pulled out during the loading operation, a great pulling force is applied to the leading arm 150 via the circumferential edge of the disc D. Accordingly, the locking mechanism for safety which is provided in the lever arm 144 is unlocked, and the length of the lever arm 144 increases. Then, the leading arm 150 does not obstruct the operation of pulling out the disc D.

In the disc apparatus as described above, there is a possibility that. a problem occurs when a user pulls out a disc during its loading operation. The problem will now be described in detail.

The loading mechanism of the above-mentioned disc apparatus 101 has no means which detects that a user pulls out a disc during its loading operation.

Therefore, when a disc is pulled out during loading operation thereof, the lever arm 144 is unlocked, but the loading operation may continue.

Then, since a spindle motor may ascend before the disc reaches its clamping position, there is a possibility that the disc D may be sandwiched between the clamping head 107 and a top cover (not shown), of the disc apparatus 101.

In other words, when a disc is pulled out during loading operation thereof, there is a possibility that a recording surface of the disc may be damaged by the clamping head 107.

SUMMARY OF THE INVENTION

The present invention has been made in consideration of such conventional problems, and it is an object of the present invention to provide a disc apparatus having a loading function which can safely handle a disc even in an operation of pulling out the disc.

Therefore, it is an object of the present invention to solve the above problems using each means which will be described later. Specifically, in a first aspect of the present invention, a disc apparatus comprises: a loading mechanism for performing a pulling operation for pulling a disc to a clamping position where a clamping operation for placing the disc on a turntable is performed after the pulling operation; and an actuating means driven by an outer circumferential portion of the disc pulled to the clamping position; and a prohibiting means for prohibiting the clamping operation when the disc is not located at the clamping position, and for permitting the clamping operation in response to the activating means being driven when the disc is located at the clamping position.

In a second aspect of the present invention, the actuating means is provided at a position inside the center of the disc when the disc is located at the clamping position toward the direction of the pulling operation by the loading mechanism.

In a third aspect of the present invention, the prohibiting means is a stopper, and the actuating means is a disc abutment member provided in the stopper, and the stopper releases the loading mechanism from prohibiting the clamping operation in response to the disc abutment member being driven while abutting on the outer circumferential portion of the disc.

In a fourth aspect of the present invention, at the time of the clamping operation after the pulling operation, the disc abutment member has a disc positioning function to position the disc.

In a fifth aspect of the present invention, the actuating means is a disc outer circumferential portion detector; the prohibiting means has the disc outer circumferential portion detector, and a pulling completion detecting means provided in the loading mechanism for detecting a completion of the pulling operation by the loading mechanism, and the clamping operation of the loading mechanism is permitted when the pulling completion detecting means detects a completion of the pulling operation by the loading mechanism, and the disc outer circumferential portion detector detects the outer circumferential portion of the disc pulled to the clamping position.

In a sixth aspect of the present invention, the disc outer circumferential portion detector is a reflective photo-interrupter, and an antireflection film for preventing erroneous detection when the disc is not located at the clamping position is provided at a position of a rear face of a case for the disc apparatus that faces the reflective photo-interrupter.

In a seventh aspect of the present invention, the disc apparatus further comprises a control means for controlling the loading mechanism to eject the disc when the disc being not carried to the clamping position after a lapse of predetermined time from the beginning of the pulling operation by the loading mechanism.

In an eighth aspect of the present invention, the disc apparatus further comprises a clamping completion detecting means provided in the loading mechanism for detecting a completion of the clamping operation by the loading mechanism, and the control means controls the loading mechanism to eject the disc when the completion of the clamping operation is not detected by the clamping completion detecting means after a lapse of predetermined time from the beginning of the pulling operation by the loading mechanism.

In a ninth aspect of the present invention, the disc apparatus further comprises a control means for controlling the loading mechanism to eject the disc when the disc outer circumferential portion detector is not able to detect the outer circumferential portion of the disc pulled to the clamping position when the pulling completion detecting means detects that the completion of the pulling operation by the loading mechanism.

According to the disc apparatus in the first to ninth aspects of the present invention, even when a user pulls out a disc in the course of the loading operation of the disc, an improper clamping operation is prohibited. Thus, a recording surface of the disc can be prevented from being damaged.

Further, an error detecting mechanism using a timer is provided for the loading operation, and if the loading operation is not completed within predetermined time, the clamping operation is prohibited and the disc is ejected. Thus, as compared to the conventional disc apparatuses, it is possible to reduce a possibility that the disc apparatus and the disc are damaged.

DESCRIPTION OF THE PREFERRED EMBODIMENTS

The present invention can be summarized as follows: a means for directly detecting from a disc itself that the disc has reached its clamping position in a disc apparatus by a pulling operation of a loading mechanism is provided inside the disc apparatus, so that a clamping operation is allowed in response to signals from the detecting means.

The detecting means may be a mechanical stopper for a loading mechanism, or an electrical sensor connected to a microcomputer serving as a control means.

Hereinafter, preferred embodiments of the present invention will now be described in detail with reference to the accompanying drawings.

First Embodiment

Figure 1:
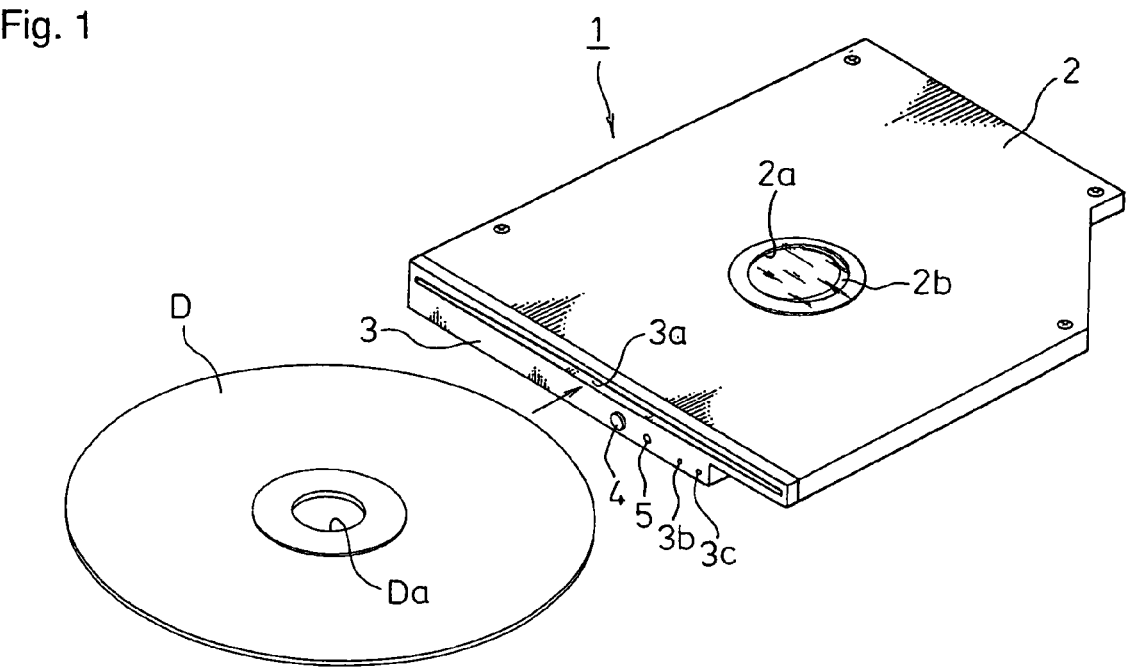
FIG. 1 is a perspective view showing the appearance of a disc apparatus related to a first embodiment of the present invention.

FIG. 1 shows the appearance of a slot-in type of disc apparatus 1 related to a first embodiment of the present invention. An opening 2a is formed at the center of a top plate of a chassis case 2 constructed as its shielded state, and a protrusion 2b is formed at a circumferential portion of the opening 2a so as to protrude inwardly. A bezel 3 is fixed to a front edge of the chassis case 2, and the bezel 3 is formed with a slot 3a into which a disc D is inserted and through-holes 3b and 3c for emergency release. The bezel 3 is provided with an ejection switch 4 for instructing the received disc D to be unloaded to the outside of the apparatus, and an indicator for displaying an operating state of the disc apparatus 1.

Figure 2:
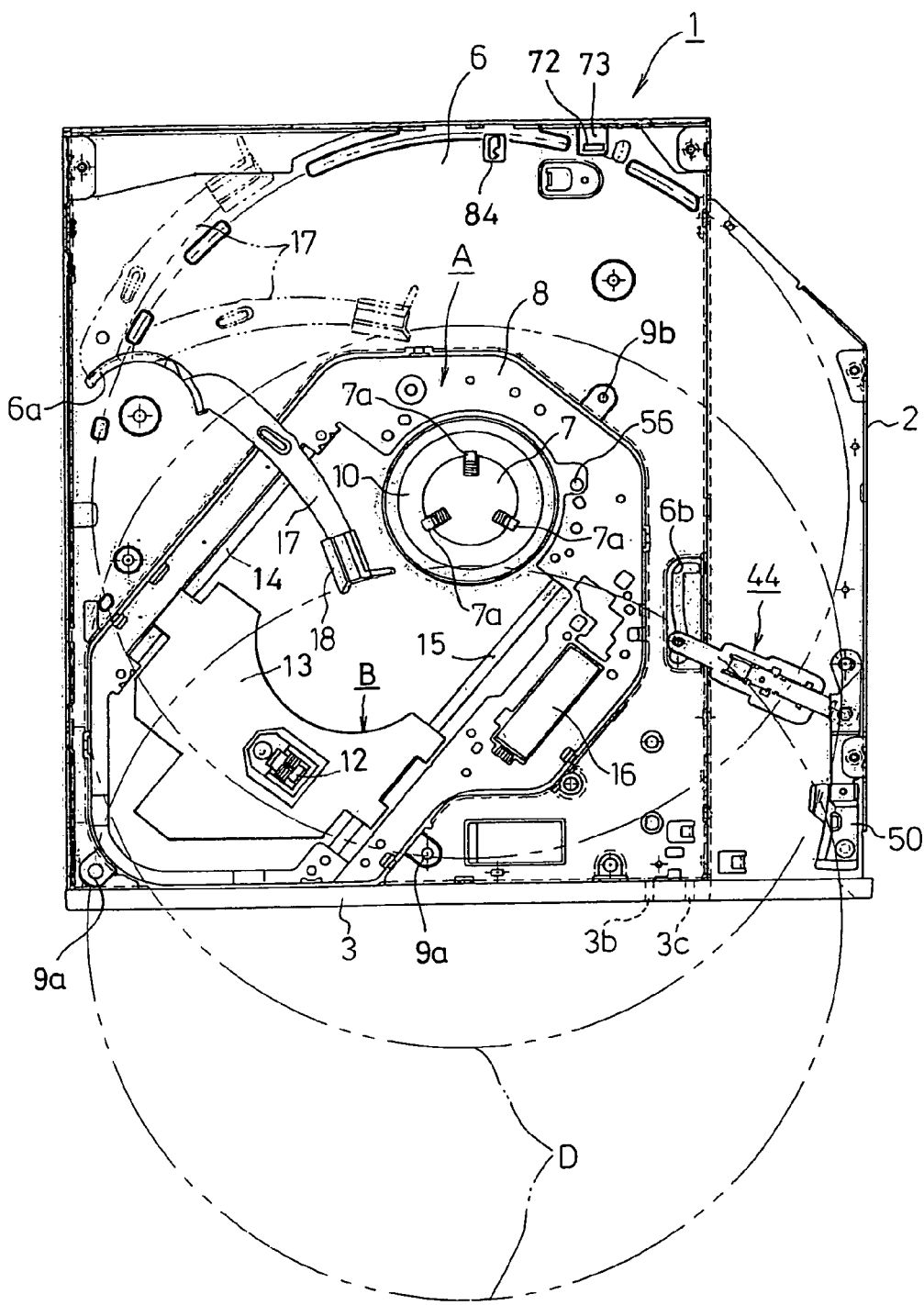
FIG. 2 is a plan view showing an internal structure of the disc apparatus in FIG. 1.
Figure 3:
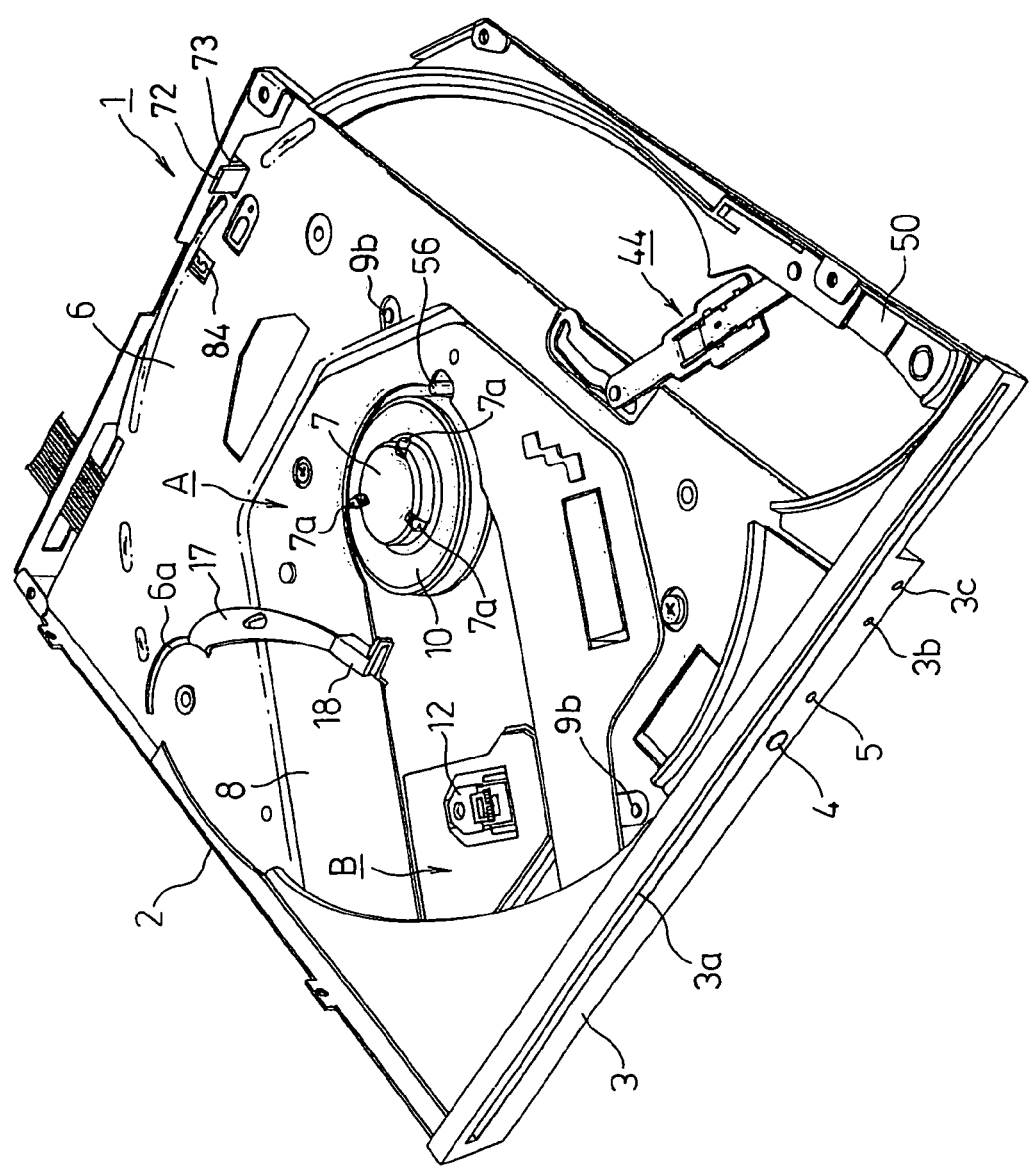
FIG. 3 is a perspective view showing the internal structure of the disc apparatus in FIG. 1.

FIG. 2 is a plan view showing the disc apparatus 1 in a state in which the top plate of the chassis case 2 of the disc apparatus 1 is removed, and FIG. 3 is a perspective view of FIG. 2. In these figures, a base panel 6 is disposed within the chassis case 2, and a drive system unit A for the disc D is provided in a state of being arranged to be inclined downward from the center of the base panel 6. In the drive system unit A, in order to clamp a central hole Da of the disc D or to release a clamped state of the disc D, a frame member 8 adapted to be movable up and down is connected to the base panel 6 at a plurality of points (three points in this embodiment) by means of shock-absorbing support structures 9a and 9b (see a removed figure in FIG. 4)

The disc apparatus 1 includes an operation that carries the disc D inserted into the slot 3a to its clamping position, and an operation that clamps the disc D after it has been carried. Hereinafter, the operation that carries the disc D to its clamping position is referred to as a "pulling operation", and the operation that clamps the disc D is referred to as a "clamping operation". The loading operation of the disc apparatus 1 consists of the pulling operation and the clamping operation.

Two shock-absorbing support structures 9a provided in the vicinity of the bezel 3 are provided on spacers 84. This structure allows the shock-absorbing support structures 9a to serves as rotating shafts of the frame member 8 without vertical movement of portions of the frame member 8 supported by the shock-absorbing support structures 9a.

One shock-absorbing support structure 9b provided at a point remotest from the bezel 3 supports the frame member 8 so as to be movable up and down.

With the movement of a rack main body 43 and a slide member 51, which will be described later, the frame member 8 moves up and down about the two shock-absorbing support structures 9a as a rotating fulcrum obliquely with respect to a recording surface of the disc D at the time of a clamping operation and a clamping releasing operation, which will be described later.

An edge of the base panel 6 is provided with an opening 73. A stopper 72 is provided on the base panel 6 through the opening 73. The stopper 72 is provided for limiting the movement of the rack main body 43 which will be described later. When the stopper 72 is slightly pushed by the circumferential edge of the disc D at a point of time when disc D reaches its clamping position, a state in which the movement of the rack main body 43 is limited is released. The operation of the stopper 72 will now be described below in detail.

A clamping head 7 is disposed at a front edge of the frame member 8 at a position corresponding to the center of the disc D loaded and stopped. The clamping head 7 is integrally formed with a turntable 10 and fixed to a driving shaft of a spindle motor 11 disposed right under the clamping head 7. The spindle motor 11 drives the disc D clamped by the clamping head 7 to rotate, thereby performing recording or reproducing of information.

Next, a symbol B indicates a head unit which is supported by the frame member 8. A carrier block 13 for reciprocating an optical pickup 12 in the radial direction of the disc D, is supported by guide shafts 14 and 15 whose both ends are fixed to the frame member 8, and is reciprocated by a thread motor 16 and a gear unit (not shown).

Meanwhile, the disc apparatus 1 according to the present invention is an apparatus that carries out recording or reproducing of a DVD-R disc and recording or reproducing of a CD-R/RW disc. Since the optical pickup 12 is being made large, the carrier block 13 has a larger thickness than the spindle motor 11. Therefore, when the frame member 8 releases the clamping between disc D and the spindle motor 11, it is necessary that the carrier block 13 is located at a position remotest from the spindle motor 11 so as not to obstruct the descent of the spindle motor 11.

FIG. 6 schematically shows a clamping operation by means of the drive system unit A of the disc apparatus 1 according to the present invention.

Figure 6A:
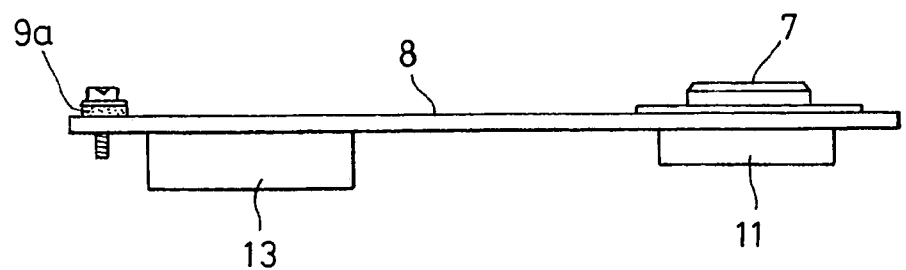
FIG. 6 is a figure for explaining a clamping operation.

FIG. 6A shows a state in which the disc D is normally clamped by the clamping head 7. A bottom portion of the carrier block 13 is located at a lower position than a bottom portion of the spindle motor 11.

Figure 6B:
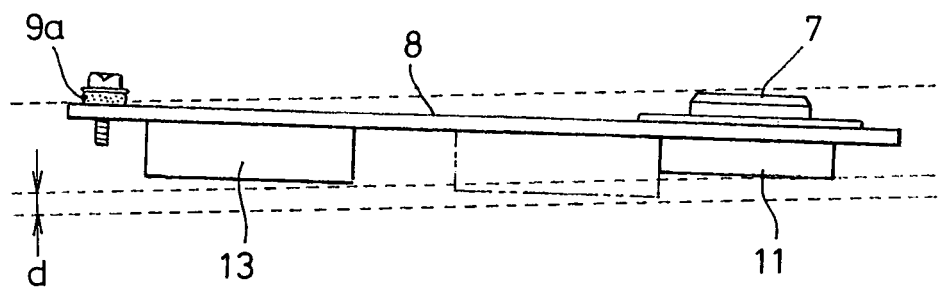

FIG. 6B shows a state in which the disc D is removed from the clamping head 7. In this state, the frame member 8 rotates about the shock-absorbing support structures 9a in the clockwise direction. If the carrier block 13 is located at a position near to the spindle motor 11, as compared to a state in which the carrier block 13 is located at a position remotest from the spindle motor 11, a bottom face of the carrier block 13 may come into contact with a bottom face of the disc apparatus 1 before a bottom face of the spindle motor 11 comes into contact therewith, which keeps the spindle motor 11 from descending by a distance D. Thus, the spindle motor 11 may not descend by a distance enough to release the disc D from the clamping head 7. As a result, the clamping releasing operation may not be realized by the existence of the carrier block 13.

As described above, at the time of the clamping operation and the clamping releasing operation of the disc apparatus 1, it is necessary to move the carrier block 13 to a position remotest from the spindle motor 11, i.e., to a position nearest to the shock-absorbing support structures 9a.

Figure 7:
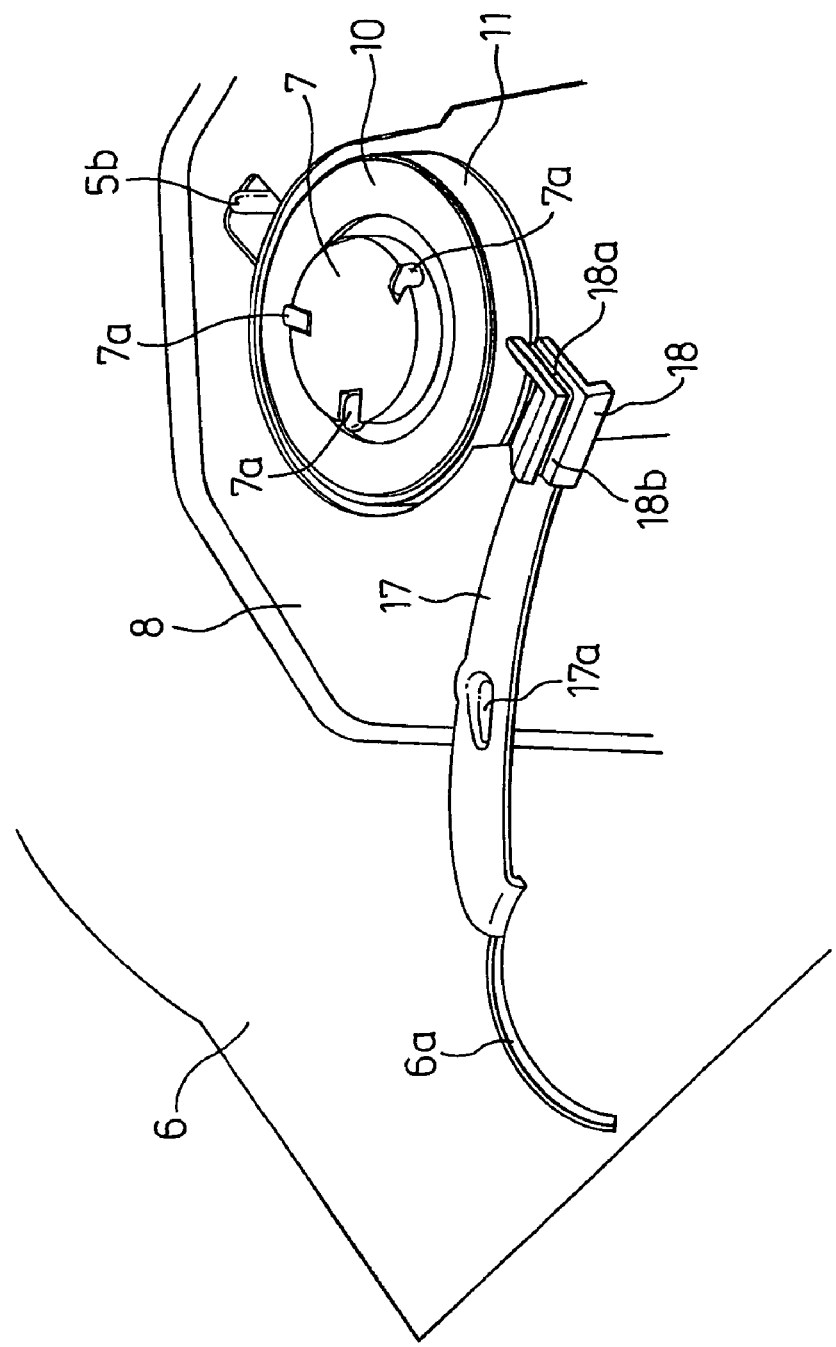
FIG. 7 is a perspective view for explaining a construction of a disc support arm.

The reference numeral 17 indicates a disc support arm which performs an operation to guide the disc D into the inside of apparatus and to push out the disc D to the outside of the apparatus. A holder 18 for supporting an end of the disc D is fixed to a tip of the disc support arm 17. As shown in FIG. 7, a tip of the holder 18 is formed with an end-receiving portion 18a, and a side thereof is formed with a retaining groove 18b.

Figure 4:
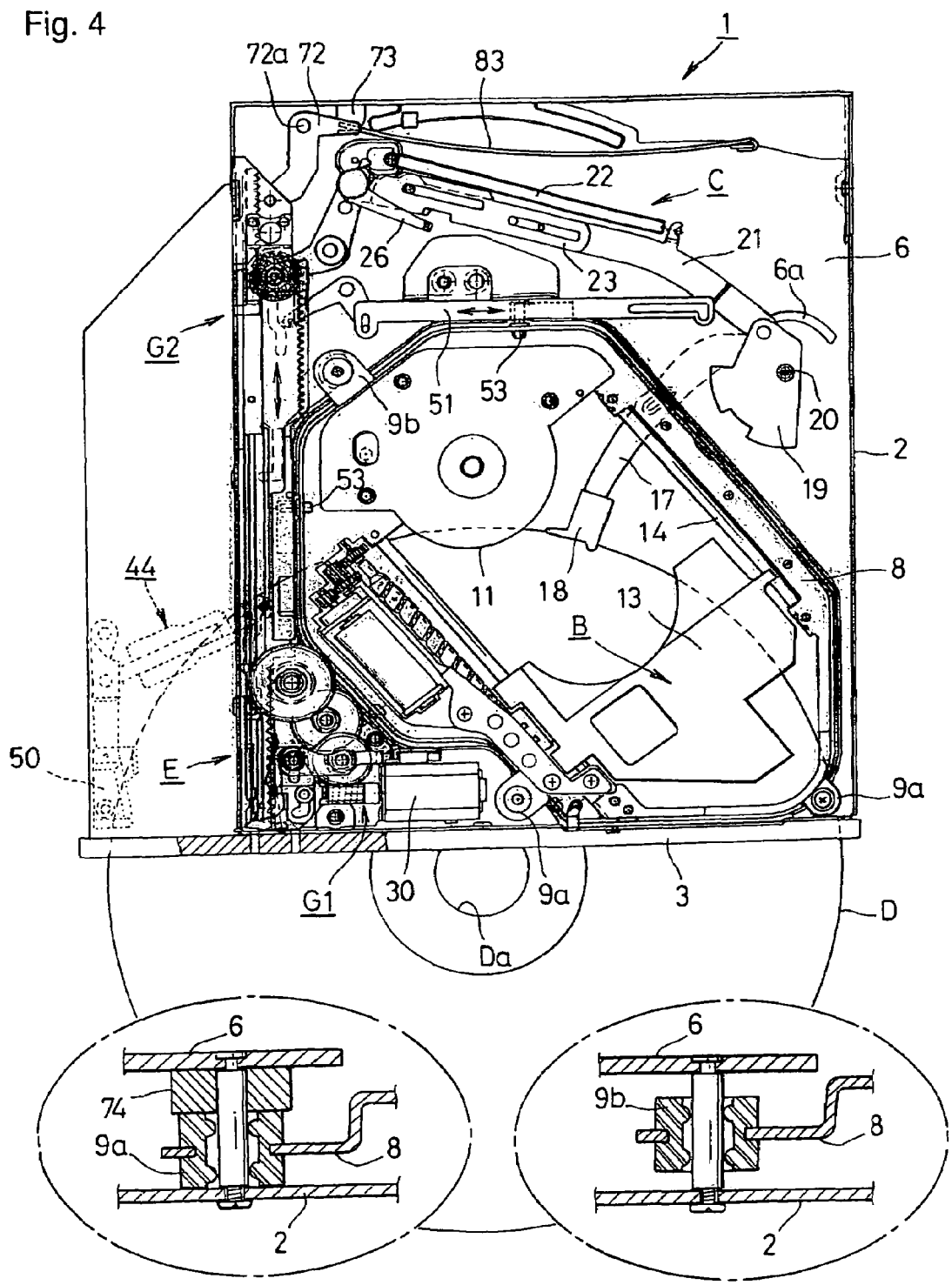
FIG. 4 is a figure showing the internal structure of the disc apparatus in FIG. 1 at the bottom thereof.

Next, a driving mechanism C for rocking the disc support arm 17 will now be described. As shown in FIG. 4, an end serving as a rocking fulcrum of the disc support arm 17 is integrated with a support plate 19 on a rear face of the base panel 6. Since the support plate 19 is adapted to be capable of turning by means of a pivot pin 20, as the support plate 19 turns, the disc support arm 17 on the base panel 6 rocks within a range of the length of the slit 6a.

Figure 8:
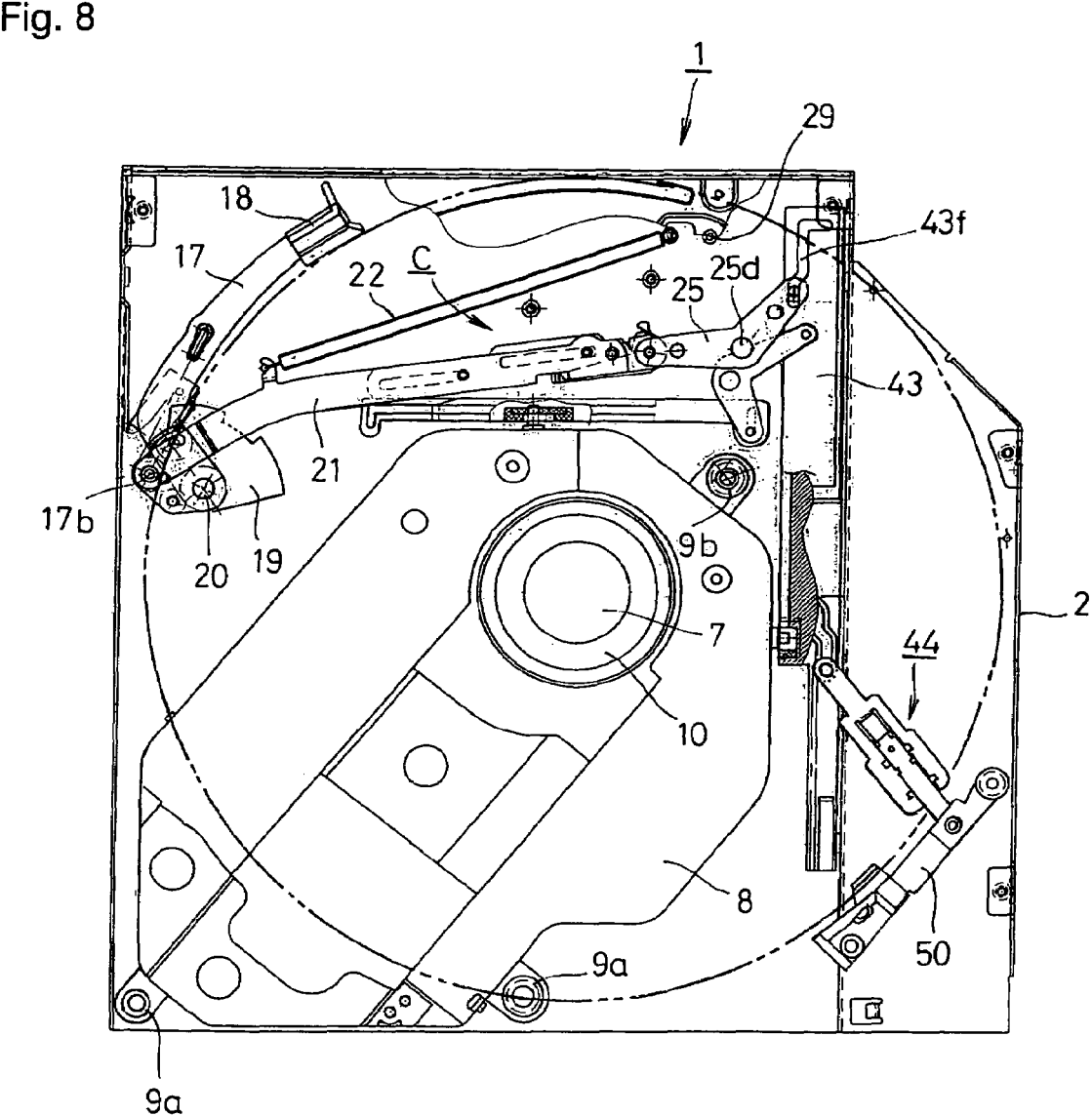
FIG. 8 is a figure for explaining a loaded state of a disc.
Figure 9:
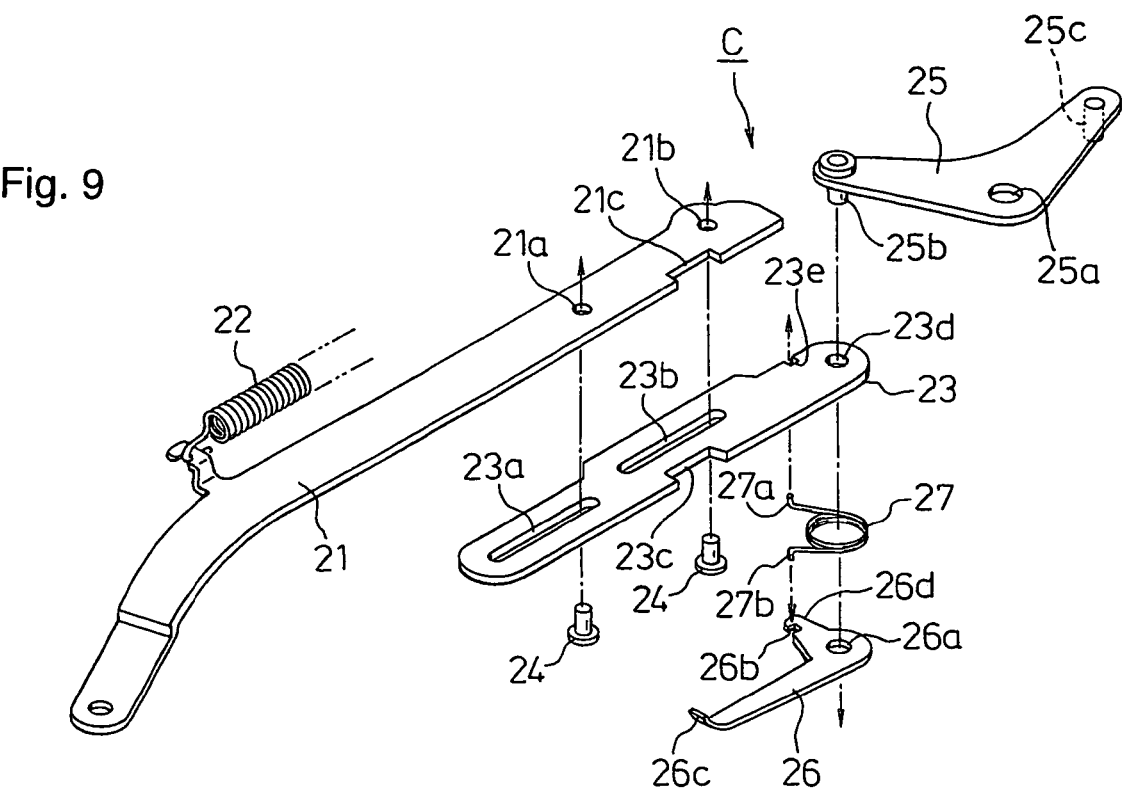
FIG. 9 is an exploded perspective view for explaining a construction of a driving mechanism C.

FIG. 8 is a plan view showing a construction of the driving mechanism C of the disc support arm 17 with the base panel 6 removed. A first link arm 21 that directly drives the disc support arm 17 is connected to the support plate 19 by means of the pivot pint 17b, and is always biased by a tension coil spring 22. On the other hand, as shown in FIG. 9, a second link arm 23 is formed with slits 23a and 23b. +ead pins 24 are respectively inserted through these slits 23a and 23b. Tips of the head pins 24 are respectively fixed into through-holes 21a and 21b of the first link arm 21. The first link arm 21 and the second link arm 23 are integrated with each other so as to be extendable or retractable within a range of the lengths of the slits 23a and 23b. Meanwhile, the first link arm 21 and the second link arm 23 are respectively formed with cutouts 21c and 23c to be acted by a locking mechanism, which will be described later.

The reference numeral 25 indicates a lever arm that transmits a driving force to the second link arm 23. The lever arm 25 is adapted to be capable of rocking while a through-hole 25a serving as a fulcrum is supported by a pivot pin 25d. A pivot pin 25b is fixed to an actuating end of the lever arm 25. The pivot pin 25b is inserted through the through-hole 23d of the second lever arm 23 and a through-hole 26a of a locking lever 26. Also, a torsion coil spring 27 is disposed between the second link arm 23 and the locking lever 26. One end 27a of the torsion coil spring 27 is locked in a recessed portion 23e of the second link arm 23, and the other end 27b thereof is locked in a recessed portion 26b. Thereby, a locking end 26c of the locking lever 26 is biased in a direction in which the cutout 21c of the first link arm 21 and the cutout 23c of the second link arm 23 are engaged with each other. Meanwhile, on the rear face of the base panel 6 are disposed an angular position detecting switch 28 which is turned on or off when the support plate 19 rotating in cooperation with the disc support arm 17 abuts on the switch, and a starting pin 29 for pressing a rear end 26d of the locking lever 26 when the second link arm has reached a predetermined position.

Figure 10A:
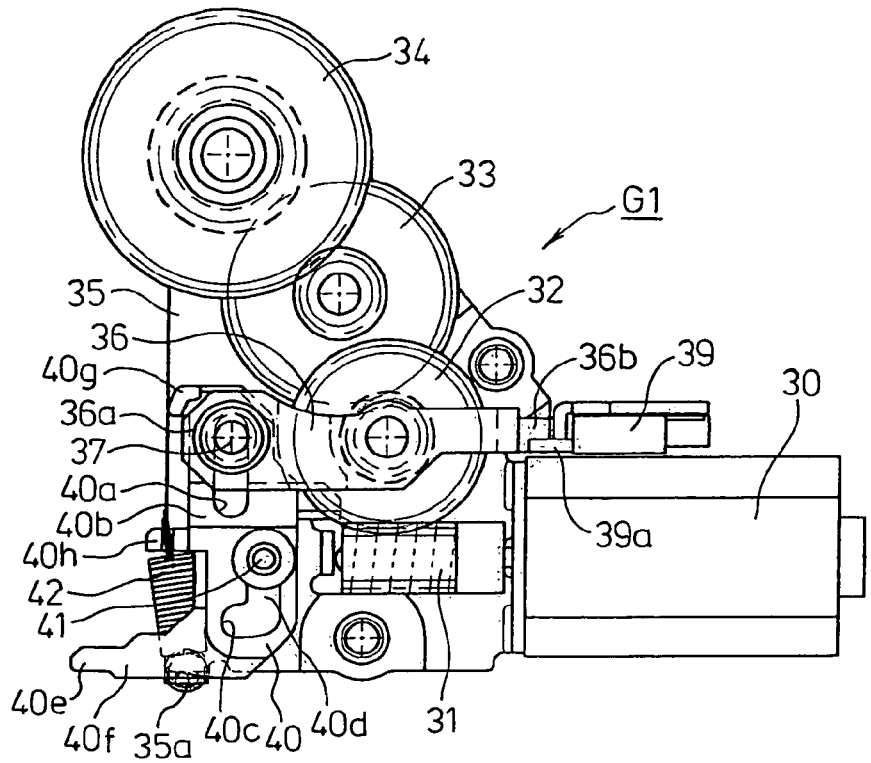
FIG. 10 is a figure for explaining a loading gear unit.
Figure 10B:
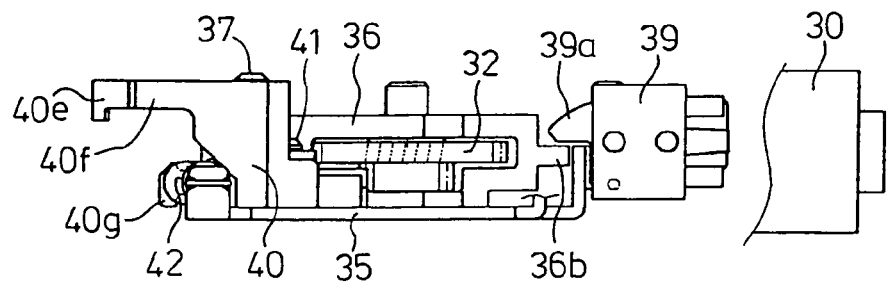
Figure 10C:
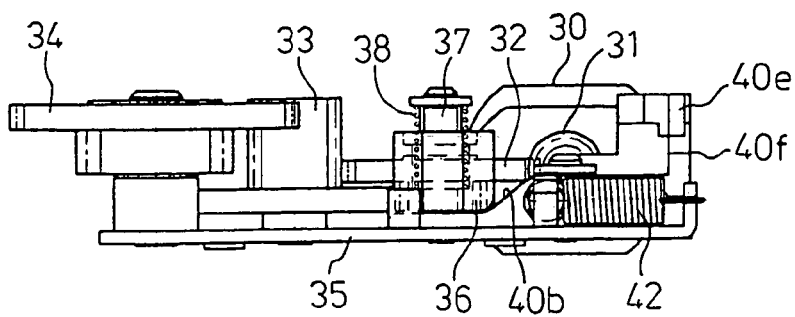
Figure 11A:
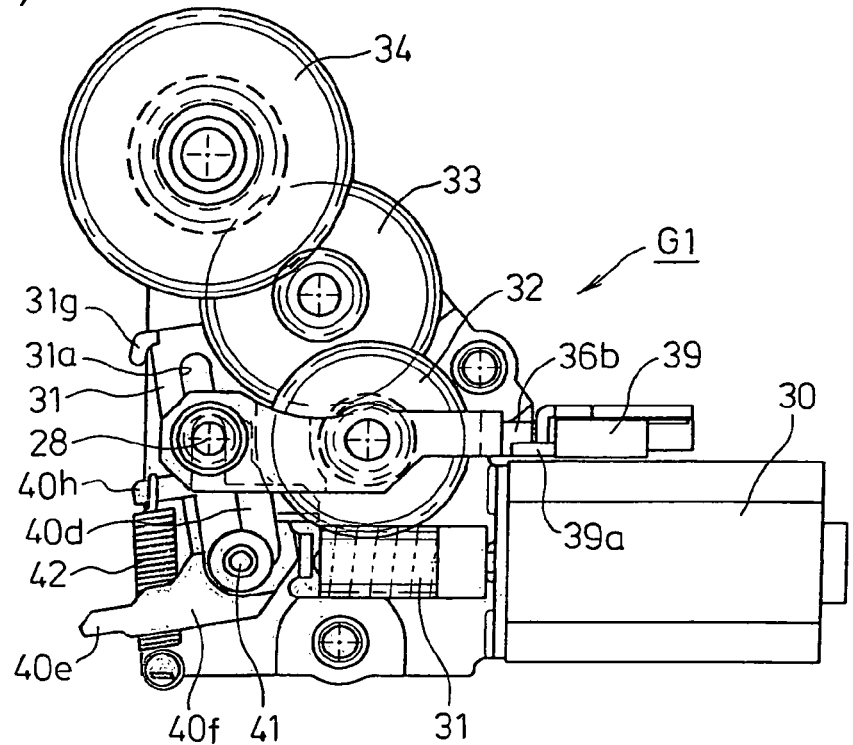
FIG. 11 is a figure for explaining an operation state of the loading gear unit.
Figure 11B:
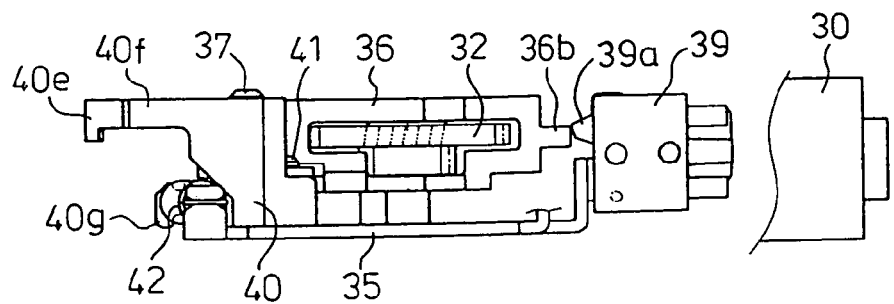
Figure 11C:
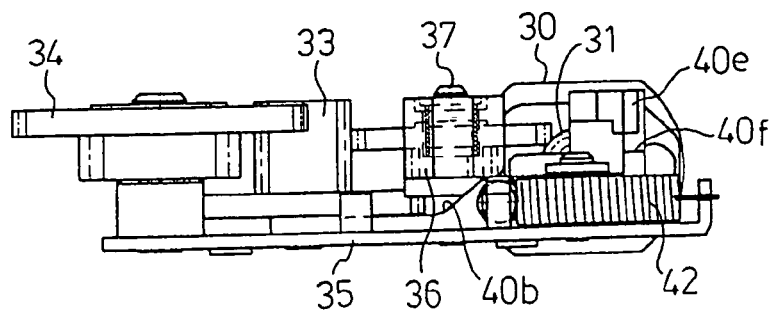

Next, constructions of a slider mechanism and a carrying mechanism E which serve as power transmission elements of the disc support arm 17 to the driving mechanism C will now be described. First, the carrying mechanism E generally comprises a combination of a loading gear unit G1 and a rack gear unit G2. FIGS. 10 and 11 are drawings for explaining a construction and operation aspect of the loading gear unit G1. In these figures, the reference numeral 30 indicates a loading motor serving as a power source. A worm gear 31 is fixed to an output shaft of the loading motor 30 so as to rotate coaxially with the output shaft. A rotational force of the worm gear 31 is sequentially transmitted to doubles gears 32, 33 and 34, which are journalled to a gear base 35, while the speed is reduced from a small-diameter gear toward a large-diameter gear.

In the above-described construction of the gears, the double gear 32 has a releasing mechanism that releases a state meshed with the worm gear 31. By inserting a pivot pin 37 through an end 36a of a holder 36 which is vertically slidable while holding the double gear 32, and by pivotally supporting the double gear 32 while biasing it downward using a compression coil spring 38, in a normal state, as shown in FIG. 10C, the worm gear 31 and the double gear 32 become a normally meshed state. Meanwhile, an end of the holder 36 on the side of the loading motor 30 is formed with a dog head 36b which enables a knob 39a of a limit switch 39 fixed to the gear base 35 to operate.

The underside of the end 36a the holder 36 is provided with a slider member 40 which is pivotally supported coaxially with the pivot pin 37. A portion of the slider member 40 journalled to the pivot pin 37 is formed with an elongated groove 40a so that the slider member is slidable in a direction perpendicular to the end 36a of the holder 36. Further, an inclined surface 40b is formed between front and rear ends of the slider member 40. When the slider member 40 is advanced, the inclined surface 40b pushes up the end 36a of the holder 36 from the bottom face thereof, so that the entire holder 36 ascends.

A rear end of the slider member 40 is formed with an elongated hole 40d, having a locking end 40c, which is journalled to a pivot pin 41 and the rear end thereof is also formed with an actuating pin 40f having a sealing projection 40e. On the other hand, a front end of the slider member 40 is formed with a reset piece 40g which is started according the movement of the rack gear unit G2.

In the slider member 40 constructed as above, a tension coil spring 42 for giving a toggle action is provided in a tensioned condition with an angle of inclination between a hooking piece 40h of the slider member and a hooking piece 35a of the gear base 35, so that the slider member 40 is biased so as to rotate in the counterclockwise direction while it always retreats.

By constructing the slider member 40 as described above, in a normal state shown in FIG. 10, the pivot pin 37 is used as a fulcrum of the slider member 40. In this state, when the slider member 40 is pressed from the rear end thereof to be allowed to advance, and a locking stepped portion 40c of the elongated hole 40d reaches the pivot pin 41, the tensile force of the tension coil spring 42 causes the slider member 40 to rotate about the pivot pin 37 as a fulcrum, which results in a locking state in which the locking stepped potion 40c and the pivot pin 41 are engaged with each other, as shown in FIG. 11. This posture is maintained.

Figure 12:
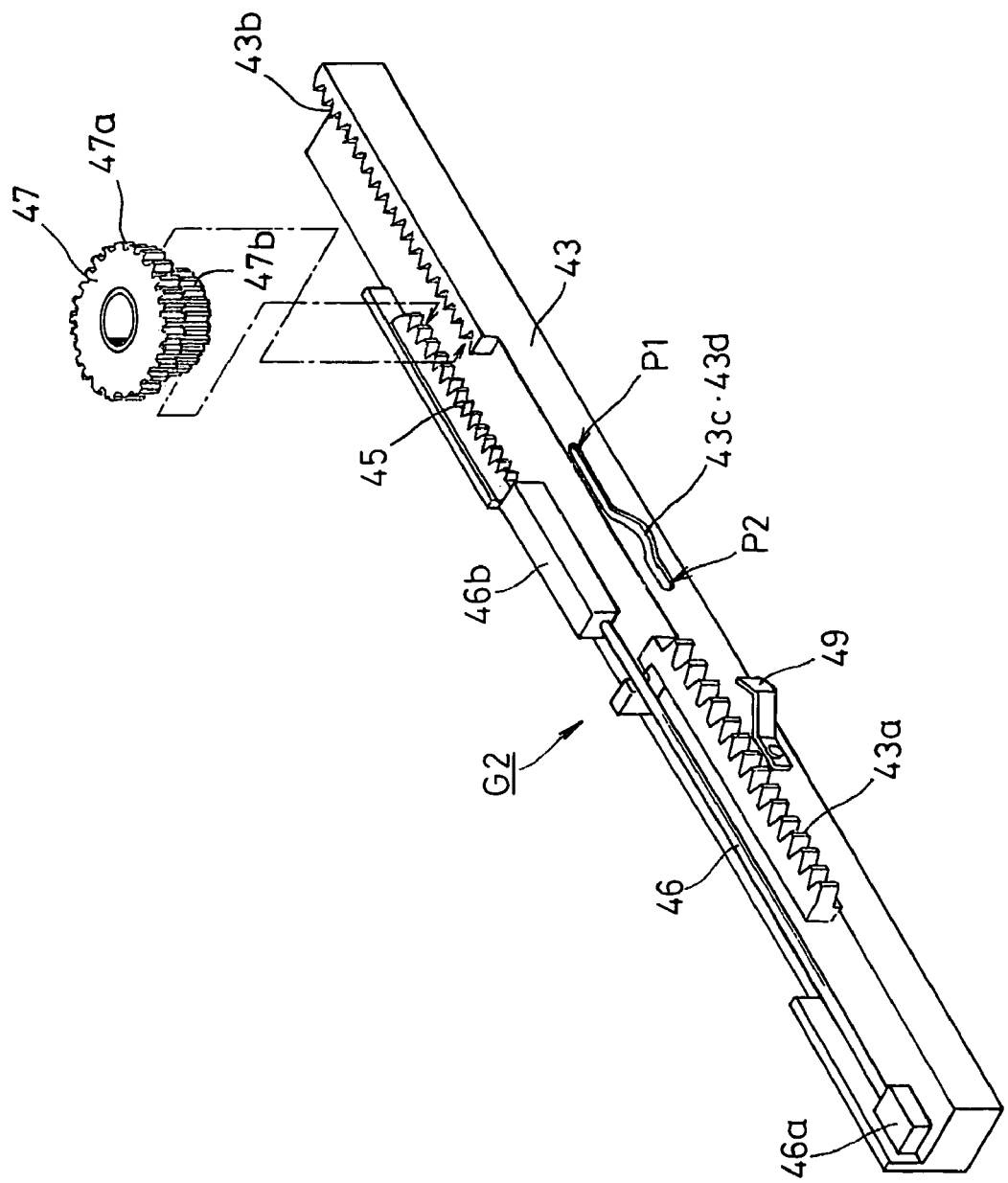
FIG. 12 is a perspective view showing a construction of rack gear unit.

Next, as shown in FIG. 12, in the rack gear unit G2, the rack main body 43 is integrally formed with gear trains 43a and 43b, and the gear train 43a meshes with a small-diameter gear of the double gear 34 of the loading gear unit G1. Accordingly, the loading motor 30 is driven, so that the rack main body 43 advances or retreats in the chassis case 2. By advancing or retreating the rack main body 43 in this way, the driving mechanism C connected to a tip of the rack main body 43 is driven to rock the disc support arm 17, and as shown in FIG. 2, the lever arm 44 connected to the rack main body 43 on the surface of the base panel 6 rocks a leading arm 50.

A gear member 45 that advances or retreats at the tip of the rack main body 43 is disposed in a floating state on the rack main body 43 constructed as above. In order to press and advance the gear member 45, a pressing pin 46 having blocks 46a and 47b in front of and behind itself is disposed. Also, the gear train 43b and the gear member 45 is meshed with and connected to a double gear 47 which is attached to a gear frame 48 so as to freely rotate. In this case, a large-diameter gear 47a of the double gear 47 meshes with a rear end of the gear train 43b, and a small-diameter gear 47b thereof meshes with a tip of the gear member 45 integrally formed with the block 46b.

Accordingly, when an external force via the pressing pin 46 pushes in the gear member 45, the double gear 47 rotates in place. Therefore, a rotating force of the large-diameter gear 47a is transmitted to the gear train 43b to move the rack main body 43. Meanwhile, the reference numeral 49 indicates an actuating piece that presses the reset piece 40g which is formed at a front end of the slider member 40 of the above-mentioned loading gear unit G1. In the state of the loading gear unit G1 as shown in FIG. 11, when the actuating piece 49 presses the reset piece 40g of the slider member 40, the engagement between the pivot pin 41 and the locking stepped portion 40c is released, which causes returning to a state shown in FIG. 10.

In a case where a disc ejecting operation cannot be electrically performed after the shutdown of the apparatus, etc., the procedure of "emergency ejection" that manually eject the disc D received will now be described below.

The slider member 40 (see FIG. 10) of the loading gear unit G1 is disposed behind the through-hole 3b of the bezel 3, and the block 46a (see FIG. 12) of the pressing pin 46 is disposed behind the through-hole 3c of the bezel 3.

In the normal state shown in FIG. 10, the sealing projection 40e of the slider member 40 is located behind the through-hole 3c of the bezel 3 to seal the through-hole 3c. Thus, even when the ejection pin is inserted through the through-hole 3c from this state, the emergency ejection cannot be performed.

When an emergency ejection is performed, first, an ejection pin is inserted through the through-hole 3c of the bezel 3, thereby pressing the slider member 40. Thereby, the slider member 40 is tilted as shown in FIG. 11 to release a sealed state of the through-hole 3 by the sealing projection 40e.

Then, since the inclined surface 40b of the slider member 40 pushes up the end 36a of the holder 36 from the bottom face thereof, the meshing between the worm gear 31 and the double gear 32 is released, which brings the double gears 32, 33 and 34 into a freely rotatable state.

Meanwhile, when the spindle motor 11 rotationally drives a disc, the dog head 36b of the holder 36 drives the knob 39a to turn on the limit switch 39 which causes the spindle motor 11 to be stopped.

Subsequently, the ejection pin pulled out of the through-hole 3b is inserted into the through-hole 3c, thereby causing the pressing pin 46 and the gear member 45 to advance.

The advancement of the gear member 45 rotates the double gear 47 which in turn retreats the rack main body 43. The retreat of the rack main body 34 causes the frame member 8 to descend, thereby releasing the disc D from being clamped. Thereafter, the disc support arm 17 is rocked to eject the disc D.

Figure 5:
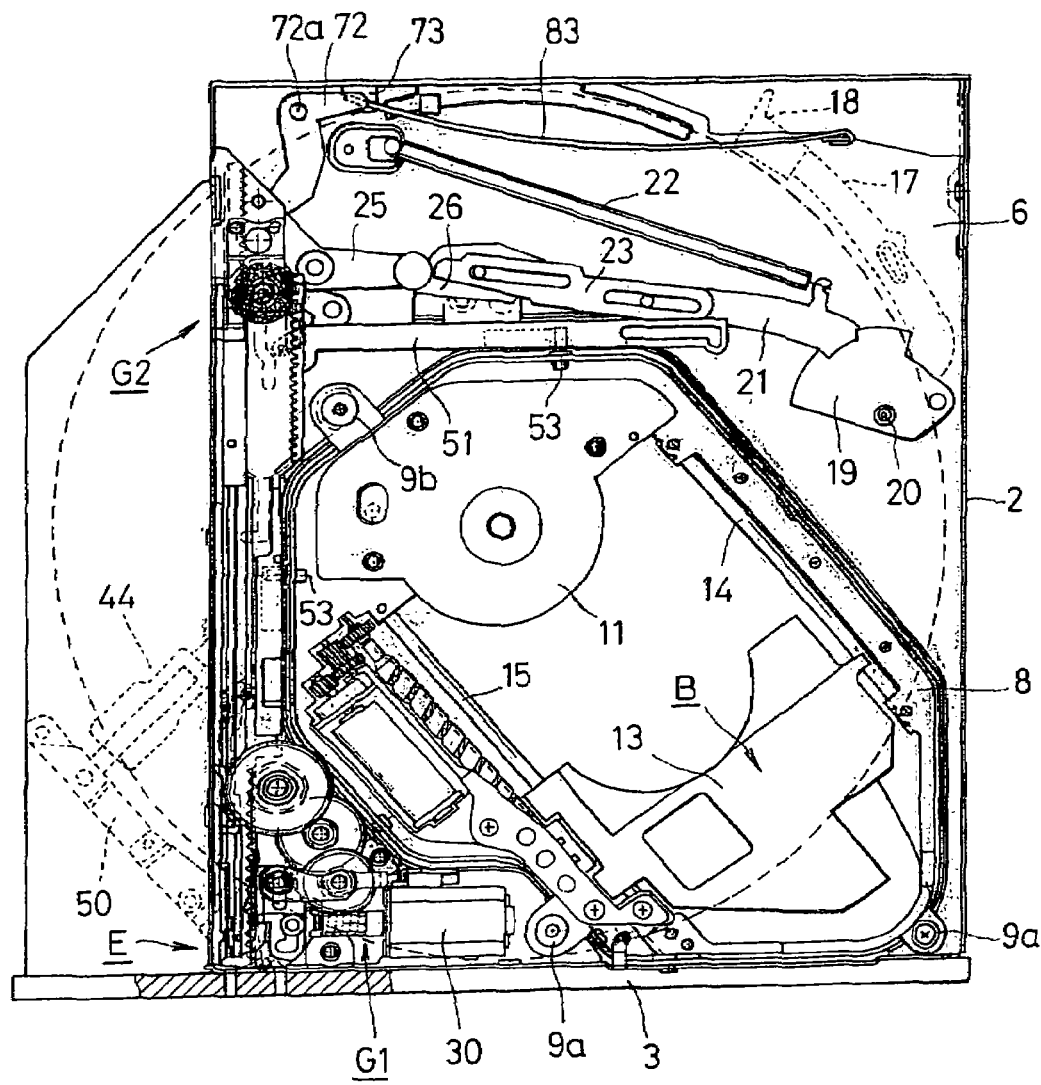
FIG. 5 is a figure for explaining an operation state of the disc apparatus in FIG. 1.

Next, a construction and operation aspect of an elevating mechanism of the frame member 8 will not be described. The elevating mechanism comprises the rack main body 43, the slide member 51 which advances or retreats in synchronization with the rack main body 43, and a follower pins 53 which is guided in cam grooves which are formed in the rack main body 43 and the slide member 51. The slide member 51 is connected to the rack main body 43 by a link member 55a. Thereby, the rack main body 43 and the slider member 51 advances or retreats in synchronization with each other. FIG. 4 shows a state in which the rack main body 43 has advanced farthest, and FIG. 5 shows a state in which the rack main body 43 has retreated farthest.

The follower pin 53 fixed to the frame member 8 is arranged such that an open end thereof is engaged with the cam grooves, respectively, which are formed in the rack main body 43 and the slide member 51. Since the engagement relationships between the follower pin 53 and the respective cam grooves are substantially common to each other, the following description will be made about an engagement relationship between the cam groove of the rack main body 43 and the follower pin 53 as a representative example.

First, in an embodiment shown in FIGS. 13 to 19, the follower pin 53 fixed to the frame member 8 is mounted with an elastic ring 54 having flexibility. On the other hand, the cam grooved formed in the rack main body 43 is formed to a double-cam structure consisting of a cam groove 43c which the follower pin 53 is sled in and guided by, and a cam groove 43d which brings follower pin 53 into a loosely fitted state to such an extent that the follower pin 53 does not come in contact with the elastic ring 54 while being guided by the cam groove 43.

At a higher portion P2 of the cam grooves 43c and 43d, the cam groove 43d to hold the elastic ring 54 is formed to have almost the same diameter as the elastic ring 54. Further, the cam groove 43c terminates in the vicinity of an inlet of the higher portion P2, and is open to the higher portion P2. Accordingly, in a range of the cam groove 43c being formed, the cam groove 43c regulates and supports the follower pin 53. Then, when the follower pin 53 reaches the higher portion P2, the follower pin 53 is supported through the elastic ring 54.

Figure 13:
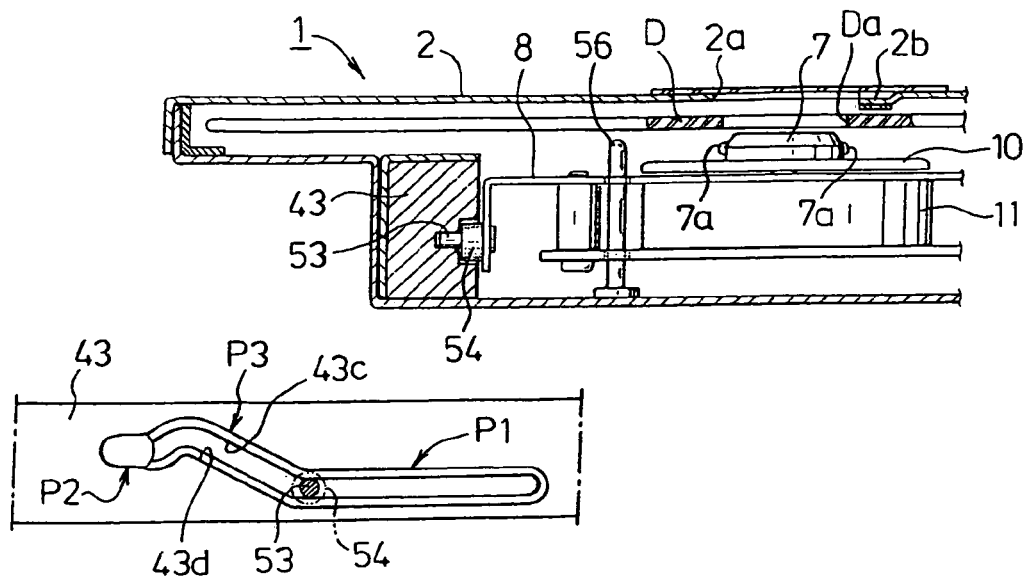
FIG. 13 is a figure showing a first step of the operation of an elevating mechanism.
Figure 14:
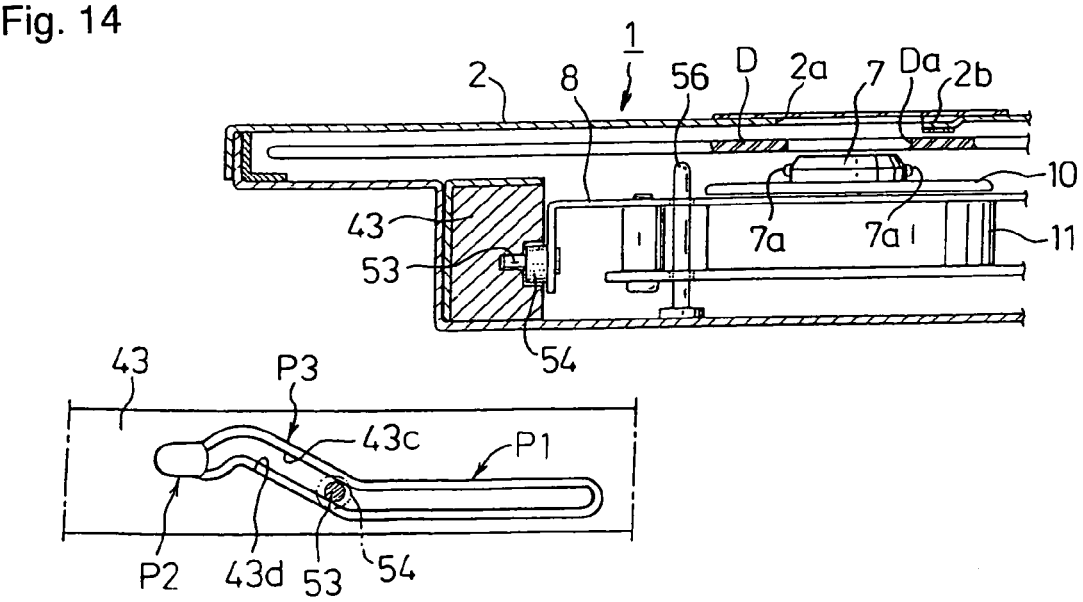
FIG. 14 is a figure showing a second step of the operation of the elevating mechanism.

Next, an operation aspect of the elevating mechanism of the frame member 8 constructed as above will now be described with reference to the process views shown in FIGS. 13 to 19. FIG. 13 shows the earliest state in which the disc D is loaded into the disc apparatus 1 and stops at a position where the central hole Da of the disc D faces the clamping head 7. In this state, since the follower pin 53 is located at a lower portion P1 of the cam groove 43c, the frame member 8 descends to its lowermost position, and the clamping head 7 is in a standby state for ascent thereof. When the rack main body 43 begins to further retreat from this state, as shown in FIG. 14, the follower pin 53 gradually ascends while being guided by an inclined portion P3 of the cam groove 43c, whereby the frame member 8 and the clamping head 7 also begins to ascend.

Figure 15:
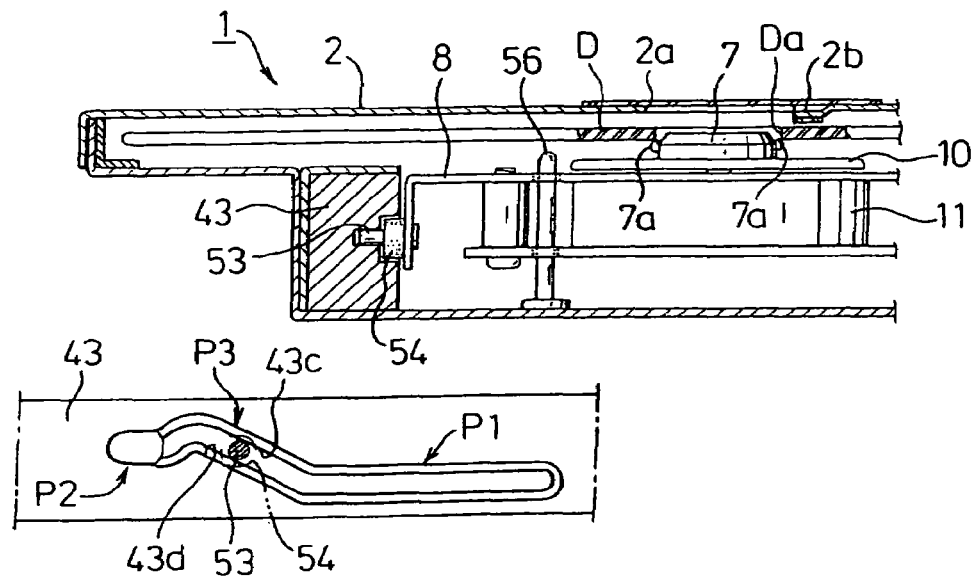
FIG. 15 is a figure showing a third step of the operation of the elevating mechanism.
Figure 16:
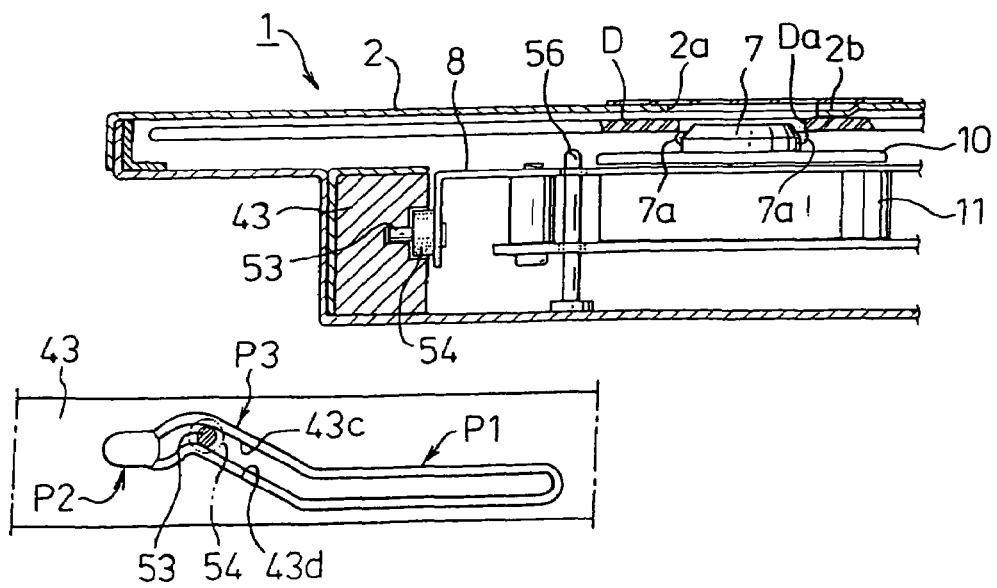
FIG. 16 is a figure showing a fourth step of the operation of the elevating mechanism.
Figure 17:
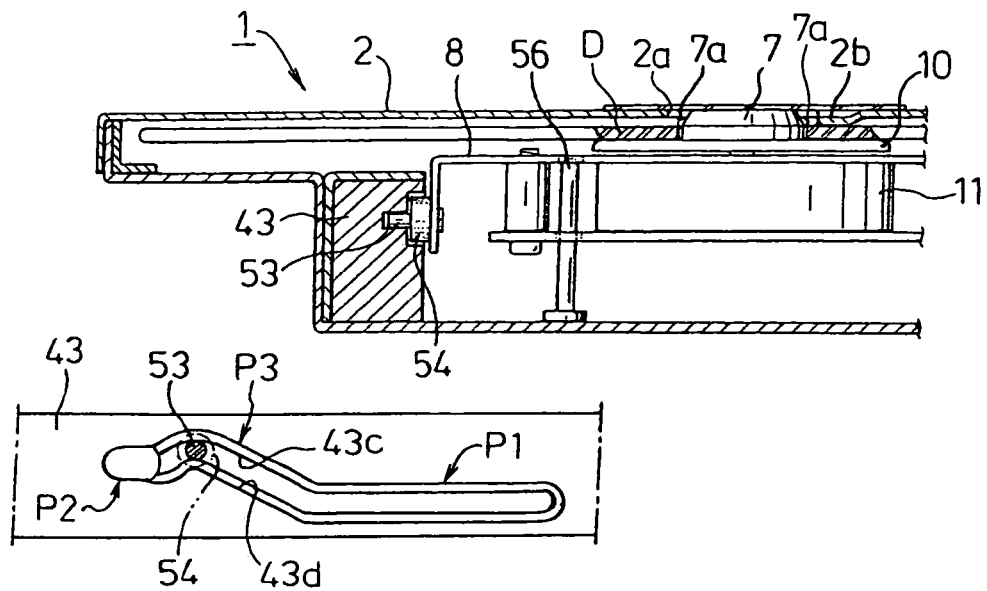
FIG. 17 is a figure showing a fifth step of the operation of the elevating mechanism.

Then, as shown in FIG. 15, when the follower pin 53 being guided by the cam grooved 43c further ascends the inclined portion P3, a chucking pawl 7a of the clamping head 7 abuts on an opening end of the central hold Da of the disc D. As shown in FIG. 16, when the clamping head 7 ascends from this state, the chucking pawl 7a thereof pushes up the disc D which causes the opening end of the central hole Da to be pushed against the protrusion 2b of the opening 2a of the chassis case 2. As shown in FIG. 17, when the follower pin 53 is further guided and reaches an apex of the cam groove 43c, the clamping head 7 is fitted into the central hole Da of the disc D, and the chucking pawl 7a thereof is locked to the opening end of the disc D to fix the disc D onto the turntable 10, thereby performing clamping.

Figure 18:
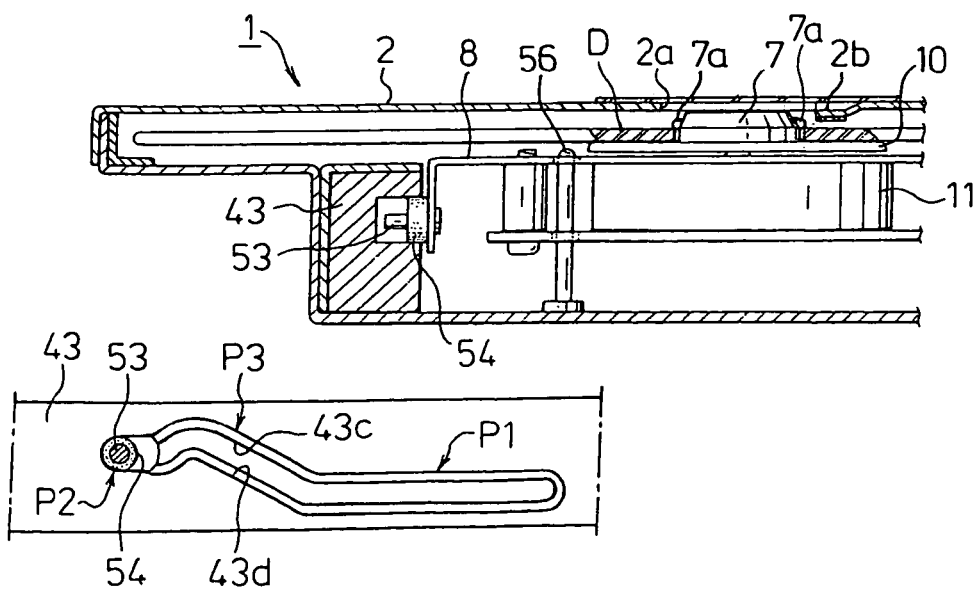
FIG. 18 is a figure showing a sixth step of the operation of the elevating mechanism.

When the rack main body 43 further retreats from the state in FIG. 17, the frame member 8 descends slightly, and as shown in FIG. 18, the elastic ring 54 fits into the higher portion P2. At this position, the clamping operation is completed. In this way, the follower pin 53 departs from the cam groove 43c, thereby releasing the regulation and support of the follower pin 53 by the cam groove 43c, and the elastic ring 54 elastically supports the follower pin 53, thereby generating a buffer action against a shock to the frame member 8.

Figure 19:
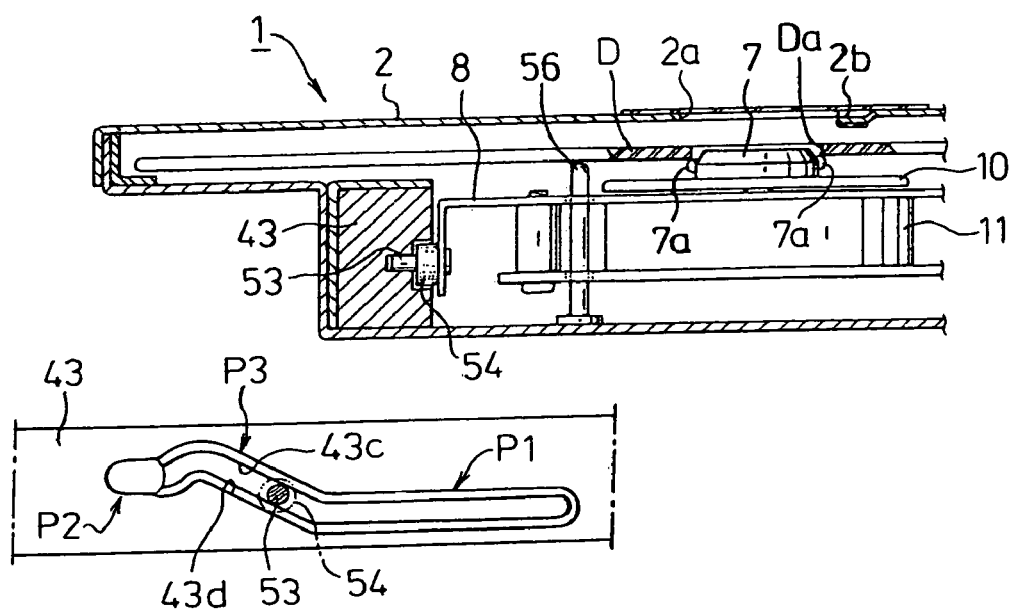
FIG. 19 is a figure showing a seventh step of the operation of the elevating mechanism.
Figure 20A:
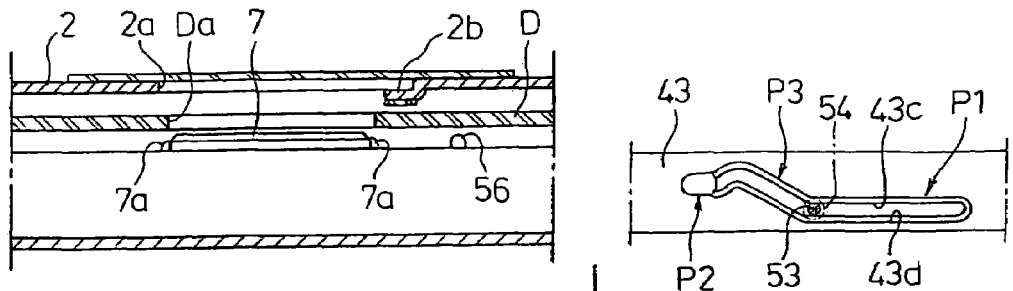
FIG. 20 is a figure showing an advancing procedure in an elevating operation of a clamping head.
Figure 20B:
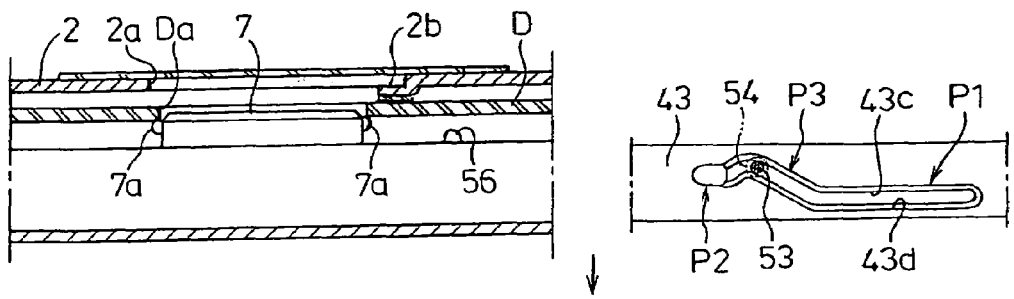
Figure 20C:
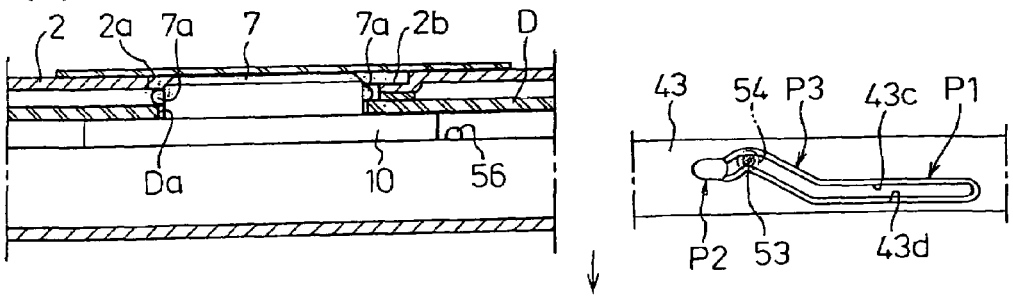
Figure 20D:
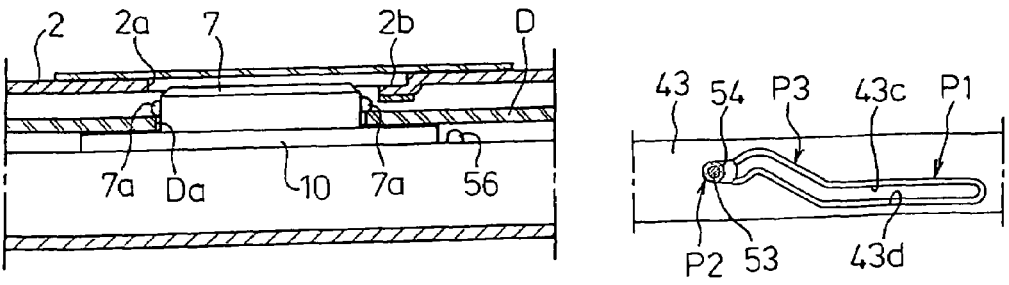
Figure 21A:
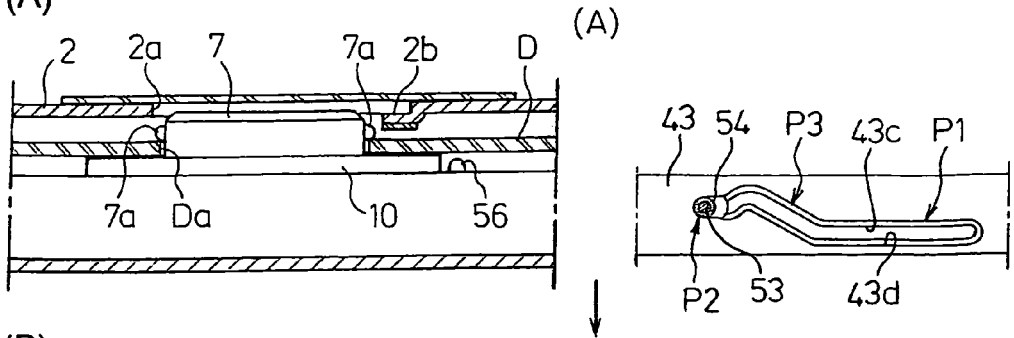
FIG. 21 is a figure showing a retreating procedure in an elevating operation of a clamping head.
Figure 21B:
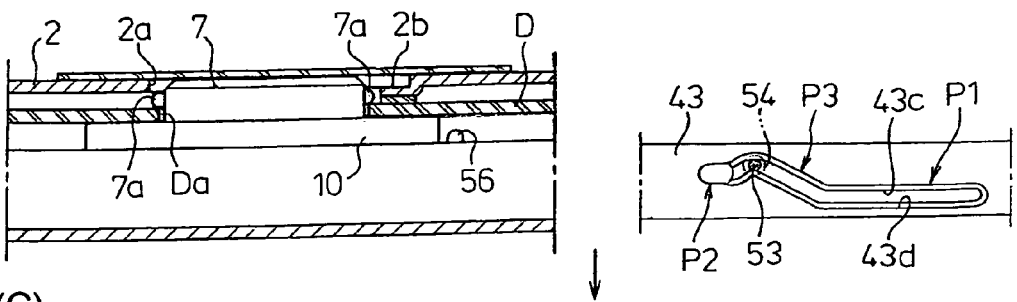
Figure 21C:
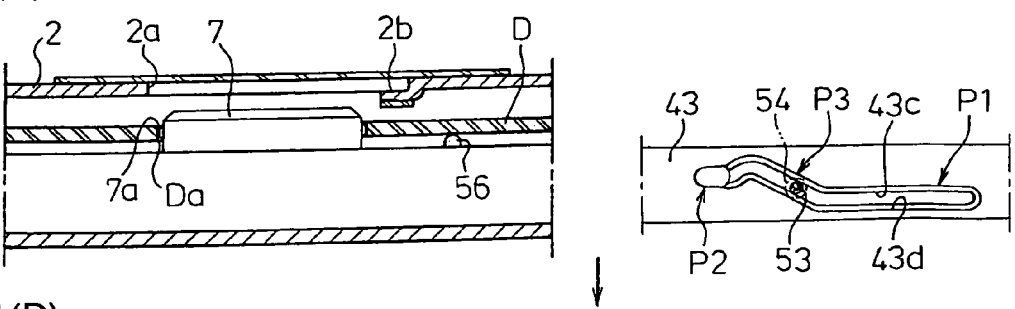
Figure 21D:
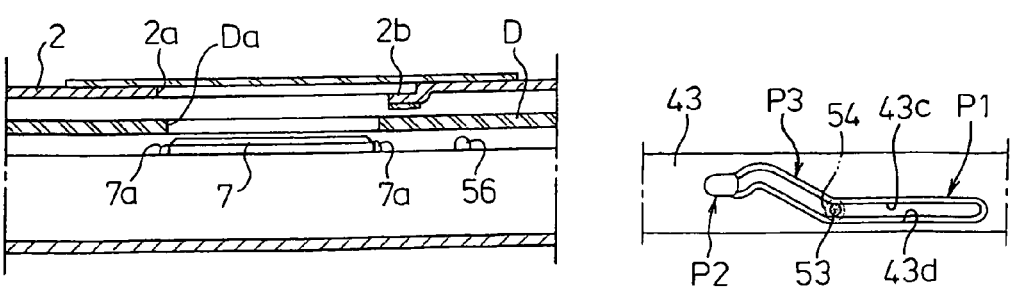

FIG. 19 is a drawing showing a process of unloading the disc D. By advancing the rack main body 43, the follower pin 53 goes through a process reverse to the above-mentioned process. Specifically, while the follower pin 53 reaches the lower portion P1, a clamping releasing pin 56 enables the disc D to depart from the clamping head 7 and to be unloaded to the outside of the apparatus. Meanwhile, in order to facilitate understanding about the operation aspect as described above, FIG. 20 shows a process of clamping the disc D, and FIG. 21 continuously show a process of releasing the disc D.

Figure 22:
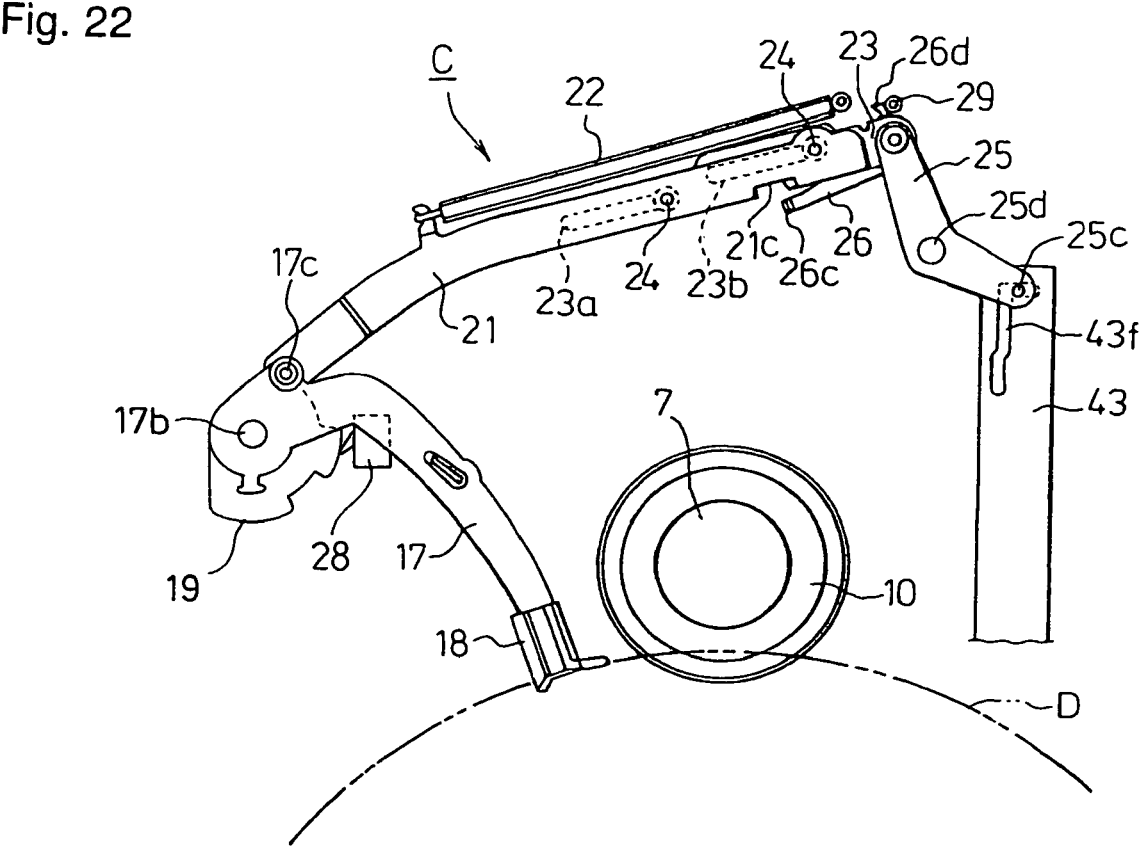
FIG. 22 is a figure showing a first step of an operation state of a disc support arm.

Next, an operation aspect of the disc support arm 17 will now be described. The driving mechanism C for driving the disc support arm 17 is constructed by assembling mechanism elements shown in FIG. 9. However, the operation of the driving mechanism is performed with advancement or retreat of the rack main body 43. Specifically, in FIG. 22, a guide groove 43f formed in the rack main body 43 is mounted with a follower pin 25c fixed to an end of the lever arm 25 so that the follower pin 25c is guided by the guide groove 43f. The state shown in FIG. 22 represents an initial state in which an operator inserts the disc D through the slot 3a such that the front end of the disc D is received in the end-receiving portion 18a of the holder 18 at the tip of the disc support arm 17. Since a rear end 26d of the locking lever 26 is pressed by means of the starting pin 29 at this point of time, the locking end 26c thereof is in a state that is not interposed between the cutouts 21c and 23c of the first and second link arms 21 and 23.

Figure 23:
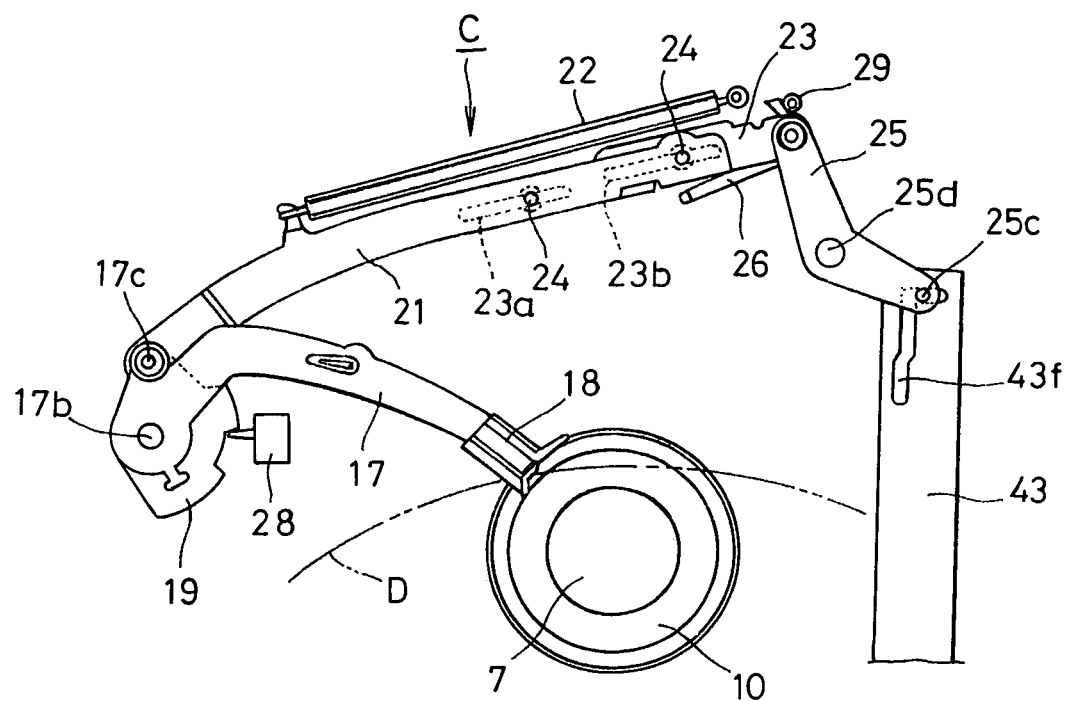
FIG. 23 is a figure showing a second step of the operation state of the disc support arm.

FIG. 23 shows a state in which an operator further pushes the disc D into the apparatus. Specifically, FIG. 23 shows a state in which the disc support arm 17 rocks rearward, the first link arm 21 connected to a base end of the disc support arm 17 by the pivot pint 17c is towed, and the drive starting. position detecting switch 28a inside the angular position detecting switch 28 is operated. At this point of time, since the lever arm 35 is connected to the stationary rack main body 43, the second link arm 23 connected to the lever arm 25 is kept in place. Accordingly, the first link arm 21 is in a state unlocked from the second link arm 23, and as shown in this figure, the first link arm 21 slides on the second link arm 23 to be brought into its extending state. From this point of time, in response to the drive starting position detecting switch 28a being turned on, the loading motor 30 is driven with a weak electric power, whereby the carrying mechanism E begins to be driven.

Figure 24:
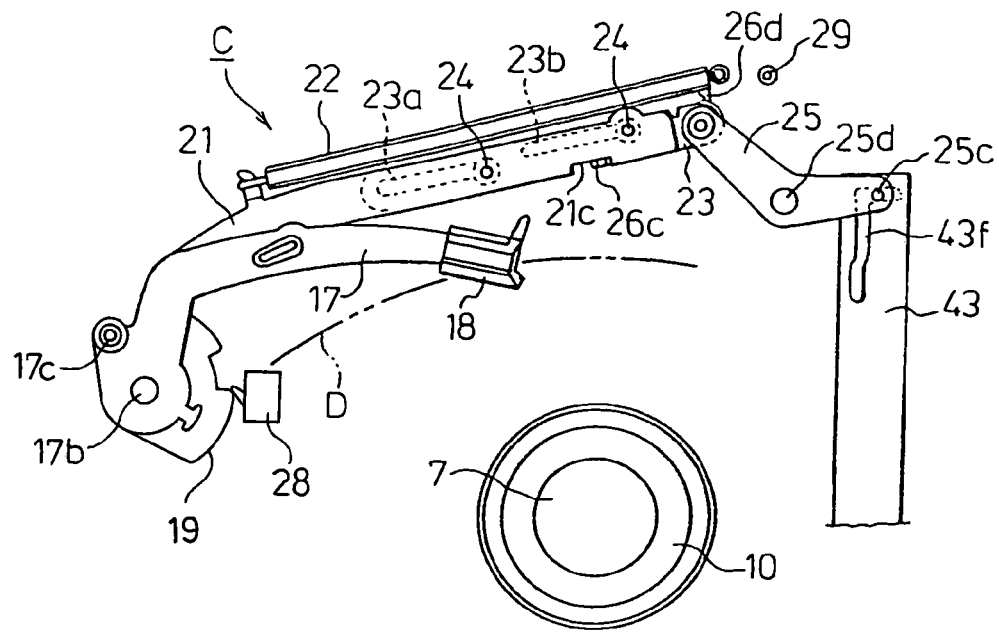
FIG. 24 is a figure showing a third step of the operation state of the disc support arm.

FIG. 24 shows a state in which an operator further pushes the disc D into the apparatus. Specifically, FIG. 1 shows a state in which the disc support arm 17 rocks rearward, the first link arm 21 connected to the base end of the disc support arm 17 by the pivot pint 17c is towed, and the intermediate position detecting switch 28b inside the angular position detecting switch 28 is operated. At this point of time, since the carrying mechanism E begins to be driven in response to the drive starting position detecting switch 28a having already been turned on in the state in FIG. 23, the rack main body 43 is in its retreated state. Specifically, as the rack main body 43 retreats, the guide groove 43f thereof rocks the lever arm 25, and the second link arm 23 slides and advances so as to follow the first link arm 21. Therefore, the locking end 26c of the locking lever 26 released from the pressing caused by the starting pin 29 is sandwiched between the cutouts 21c and 23c of the first and second link arms 21 and 23, which results in an integrally locked state of the first and second link arms 21 and 23. In other words, during the loading of the disc D, after the first and second link arms 21 and 23 has first been displaced in a direction in which they extend (from the state in FIG. 22 to the state in FIG. 23), the first and second link arms 21 and 23 are displaced in a direction in which they retract (from the state in FIG. 23 to the state in FIG. 22), which results in a state in which the first and second link arms 21 and 23 are locked.

Figure 25:
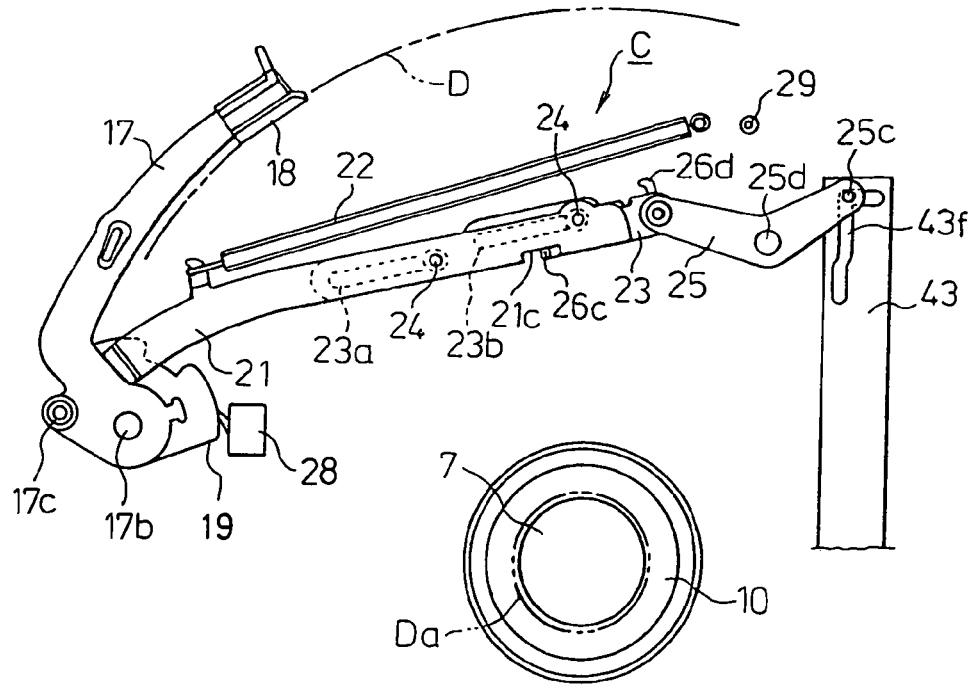
FIG. 25 is a figure showing a fourth step of the operation state of the disc support arm.

FIG. 25 shows a state in which the rack main body 43 further retreats so that the disc support arm 17 rocks rearward to load the disc D into the apparatus, and the central hole Da of the disc D coincides with the clamping head 7. Meanwhile, at this point of time, the holder 18 and the leading arm 50 chuck and hold the disc D, and the disc support arm 17 and the leading arm 50 rocks synchronously.

Figure 26:
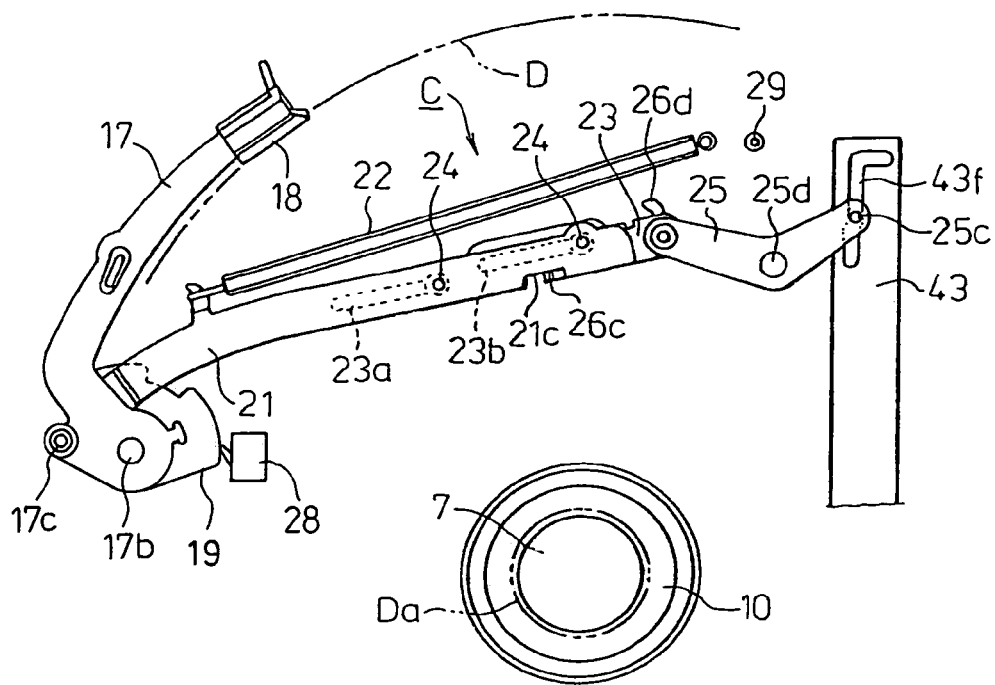
FIG. 26 is a figure showing a fifth step of the operation state of the disc support arm.

In the process of FIGS. 25 and 26, since the follower pin 25c of the lever arm 25 slides on only a longitudinal guide portion of the guide groove 43f of the rack main body 43, so the disc support arm 17 are maintained in place. On the other hand, the follower pin 53 is guided in the cam grooves which are formed in the rack main body 43 and the slide member 51, whereby the elevating mechanism of the frame member 8 operates, and at the point of time shown in FIG. 26, the clamping head 7 enter the central hole Da of the disc D. Then, a tapered portion formed at the top of clamping head 7 comes in contacts with the central hole Da of the disc D, thereby performing centering.

Thereafter, when the clamping head 7 further enters the central hole Da of the disc D, the disc D ascends by means of the clamping head 7. At the time of this ascending movement, the chucking by the disc support arm 17 and the leading arm 50 is obstructed. If the clamping head 7 is elevated while the chucking is performed, the disc D is deformed in the shape of an umbrella, which applies load to the ascending movement of the clamping head 7. Thus, after performing the centering by the tapered portion formed at the top of the clamping head 7, the chucking is released while the disc support arm 17 and the leading arm 50 are kept away from the disc D, and the clamping head 7 is further elevated to cause the chucking pawl 7a to be engaged with the central hole Da of the disc D.

Figure 27:
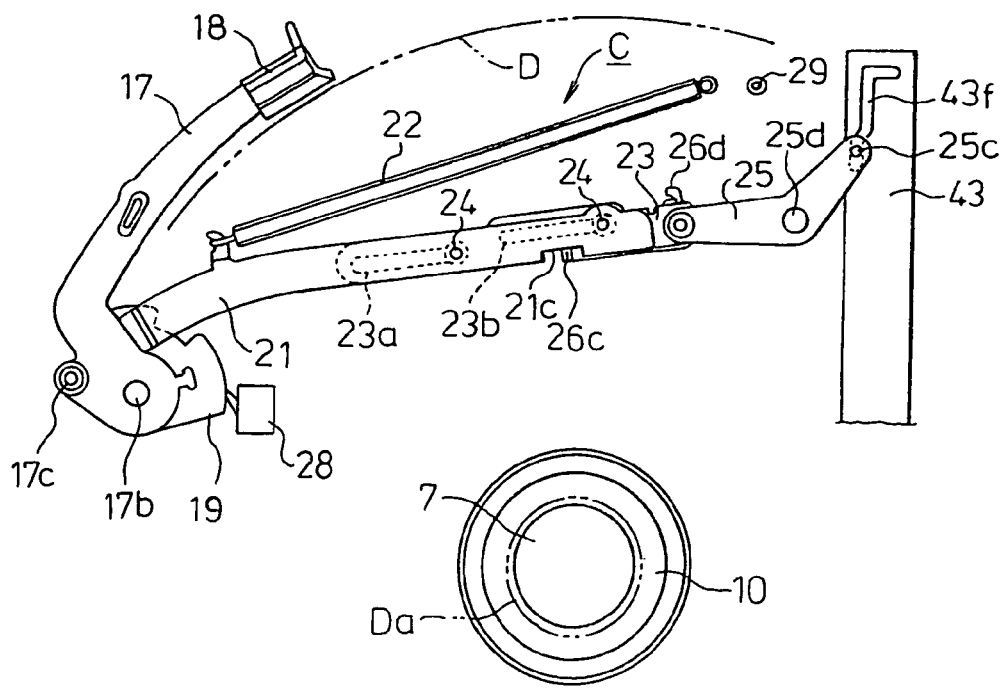
FIG. 27 is a figure showing a sixth step of the operation state of the disc support arm.

FIG. 27 shows a state in which, after the clamping head 7 clamped the central hole Da of the disc D from the point of time of FIG. 26, the rack main body 43 has slightly retreated. Since this slightly rocks the rack main body 43 at a terminating portion of the longitudinal groove of the guide groove 43, and as shown in this figure, also slightly rocks the disc support arm 17, the chucking of the disc D by means of the holder 18 is released. When this point of time has been reached, the leading arm 50 also slightly rocks synchronously, thereby releasing the chucking of the disc D. Further, in the elevating mechanism of the frame member 8, the follower pin 53 slightly descends within the cam groove 43c, which enable the disc D to be rotationally driven. That is, the clamping operation is completed.

Figure 28:
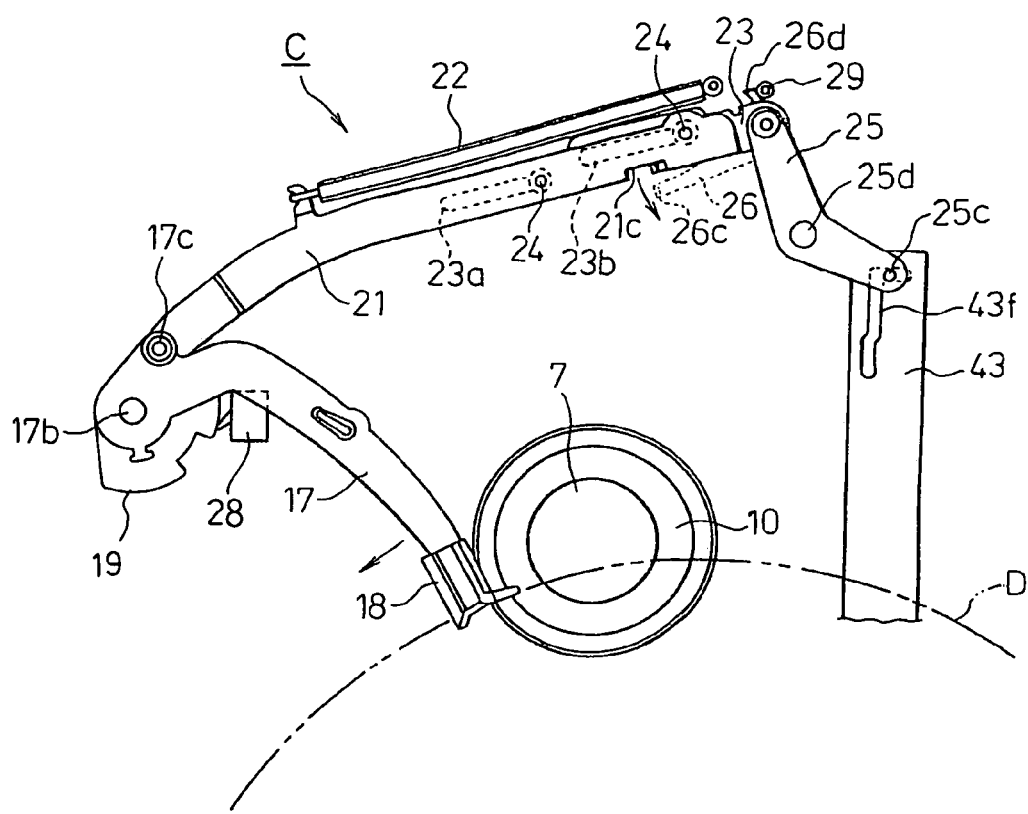
FIG. 28 is a figure showing the operation state at the time of unloading of the disc support arm.

The above description is made of the operation aspect of the driving mechanism C at the time of the loading of the disc D. At the time of the unloading of the disc D, the respective mechanism elements perform a reverse operation that trace a course reverse to the above-described process of operation. In other word, the carrying mechanism E is reversely driven. Specifically, the rack main body 43 is advanced to rock the disc support arm 17 forwardly from the state in FIG. 27 to the state in FIG. 24. In the state shown in FIG. 28, the rear end 26d of the locking lever 26 abuts the starting pin 29. Then, when the rack main body 43 advances, the rear end 26d is brought into a state of being pressed by the starting pin 29. This, as shown in FIG. 28, causes the locking end 26c of the locking lever 26 to be rocked and separated from the cutouts 21c and 23c of the first link arm 21 and the second link arm 23, and causes the first link arm 21 and the second link arm 23 to be released from their integrally locked state. Simultaneously with this, the biasing force of the tension coil spring 22 is applied to rocks the disc support arm 17 to the position shown in FIG. 22. Then, at the last moment of a final unloading process, the disc D is popped out from the slot 3a, thereby completing the unloading.

As described above, at the time of beginning of the loading operation of the disc D, the first and second link arms 21 and 23 are in their unlocked state. As the disc D is inserted, the first and second link arms 21 and 23 are first displaced in a direction in which they are extended and are then displaced in a direction in which they are retracted, and they are locked by the locking lever 26, when they has reached the state in FIG. 24. On the other hand, at the time of beginning of the unloading operation of the disc D, the first and second link arms 21 and 23 are in their locked state. Thus, the first and second link arms 21 and 23 are not displaced in a direction in which they are extended or retracted as in the unloading of the disc D, but they are released from being locked by the locking lever 26, when they has reached the state in FIG. 28. Meanwhile, at the time of the unloading of the disc D, since the carrying mechanism E drivingly controls almost the whole unloading process, the unloading operation always becomes regular, and at the time of the completion of the unloading, a state in which the disc D is exposed from the slot 3a of the bezel 3 and then stopped is always kept constant.

Figure 29:
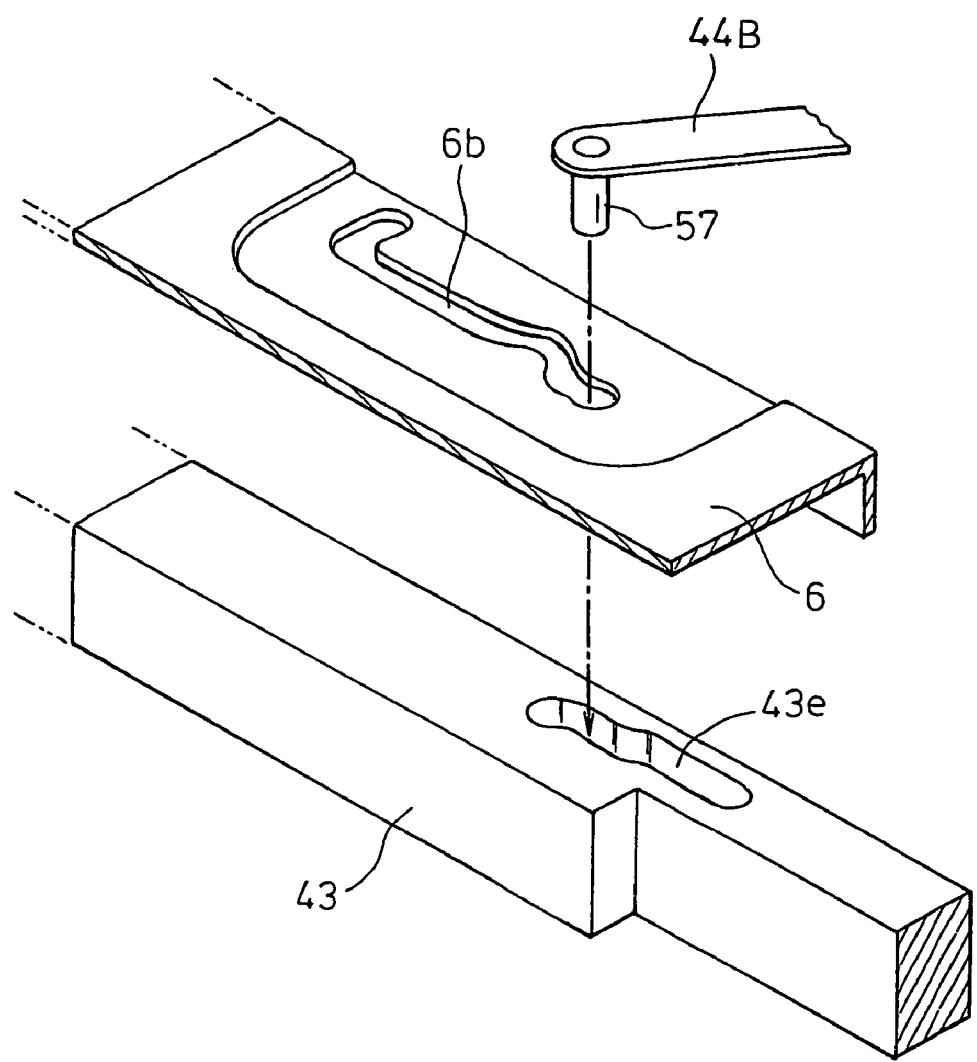
FIG. 29 is an exploded perspective view showing a construction of an operating mechanism of a leading arm.

Next, a construction and operation aspect of the leading arm 50 which is driven by the rack main body 43 will now be described below. FIG. 29 shows a construction that drives the leading arm 50. Specifically, a guide slit 6b is formed in a base panel 6 at a position that overlaps the guide groove 43e formed in the rack main body 43, and a follower pin 57 fixed to the front end of the lever arm 44 are inserted into the guide groove 43e and the guide slit 6b. The base panel 6 to be advanced or retreated and the guide slit 6b which is located in place with respect to the guide groove 43e cooperate with each other to control the movement of the follower pin 57.

Figure 32:
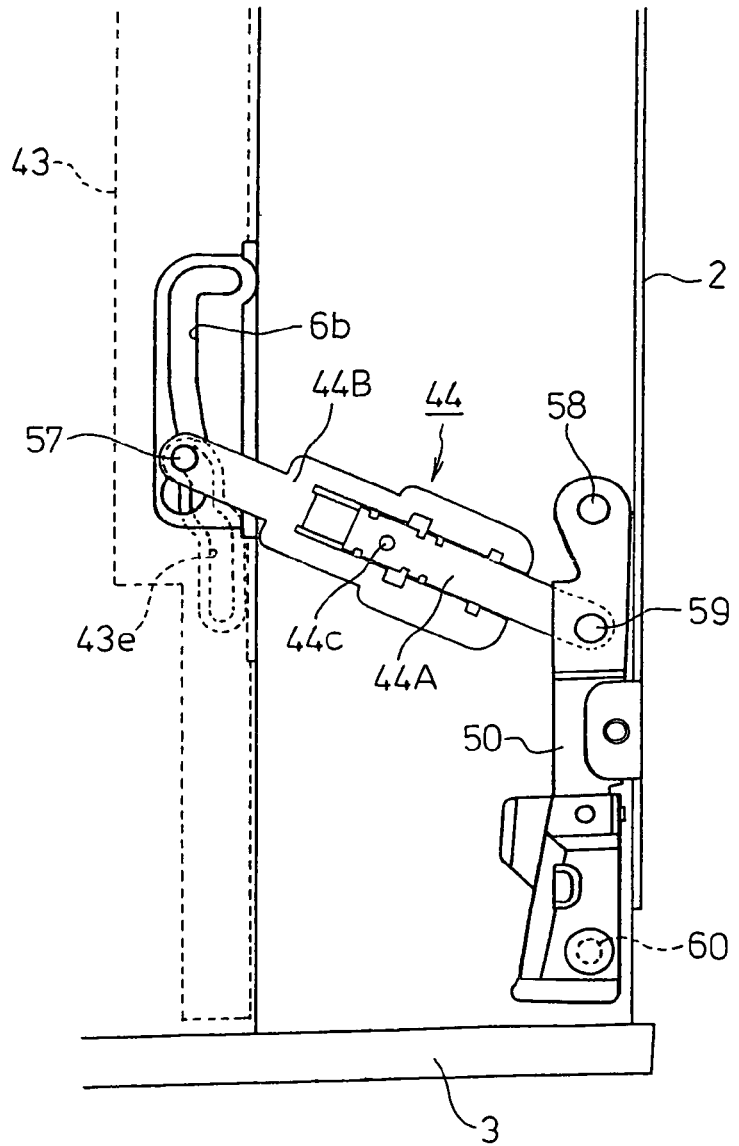
FIG. 32 is a figure showing a first step of an operation of the leading arm.
Figure 32:
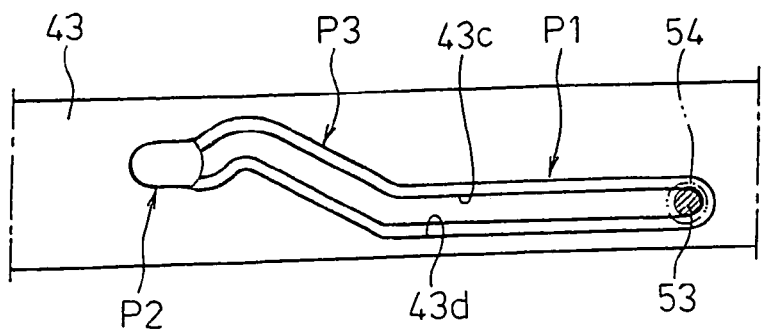

In the leading arm 50, as shown in FIG. 32, the lever arm 44 is journalled to a pivot pin 59 by the base end which is rotatably supported by the pivot pin 58. A tip of the leading arm 50 is formed with a retaining groove of the disc D, and a roller 60 is formed within the retaining groove. Since the leading arm 50 is constructed as such, it rocks within the chassis case 2 with the movement of the lever arm 44 so that the disc D can be loaded into the apparatus.

Figure 30:
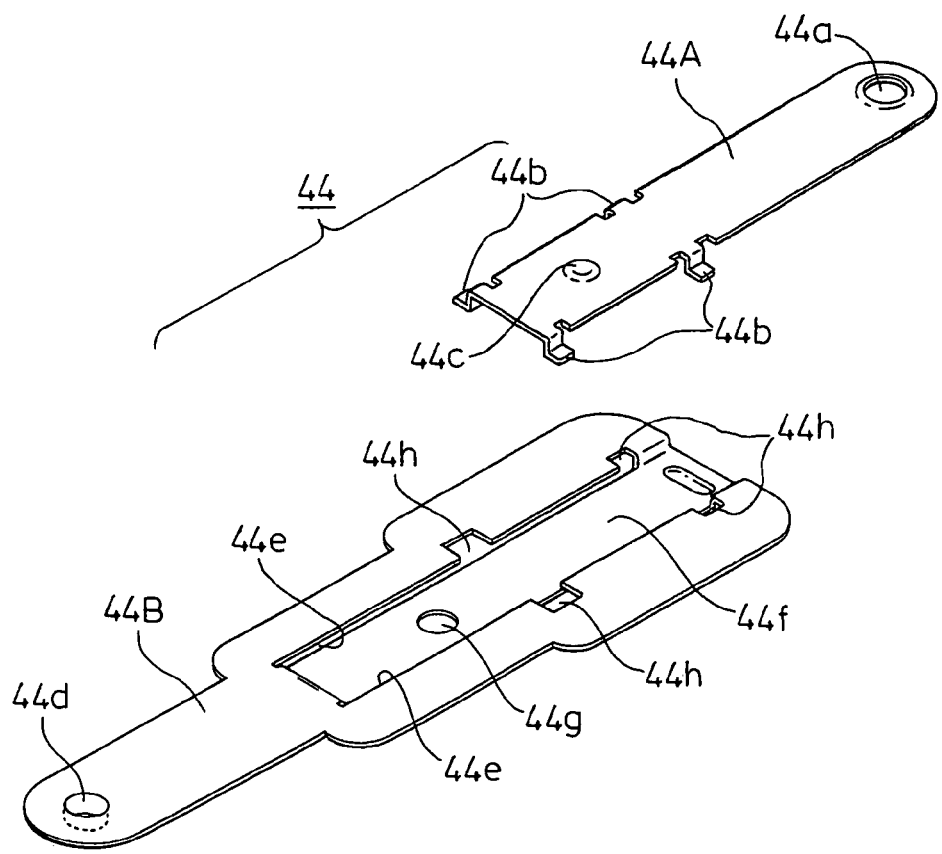
FIG. 30 is an exploded perspective view of a lever arm.
Figure 31:
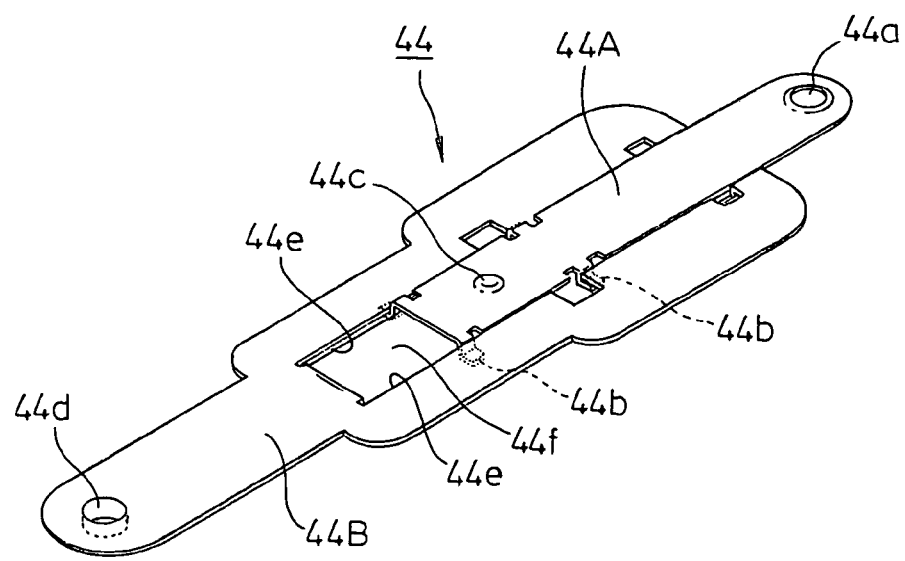
FIG. 31 is an assembled perspective view of the lever arm.

On the other hand, as shown in FIG. 30, the lever arm 44 for transmitting a driving force to the leading arm 50 includes a slide piece 44A and a support piece 44B. The slide piece 44A is formed with a through-hole 44a that rotatably supports the pivot pin 59 of the leading arm 50, and is formed with locking pieces 44b and a downward projected locking protrusion 44c.

The support piece 44B is formed with a through-hole 44d that fixes the follower pin 57, and a guide groove 44f having slits 44e formed at its opposite sides. Also, a bottom plate portion of the guide groove 44f of the support piece 44b is formed with a through-hole 44g, and is formed with cutouts 44h that face the guide groove 44f.

When the locking claws 44b of the slide piece 44A formed as such are respectively inserted into the cutouts 44h of the support piece 44B, and the slide piece 44A is slightly sled forward, the locking claws 44b are respectively locked in the slits 44e, and the locking protrusion 44c is integrally engaged with the through-hole 44g of the support piece 44B. As a result, the slide piece 44A and the support piece 44B can be extended or retracted with respect to each other. However, in a state in which the locking protrusion 44c is engaged with the through-hole 44g, a reference length of the lever arm is brought into a locked state.

FIGS. 32 to 36 illustrate an operation aspect of the leading arm 50, correspondingly to an operation aspect of the follower pin 53 guided in the cam groove 43d of the rack main body 43. FIG. 32 shows a state before an operator inserts the disc D into the disc apparatus 1.

Specifically, the disc support arm 17 is pushed back toward the leading end thereof in a direction in which the disc D is loaded, and thus locks rearward, the support plate 19 which interlocks with the disc support arm 17 operates the drive starting position detecting switch 28a inside the angular position detecting switch 28, and the loading motor 30 is driven with a weak current which results in a state immediately before the driving mechanism C starts to operate. Accordingly, as shown in FIG. 32, the rack main body 43 is located at the most front end, and the follower pin 57 of the lever arm 44 is located at the rear end of the guide groove 43e. Thereafter, when the drive starting position detecting switch 28a inside the angular position detecting switch 28 operates, the rack main body 43 begins to retreat.

Figure 33:
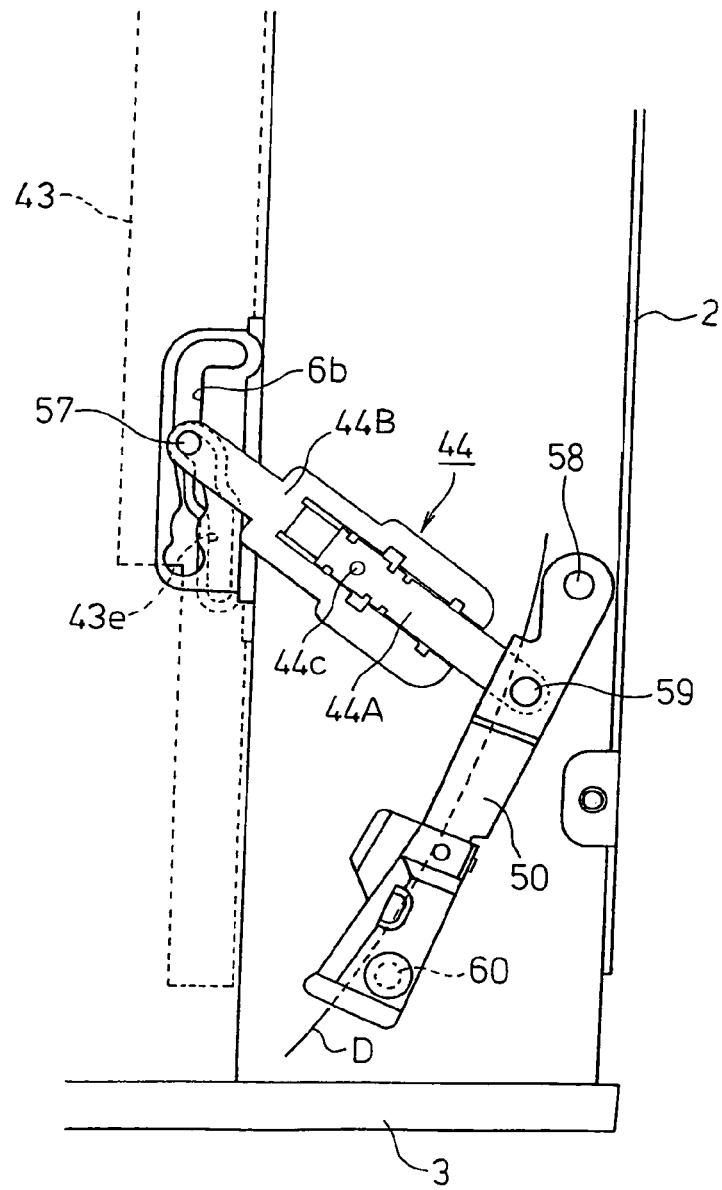
FIG. 33 is a figure showing a second step of the operation of the leading arm.
Figure 33:
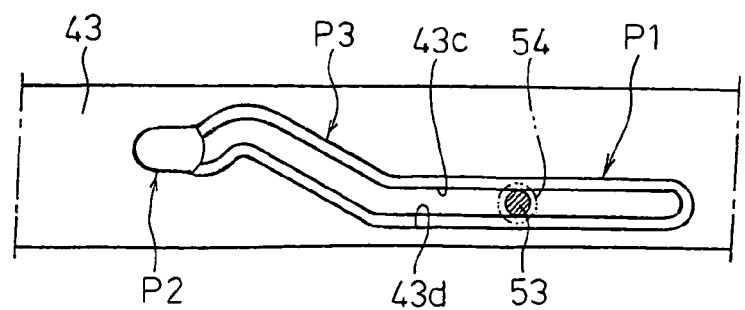

In this state, when the disc D continues to be further pushed into the disc apparatus 1 after the driving mechanism C begins to operate, the disc support arm 17 further rocks rearward, the support plate 19 which interlocks with the disc support arm 17 is also varied in its rotational angle, an intermediate position detecting switch 28b inside the angular position detecting switch 28 operates, and the loading motor 30 is driven with a strong electric power. Then, as shown in FIG. 33, the rack main body 43 further retreats. At this time, since the follower pin 57 is sandwiched between the inclined surface of the guide groove 43e at its rear end and a sidewall of the guide slit 6b, with the retreat of the rack main body 43, the follower pin 57 also retreats, and the lever arm 44 is towed, so that the leading arm 50 rocks which results in a state in which the disc support arm 17 chucks the disc D, thereby starting the loading of the disc D. At this time, the follower pin 53 is moved along a horizontal portion that is the lower portion P1 of the cam groove 43c, and has no variation in height.

Figure 34:
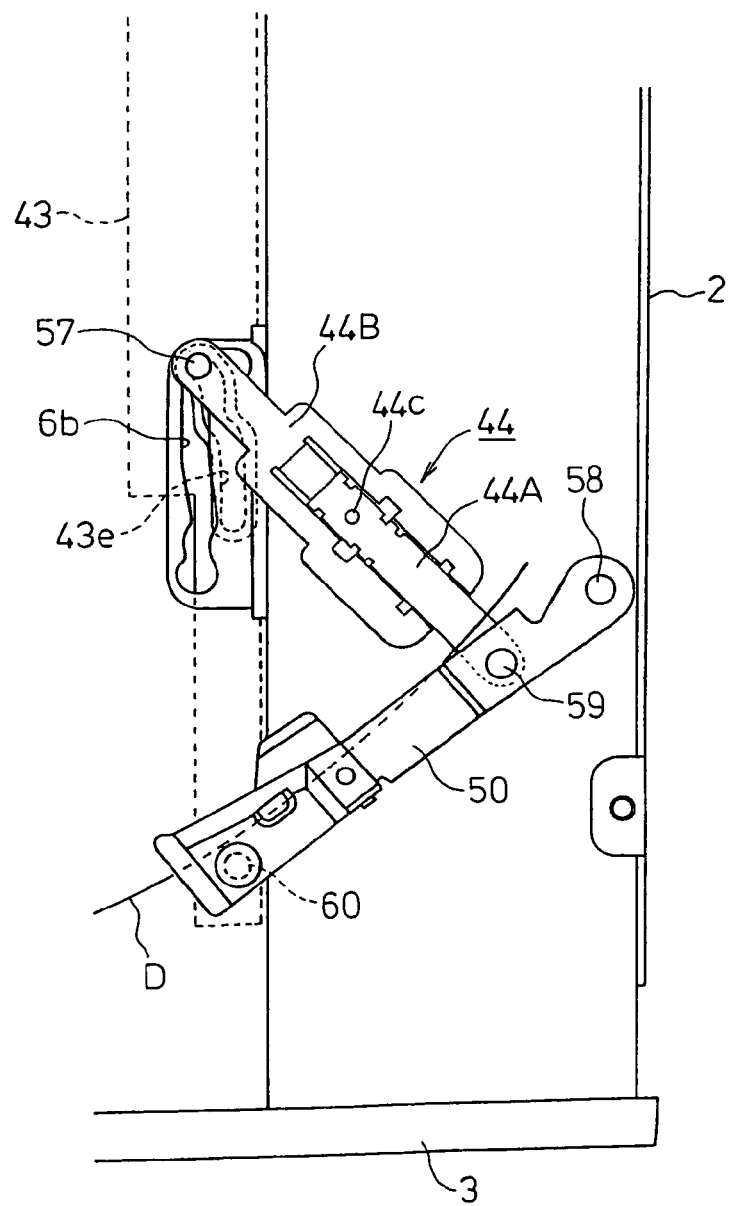
FIG. 34 is a figure showing a third step of the operation of the leading arm.
Figure 34:
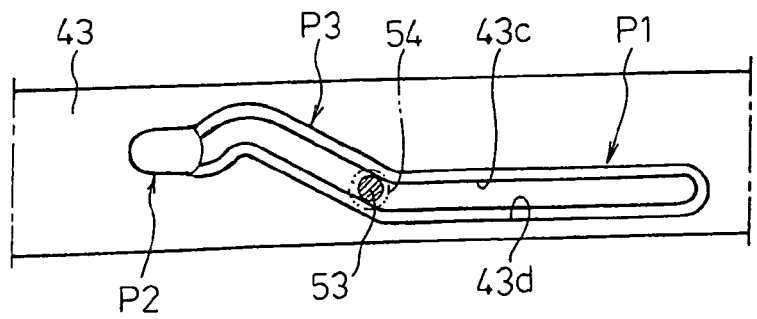

FIG. 34 shows a state in which the rack main body 43 further retreats and the follower pin 57 reaches the top of the guide slit 6b. Specifically, the rocking of the leading arm 50 allows the disc D to continue to be loaded, so that the central hole Da of the disc D has reached a position which coincides with the clamping head 7. In this state, the follower pin 57 begins to ascend the inclined portion P3 of the cam groove 43c at an upward gradient.

Figure 35:
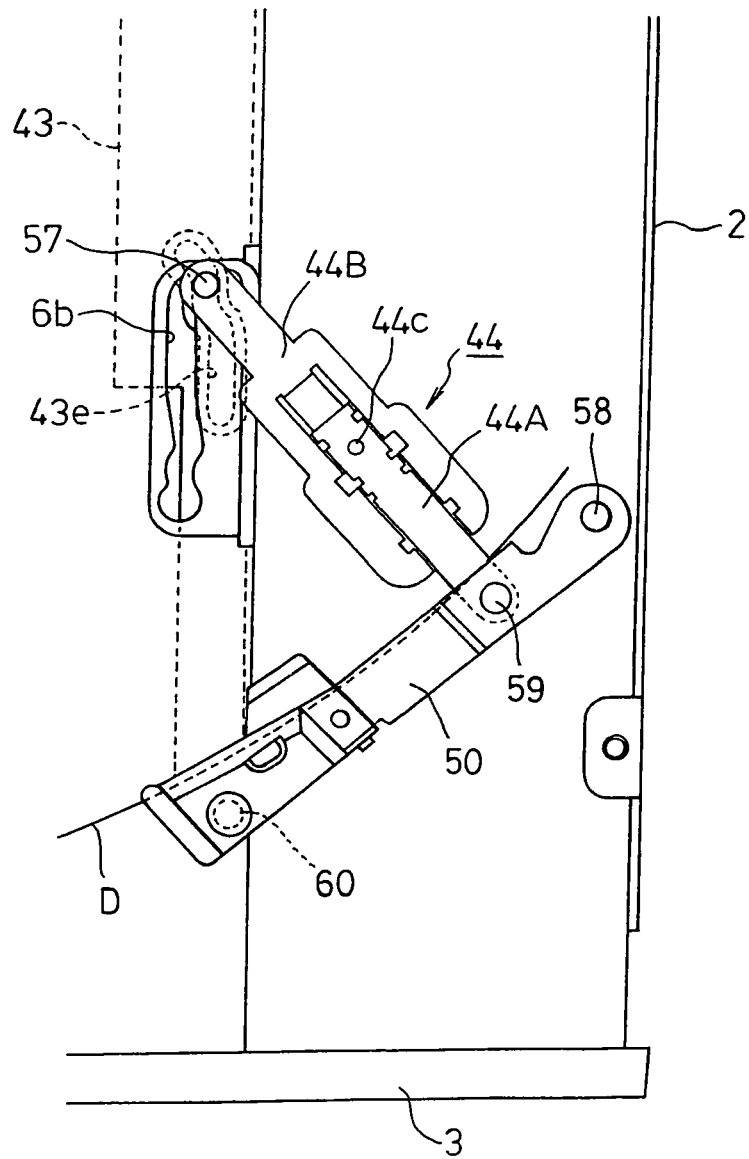
FIG. 35 is a figure showing a fourth step of the operation of the leading arm.
Figure 35:
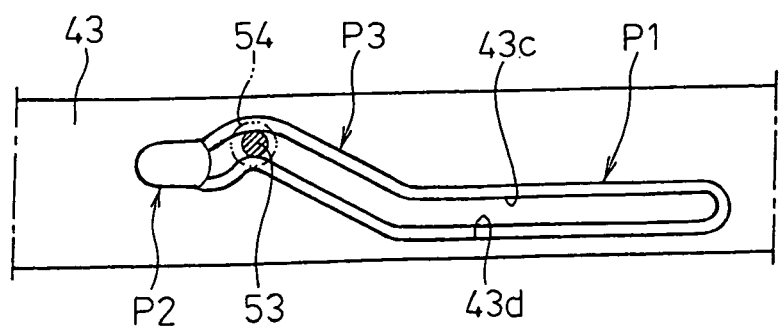

FIG. 35 shows a state in which the rack main body 43 has slightly retreated from the position in FIG. 34, in other words, a state in which the follower pin 57 is pushed into a lateral groove at the top of the guide slit 6b by the guide groove 43e. The leading arm 50 slightly retreats from the position shown in FIG. 34, thereby releasing chucking of the disc D. At this time, the follower pin 57 reaches the top of the inclined portion P3 of the cam groove 43e, and the clamping head 7 is fixed to the central hole Da of the disc D.

Figure 36:
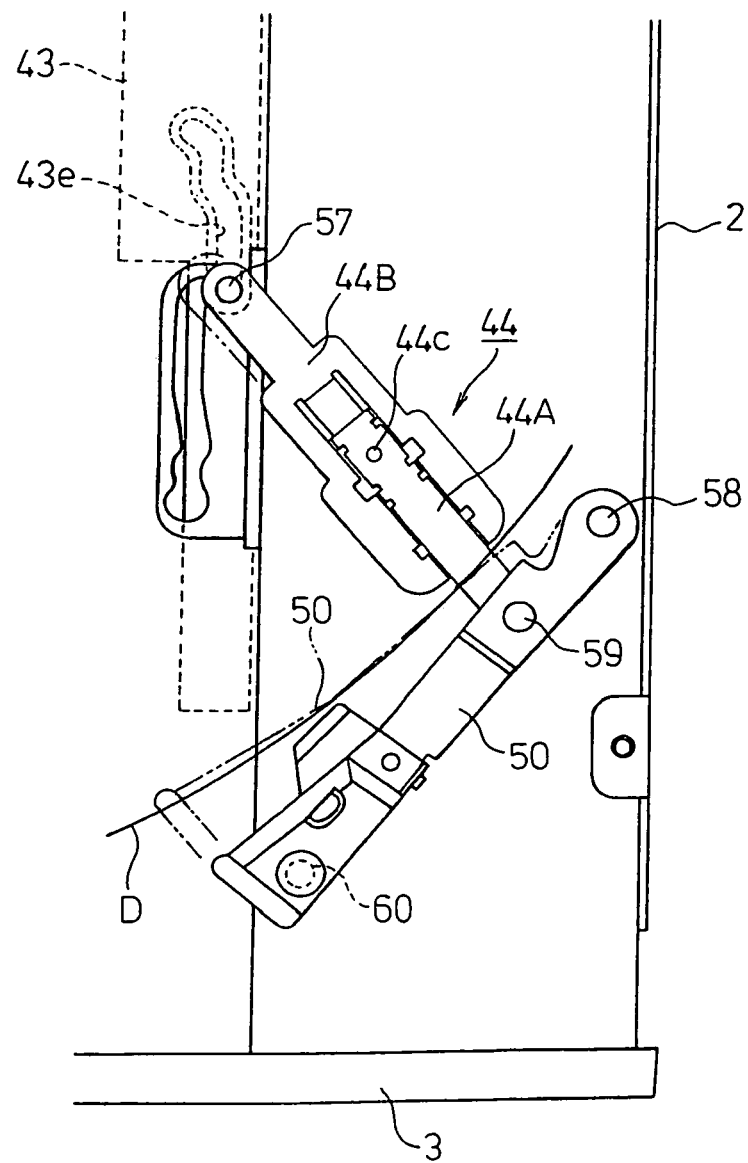
FIG. 36 is a figure showing a fifth step of the operation of the leading arm.
Figure 36:
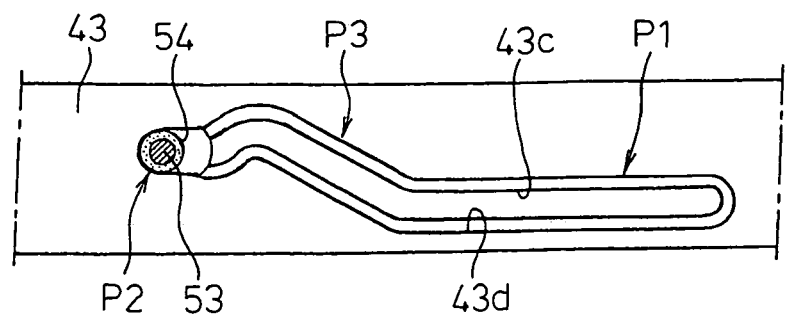

FIG. 36 shows a state in which the rack main body 43 retreats to its final position. In the process of the state in FIG. 35 to the state in FIG. 36, the follower pin is further pushed into the lateral grooves at the top of the guide slit 6b by an elongated groove at the front end of the guide groove 43e. Thereby, the leading arm 50 is completely separated from the disc D. At this time, the follower pin 57 is lowered from the top of the cam groove 43c to the higher portion P2 which enables the rotational driving of the disc.

Figure 37:
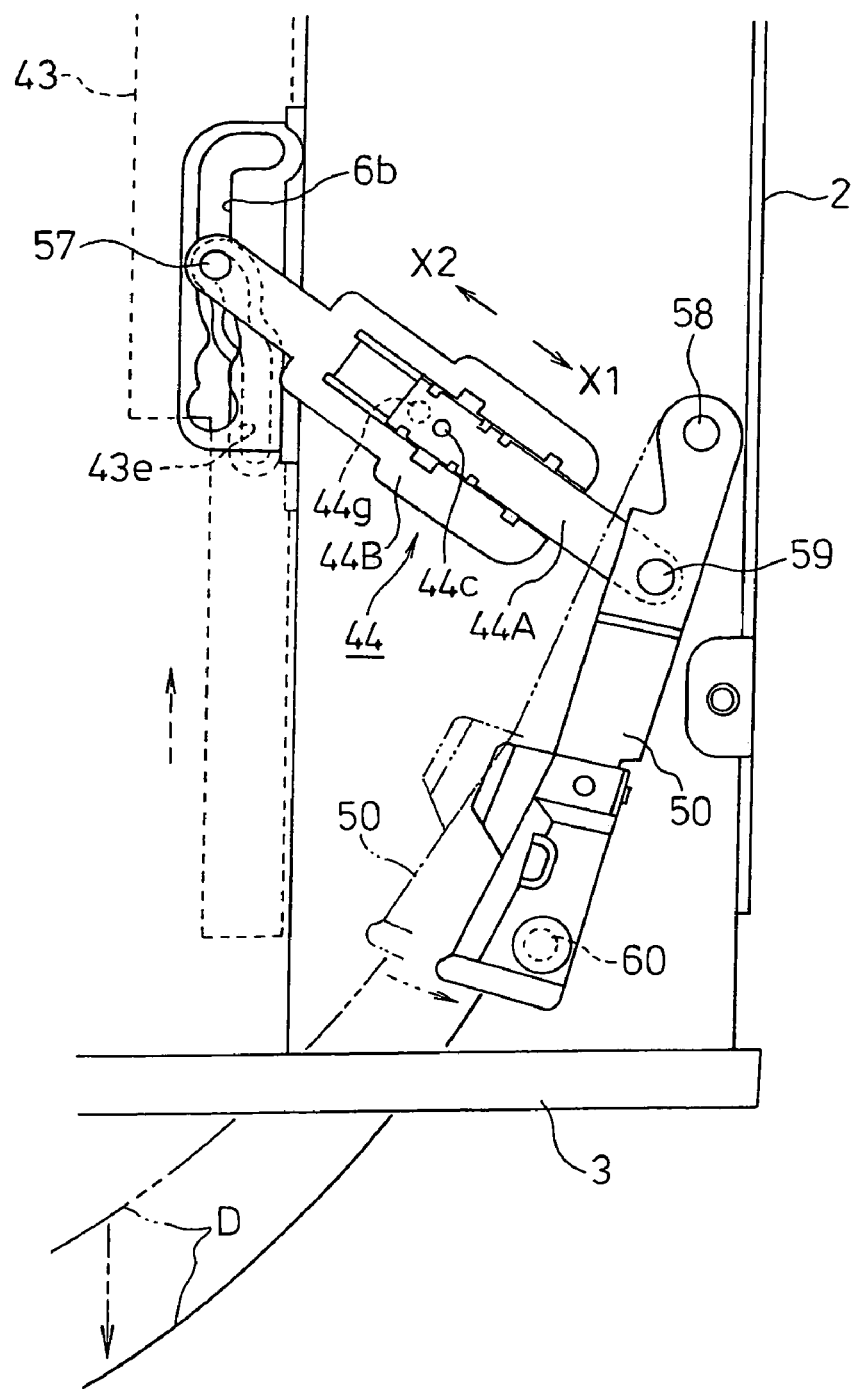
FIG. 37 is a plan view for explaining an operation state of the lever arm.

FIG. 37 is a plan view for explaining an operation aspect of the lever arm 44 when a user pulls out the disc D during the loading operation.

In the loading process of the disc D, in other words, in a state in which the rack main body 43 retreats, and the leading arm 50 loads the disc D to the position indicated by an imaginary line, the disc D is pulled out in its unloaded direction. When the disc D reaches a position indicated by a solid line in the same figure, the leading arm 50 also rocks. At this time, the support piece 44B of the lever arm 44 is moved in direction of an arrow X2 because the traction of the lever arm 44 by the rack main body 43 continues, while the slide piece 44A is moved in a direction of an arrow X1 with the rocking of the leading arm 50.

Figure 38A:
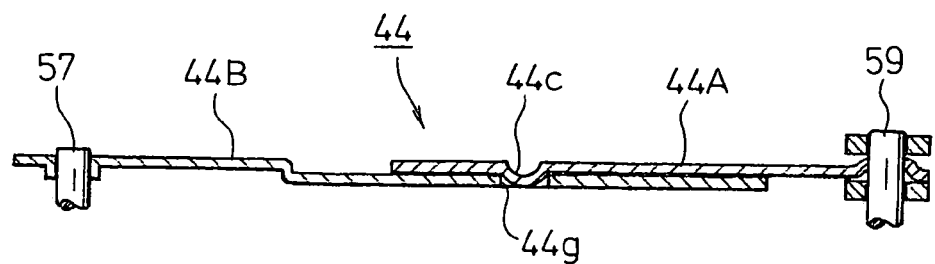
FIG. 38 is a sectional view for explaining the operation state of the lever arm.
Figure 38B:
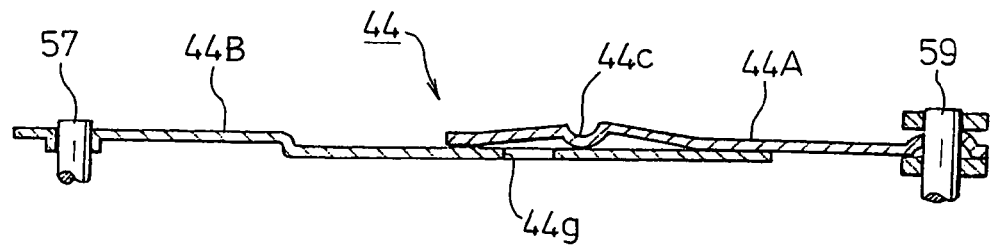

Under those situations, the slide piece 44A and the support piece 44B are moved in directions opposite to each other, thereby applying a load over a predetermined value to the locking protrusion 44c and through-hole 44g, as shown in FIG. 38A, which are in their engaged state. Thus, the above-mentioned engaged state which is locked by the reference length is released, as shown in FIG. 38B, and the slide piece 44A is sled in the direction of the arrow X1. As a result, a negative force which is created in the lever arm 44 from the leading arm 50 by the operation of pulling out the disc D is absorbed by the sliding of the slide piece 44A, so that the leading arm 50, the lever arm 44 and the driving mechanism for driving the lever arm 44 can be prevented from being damaged.

When the damage accompanying the operation of pulling out the disc D is prevented in that way, an error detecting operation which will be described below reverses the driving mechanism at that point of time, so that the carrying of the disc D can be reversed in the unloading direction. In this case, the slide piece 44A of the lever arm 44, as shown in FIG. 37, is in a state that is extended from a position in its normal state. However, in the process that reaches the initial state in FIG. 32, the support piece 44B is pushed into the slide piece 44A, which returns the lever arm 44 to a state locked by the reference length in its normal state.

Meanwhile, in the above-described construction of the present invention, the engaged state between the locking protrusion 44c and the through-hole 44g of the lever arm 44 is adjusted, so that the timing at which the engagement is released corresponding to the magnitude of the load can be set. Further, the above embodiment has been described in conjunction with the construction in which the slide piece 44A and the support piece 44B are formed in a shape of a thin plate. However, the present invention is not limited thereto as long as the reference length of the lever arm 44 in its normal state can be put into a locked state and the extension or retraction thereof is allowed.

[Clamp Safety Mechanism]

FIG. 39, FIG. 40, FIG. 41, FIG. 42 and FIG. 43 show only principal parts for explaining a safety mechanism of a clamping operation in the disc apparatus 1.

The stopper 72 is provided to be rotatable about a shaft 72a on the base panel 6.

A leaf spring 83 is hitched in a direction that always biases a tongue piece 72b of the stopper 72 in a direction that discharges a disc.

In the vicinity of the opening 73, a prop 84 formed by cutting and erecting the base panel 6 is provided.

Figure 39:
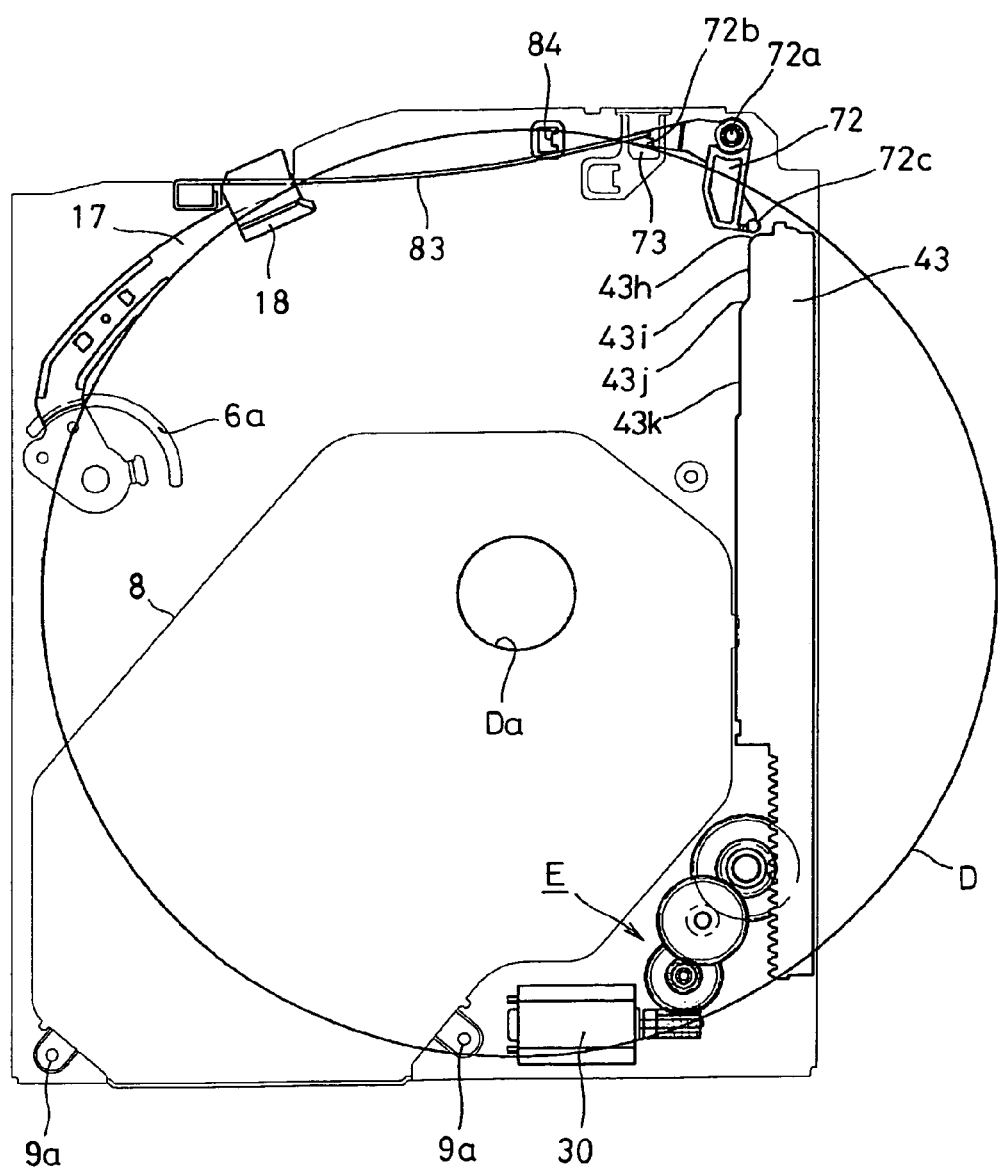
FIG. 39 is a figure showing a first step of the positional relationship between a rack main body and a stopper in a normal operation.
Figure 40:
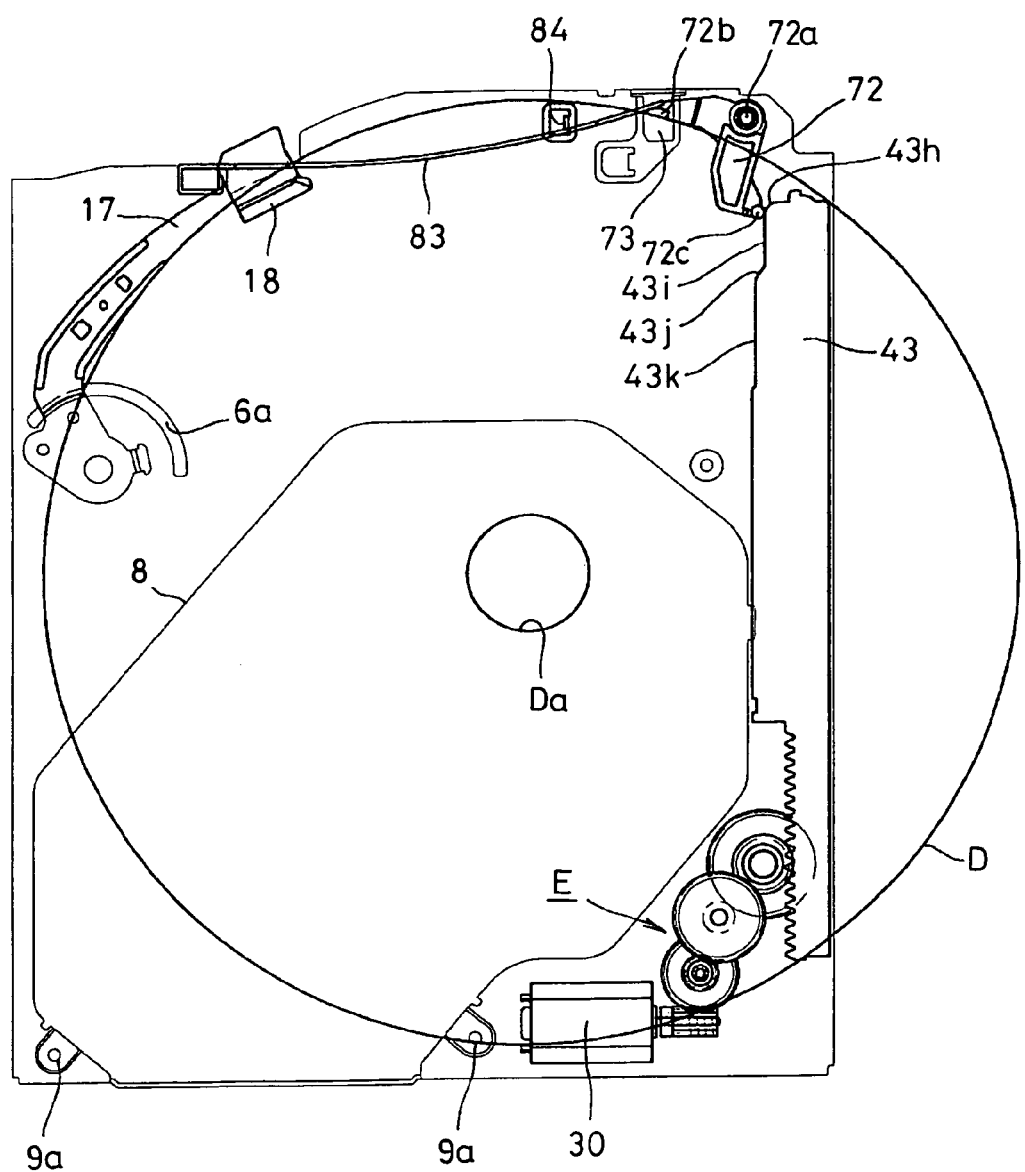
FIG. 40 is a figure showing a second step of the positional relationship between the rack main body and the stopper in the normal operation.
Figure 41:
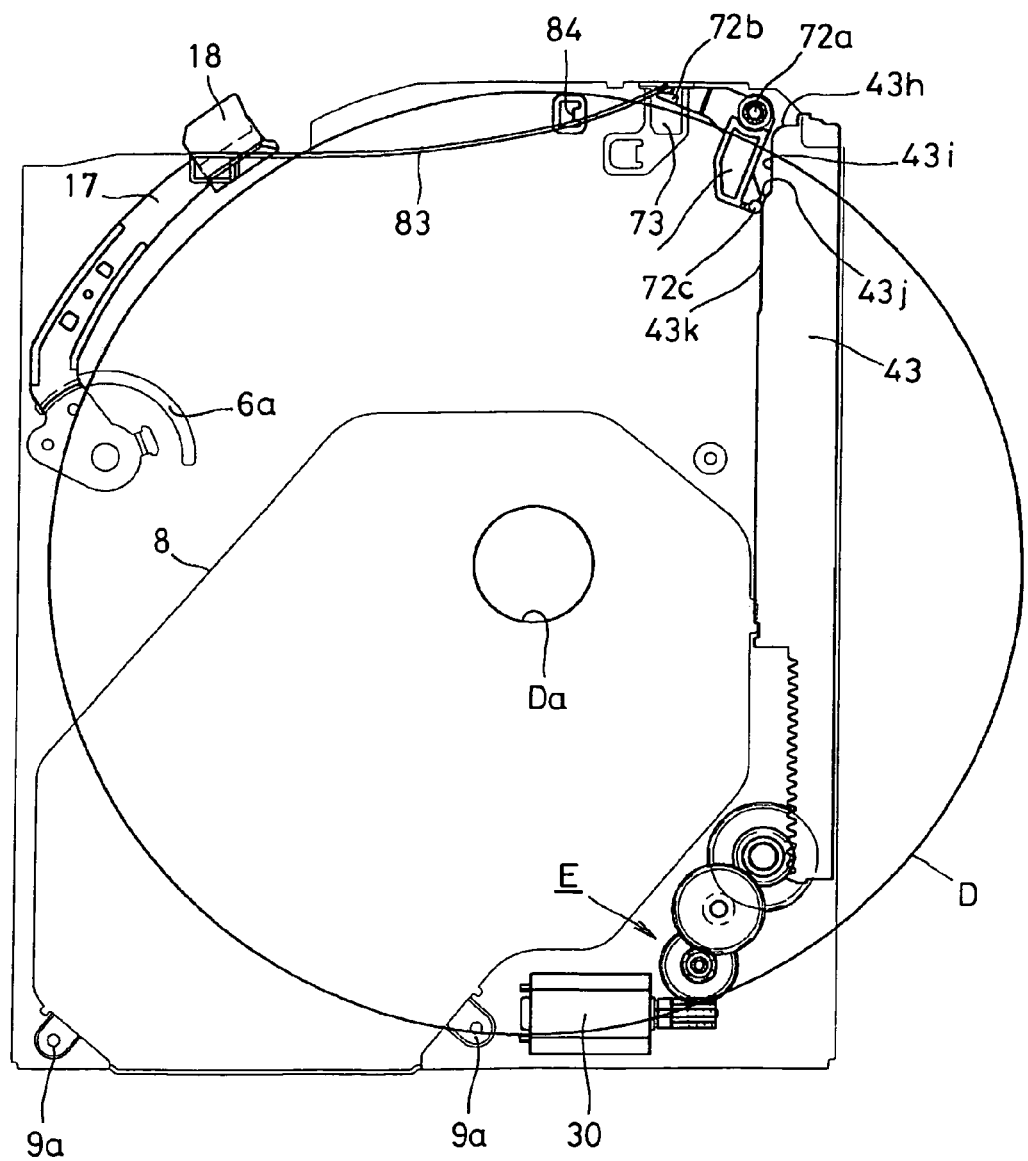
FIG. 41 is a figure showing a third step of the positional relationship between the rack main body and the stopper in the normal operation.

FIG. 39, FIG. 40 and FIG. 41 are schematic views respectively showing an operation when the disc D is normally clamped.

In FIG. 39, at timing that a terminating end of the rack main body 43 gets closer to the stopper 72, the circumferential edge of the disc D pushes the tongue piece 72b of the stopper 72. Then, the stopper 72 rotates in the clockwise direction about the shaft 72a. At this time, a tip 72c of the stopper 72 does not come in contact with the rack main body 43.

At this time, the leaf spring 83 that is being pressing the stopper 72 does not contact with the prop 84. In other words, the stopper 72 is in a state that receives a weak biasing force from the overall length of leaf spring 83. Accordingly, the stopper 72 is easily rotated by a pressing force applied from the circumferential edge of the disc D when the disc D is pulled in by the leading arm 50.

In FIG. 40, the tip 72c of the stopper 72 comes in contacts with a first inclined portion 43h of the rack main body 43. In this state, the stopper 72 further rotates in the clockwise direction with the retreating movement of the rack main body 43, which results in releasing the restriction on the rack main body 43.

Thereafter, as the rack main body 43 moves, the tip 72a of the stopper 72 is brought into sliding contact with a first long side 43i of the rack main body 43. Then, the leaf spring 83 that is being pressing the stopper 72 comes in contact with the prop 84. Then, the state of the stopper 72 is changed from the state that receives a weak biasing force from the leaf spring 83, to a state that receives a large biasing force because the scope within which the biasing force of the leaf spring 83 is applied is narrowed up to the prop 84. Then, when the disc D is pulled out by the leading arm 50, since it is difficult for the tongue piece 72b of the stopper 72 to move against the pressing force applied from the circumferential edge of the disc D, the tongue piece 72b of the stopper 72 regulates the movement of the disc D against the pressing force that is applied from the circumferential edge of the disc D.

The position of the tongue piece 72b of the stopper 72 at this time is a position where the central hole Da of the disc D coincides with the clamping head 7. In other words, the tongue piece 72b of the stopper 72 at this time can prevent a shift in the position of the disc D during the clamping operation, and can serves as a guide for reliably performing the clamping operation.

In the first long side 43i of the rack main body 43, the length of the first long side is a process itself in the middle of the clamping operation, and the position thereof is a regulating position for making the tongue piece 72b of the stopper 72 serve as a guide member of the clamping operation.

In FIG. 41, immediately before the completion of the clamping operation, the tip 72c of the stopper 72 goes over the first long side 43i of the rack main body 43, passes by a second inclined portion 43j, and comes in contact with the second long side 43k, and the stopper 72 further rotates in the clockwise direction. Then, the tongue piece 72b of the stopper 72 is slightly separated from the circumferential edge of the disc D, and is located at a position that does not obstruct the rotation of the disc D. Specifically, if the clamping operation has been completed, the roll of the tongue piece 72b of the stopper 72 as a guide comes to an end. Thus, it is necessary to separate the tongue piece 72b of the stopper 72 away from the disc D. This operation is realized by a position regulated by the second long side 43k of the rack main body 43.

Figure 42:
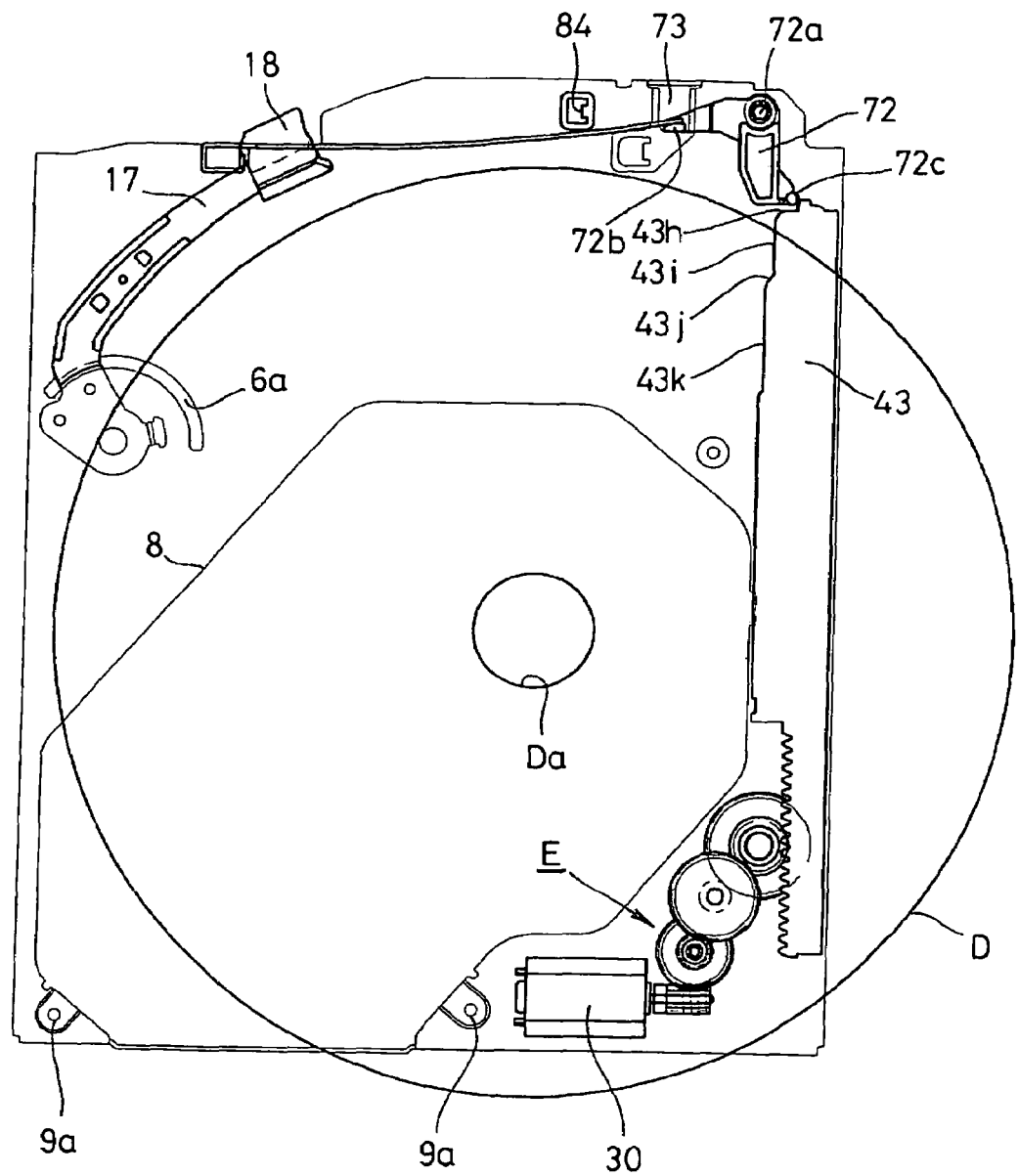
FIG. 42 is a figure showing a first step of the positional relationship between the rack main body and the stopper in an abnormal operation.
Figure 43:
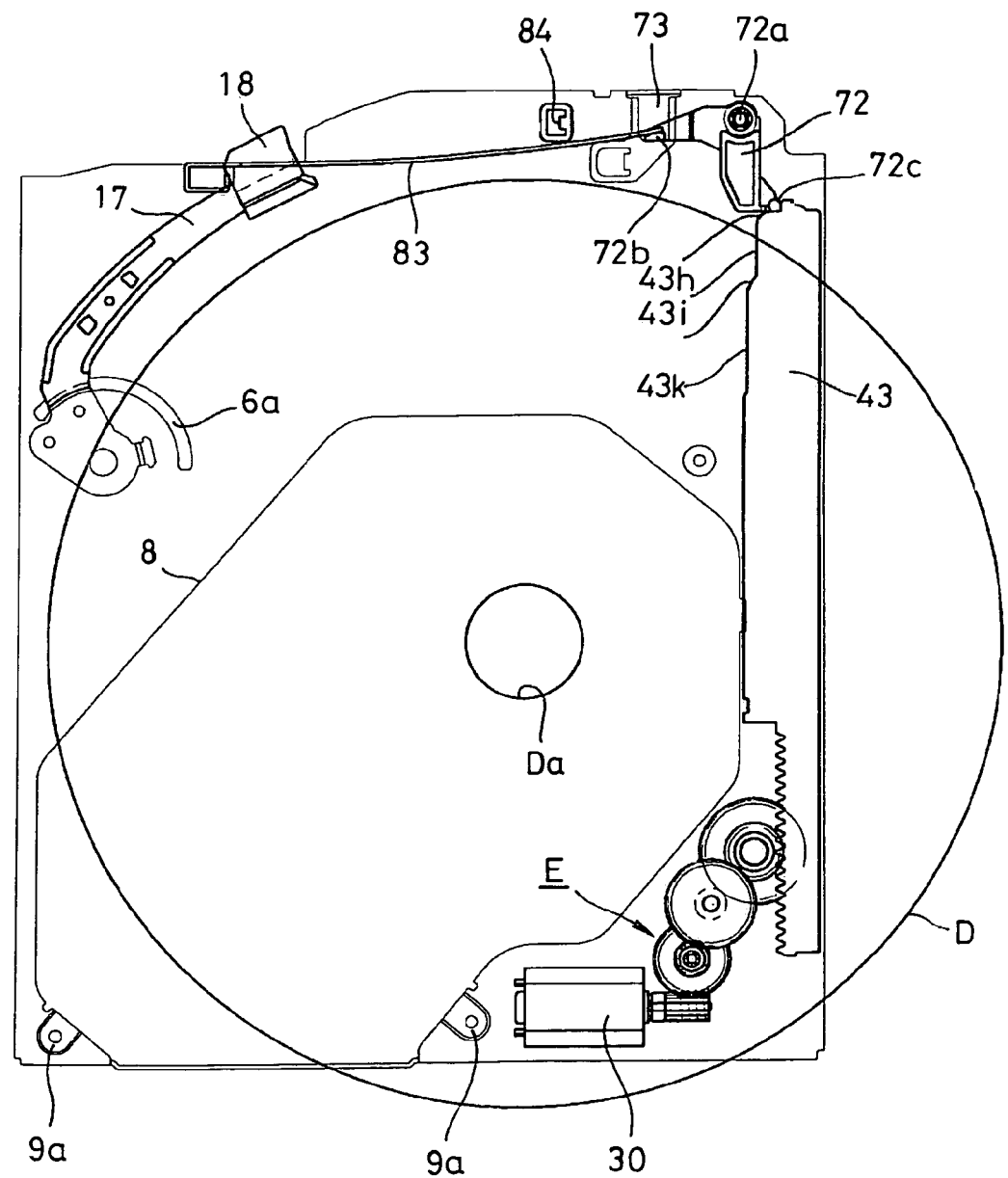
FIG. 43 is a figure showing a second step of the positional relationship between the rack main body and the stopper in an abnormal operation.

FIGS. 42 to 43 are schematic views respectively showing the operation when an operator intends to pull out the disc D during the process of loading the disc D.

In FIG. 42, at timing that the terminating end of the rack main body 43 gets closer to the stopper 72, the operator intends to pull out the disc D. Thus, the circumferential edge of the disc D does not push the tongue piece 72b of the stopper 72.

In FIG. 43, the terminating end of the rack main body 43 comes in contact with the tip 72c of the stopper 72. The stopper 72 is located to limit the movement of the rack main body 43, so that when the rack main body 43 moves and comes in contact with the stopper 72, the rack main body 43 cannot move any more. The rack main body 43 is provided with the cam groove 43c and the cam groove 43d, which performs the clamping operation, and the stopper 72 limits the movement of the rack main body 43, so that the follower pin 53 cannot be moved to the inclined portion P3 of the cam groove 43c and the cam groove 43d. As a result, the clamping operation by the rack main body 43 is forbidden.

Figure 44:
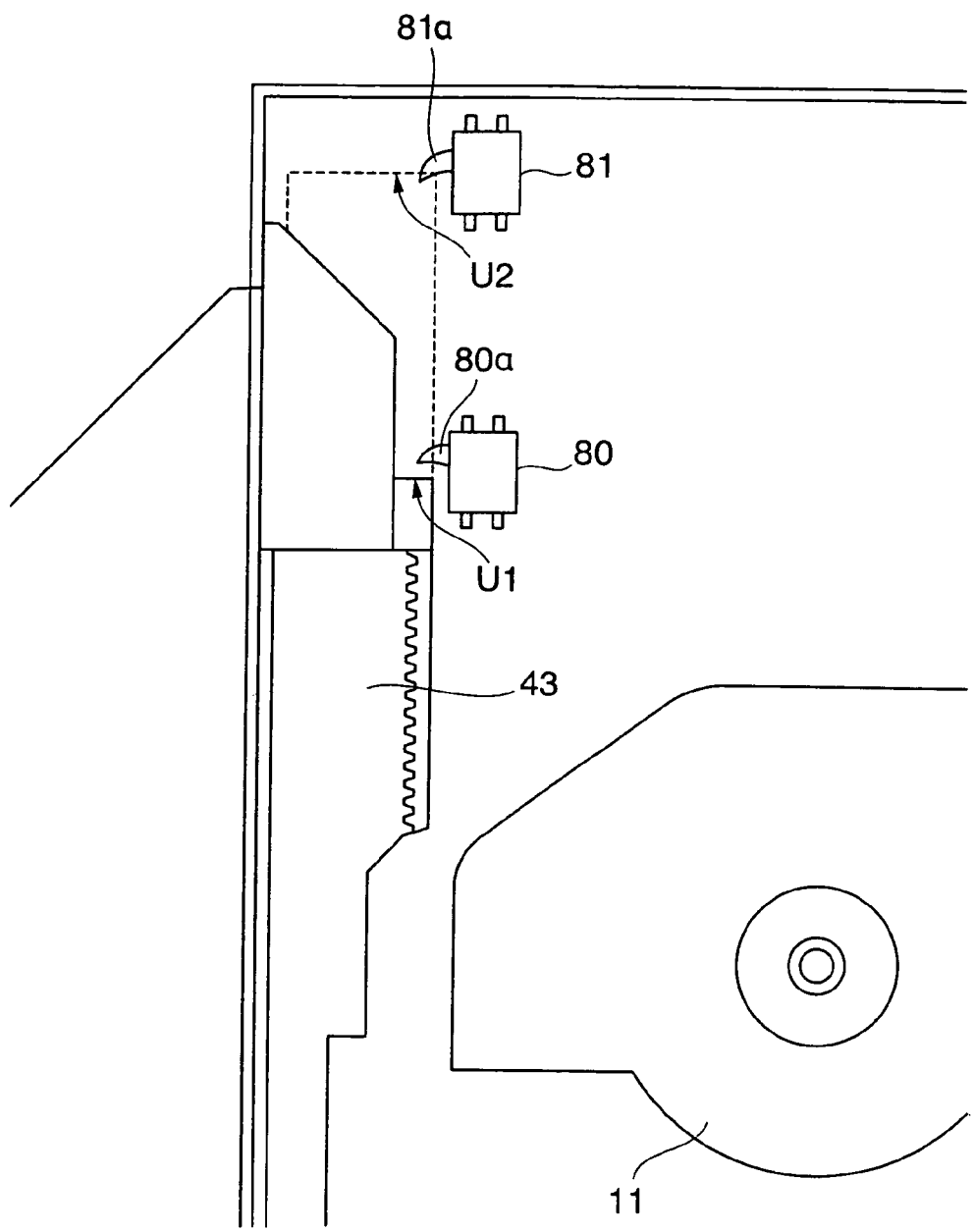
FIG. 44 is a partially enlarged view of FIG. 4, showing the positional relationship between the rack main body and an ejection completion detecting switch or a loading completion detecting switch.

FIG. 44 is an enlarged of an upper left portion of FIG. 4, which shows principal parts only.

One end of the rack main body 43 moves between a position U1 and a position U2.

The position U1 is a state in which the rack main body 43 is moving in a certain direction (front side) of the bezel 3 of the disc apparatus 1, and the disc D is not clamped. In this state, the detecting piece 80a of an ejection completion detecting switch 80 is separated from one end of the rack main body 43, and the ejection completion detecting switch 80 is turned off. Similarly, a detecting piece 81a of a loading completion detecting switch 81 as clamping completion detecting means is separated from one end of the rack main body 43, and the loading completion detecting switch 81 is also turned off.

The position U2 is a state in which the rack main body 43 is moving in a direction (rear side) opposite to the certain direction of the bezel 3 of the disc apparatus 1, and the disc D is clamped. In this state, the detecting piece 80a of the ejection completion detecting switch 80 comes in contact with a lateral face of the rack main body 43, and the ejection completion detecting switch 80 is also turned on. Similarly, the detecting switch 81a of the loading completion detecting switch 81 is pushed by means of one end of the rack main body 43, and the loading completion detecting switch 81 is also turned on.

In other words, the loading completion detecting switch 81 is turned on, whereby the loading motor 30 is turned off. As a result, the loading operation that pulls in the disc D and clamps it is completed.

Further, the ejection completion detecting switch 80 is turned off, whereby the loading motor 30 is turned off. As a result, the ejecting operation that releases the clamping the disc D and ejects it is completed.

Figure 45:
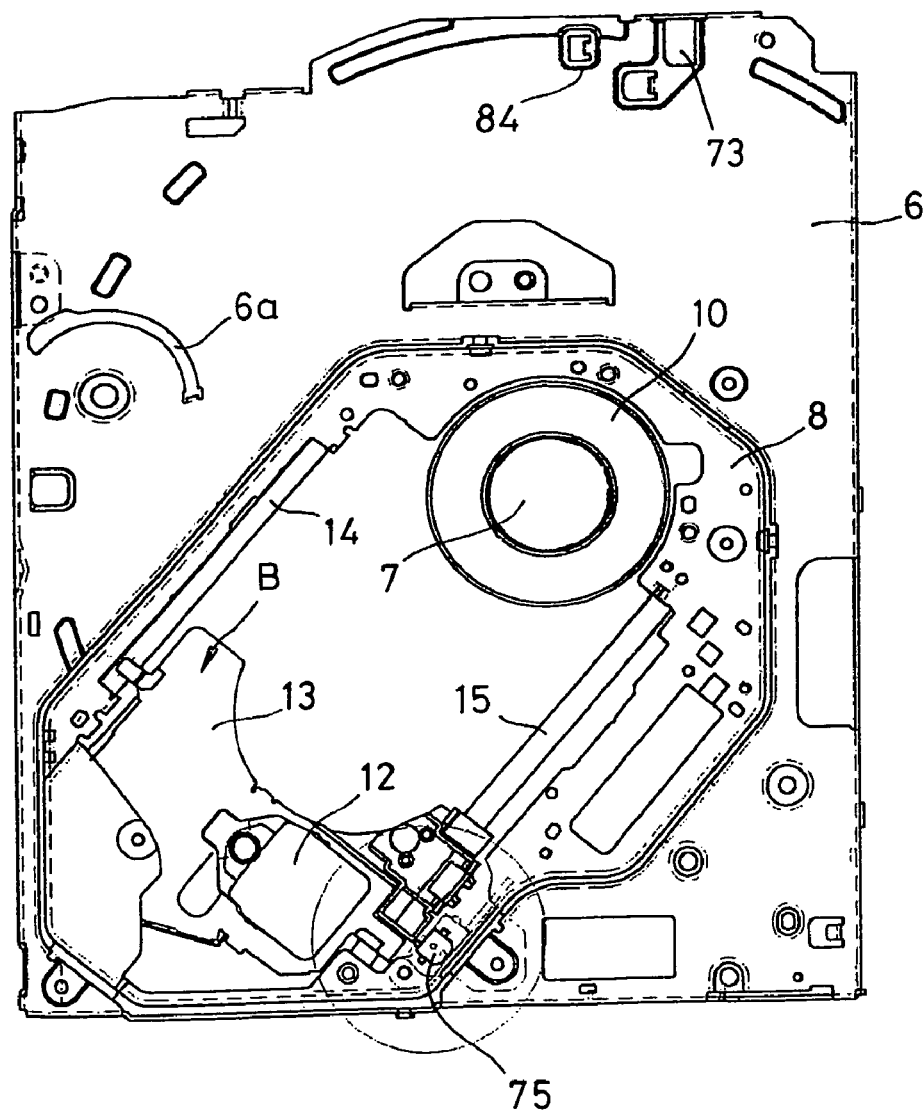
FIG. 45 is a plan view showing the positional relationship of an outermost circumferential position detecting switch, with a base panel as a main portion extracted.

FIG. 45 is a plan view showing principal parts which are extracted from around the base panel 6 of the disc apparatus 1 in FIG. 2. This figure is different from FIG. 2 in that the entries of reference numerals of several parts are omitted.

An outermost circumferential position detecting switch 75 is provided at a place of the carrier block 13 close to a guide shaft 15. When the carrier block 13 reaches the outermost circumferential position, the outmost circumferential position detecting switch 75 comes in contact with the carrier block 13 and is then turned off.

Figure 46:
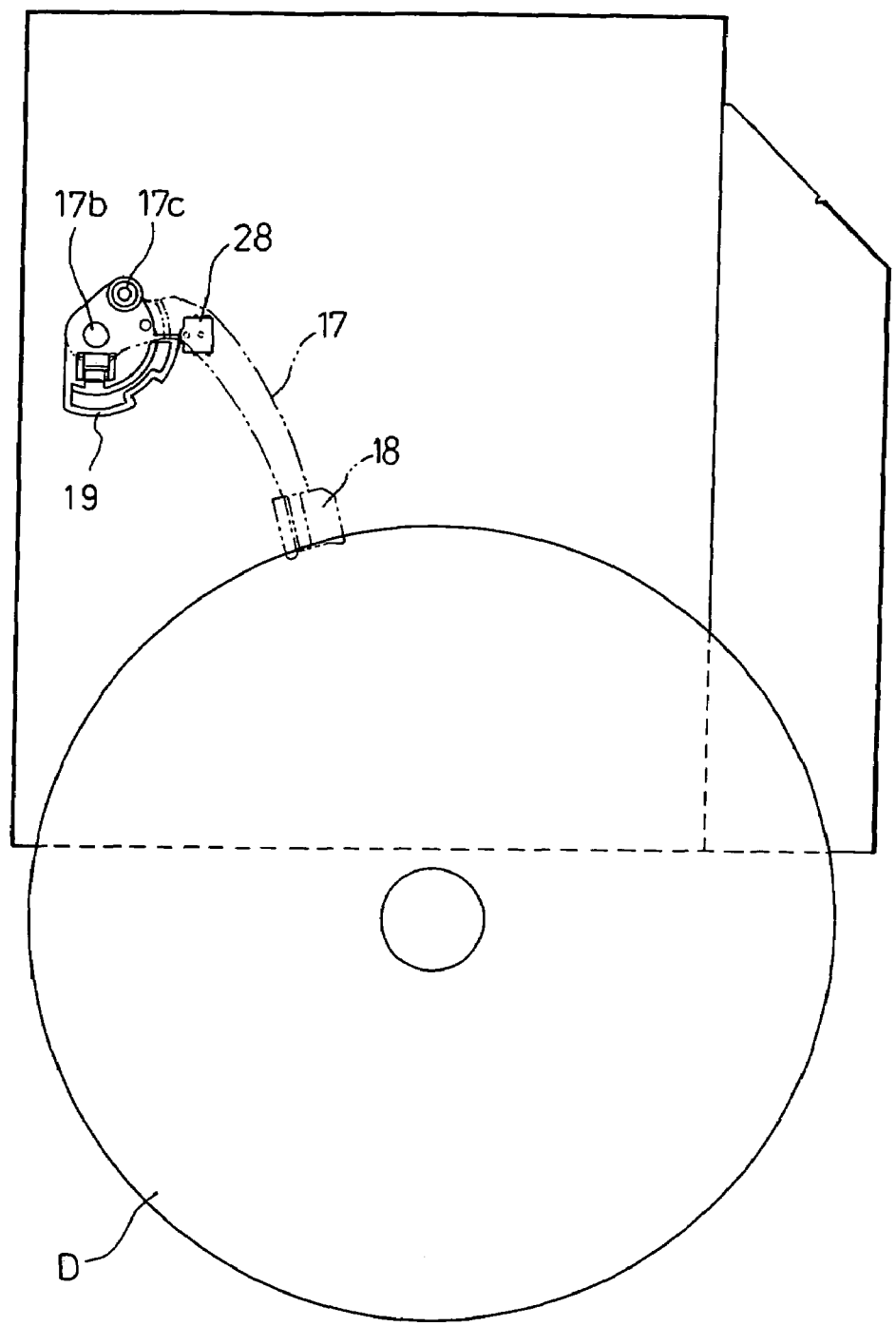
FIG. 46 is a figure for explaining a disc support arm and an angular position detecting switch.

FIG. 46 is a plan view showing the relationship between the disc support arm 17 and the angular position detecting switch 28, of the disc apparatus 1.

Figure 47:
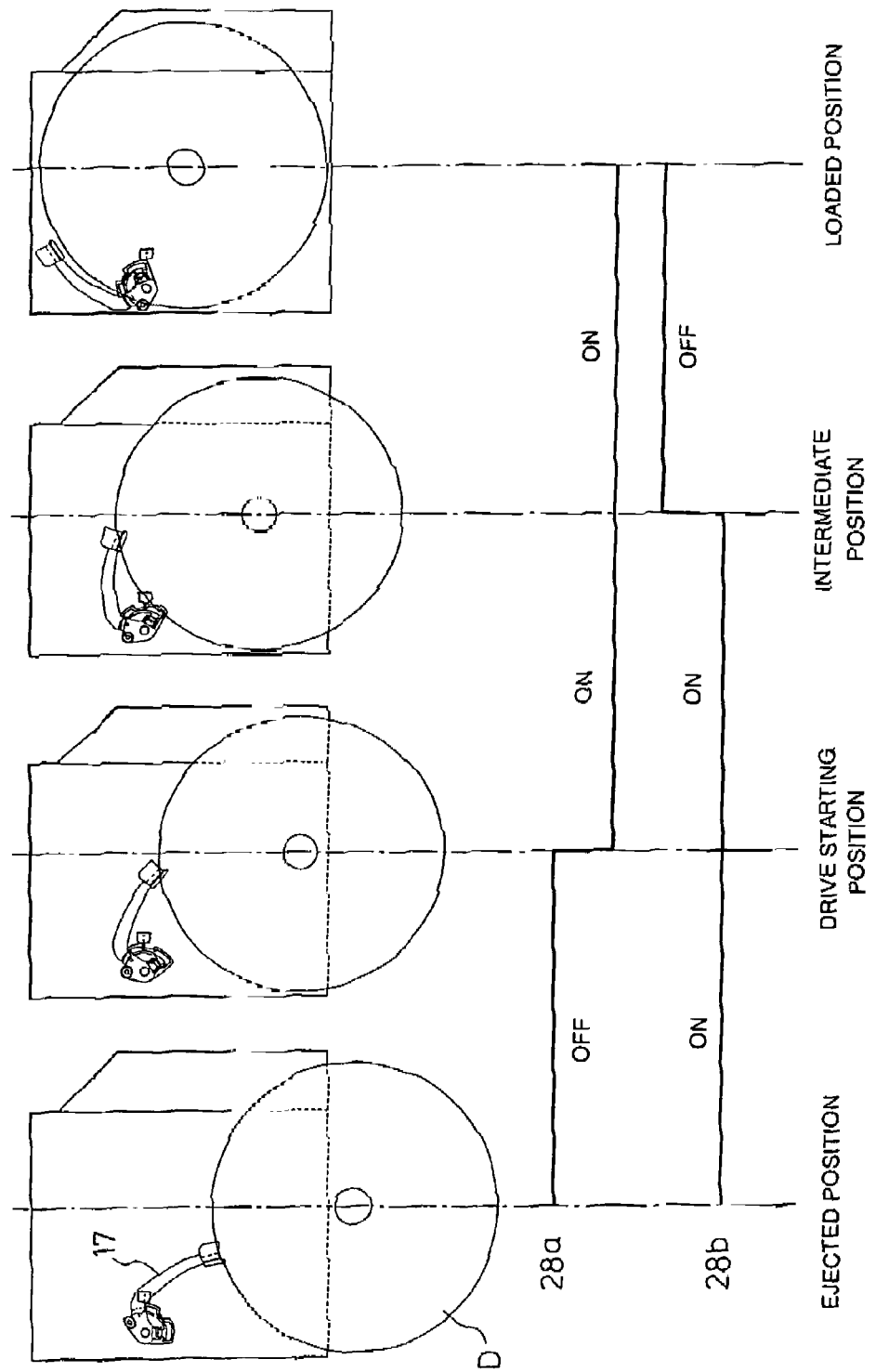
FIG. 47 is a figure showing the positional relationship of the disc and a state of the angular position detecting switch.

FIG. 47 is a schematic view, which is also used as a timing chart, showing the state and operation of the disc apparatus 1.

FIGS. 48 to 51 are enlarged plan views showing the status of the support plate 19 and the angular position detecting switch 28 of the parts shown in FIG. 47.

The disc support arm 17 is provided with the support plate 19 which rotates in cooperation therewith.

At the circumferential portion of the support plate 19, a portion whose both ends protrude radially, and a portion which is radially recessed between the both ends, constitutes a cam.

The angular position detecting switch 28 operated by the support plate 19 is provided near to the support plate 19.

The support plate 19 is provided for driving an operating piece 28c of the angular position detecting switch 28. When the support plate 19 rotates, the operating piece 28c is varied in angular position to the left, middle and right with respect to a main body of the angular position detecting switch 28 depending on the angular position of the support plate 19.

Two switches are built in the angular position detecting switch 28.

The angular position detecting switch 28 is constructed to stabilize the operating piece 28c at its middle position by means of a spring built therein. When the operating piece 28c falls down to one side, one switch is exclusively turned off, whereas when the operating piece 28c falls down to the other side, the other switch is exclusively turned off. At the middle position of the operating piece 28c, both the two switches are kept turned on.

Figure 52:
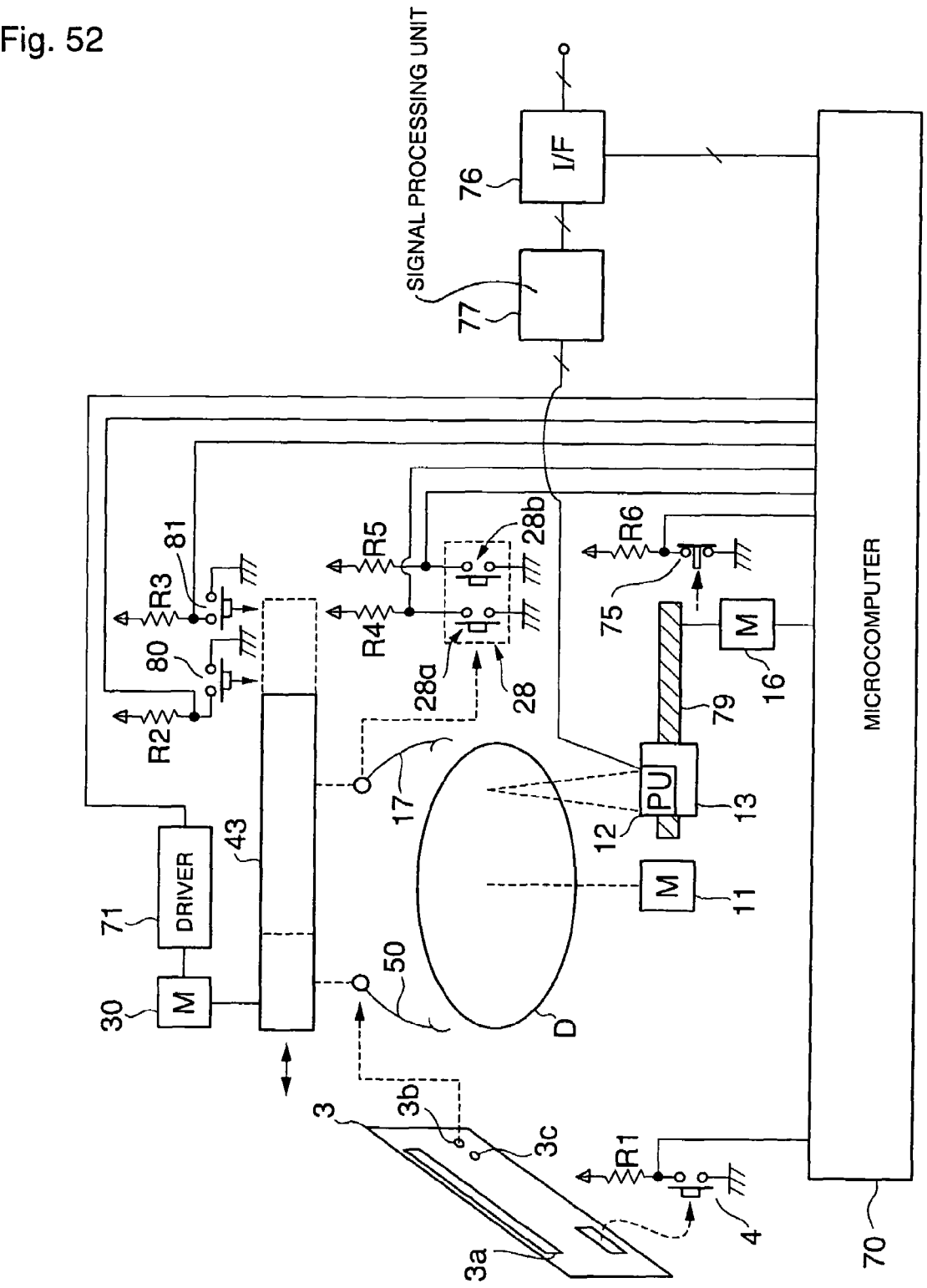
FIG. 52 is a figure for explaining a control unit of the disc apparatus.

FIG. 52 is a block diagram showing the disc apparatus 1 of slot-in type on the basis of a control means thereof. A microcomputer 70 as the control means includes a known one that has a ROM, a RAM, a CPU, buses, and the like therein, all of which are not shown.

The ejection switch 4, the thread motor 16, the angular position detecting switch 28, a motor driver 71, the outermost circumferential position detecting switch 75, a data processing unit 76, and the ejection completion detecting switch 80, and the loading completion detecting switch 81 are connected to the buses of the microcomputer 70.

Other various components than the above ones are connected to the microcomputer 70. However, the relationship of connection between or the illustrations of components which are not directly related to the present invention will be omitted.

The ejection switch 4 is a known push button controlled type switch which is disposed in the vicinity of the slot 3a of the bezel 3.

Further, the bezel 3 is provided with the through-hole 3b and 3c. By inserting an ejection pin (not shown) through the through-holes 3b and 3c, the rack main body 43 is driven by means of the above-mentioned emergency ejection mechanism so that the disc D can be manually ejected.

Meanwhile, the ejection pin is a known wire-like pin which is used for an emergency ejection mechanism in a conventional optical disc apparatus.

The thread motor 16 is a motor for driving a lead screw 79 to cause the carrier block 13 having the optical pickup 12 placed thereon to reciprocate in the radial direction of the disc D, and for moving the carrier block 13 to a position remotest from the driving shaft of the spindle motor 11 when being shifted to an ejection preparation state which will be described below.

The outermost circumferential position detecting switch 75 is provided inside the frame member 8, and when the carrier block 13 moves toward the outermost circumferential edge of the disc and reaches a mechanical stop position, the switch is pressed and turned off by the carrier block 13.

Meanwhile, the mechanical stop position is hereinafter referred to as "outermost circumferential position of disc".

The motor driver 71 is provided for supplying electric power to the loading motor 30, and is constructed by, for example, a circuit based on a power transistor.

The microcomputer 70 performs two-state power control over the motor driver 71. This power control will be described below.

The data processing unit 76 supplies information read from the optical pickup 12 via a signal processing circuit 77, to a host system through an ATAPI interface, and takes operation command of the microcomputer 70 according to various commands from the host system.

As described above, the ejection completion detecting switch 80 is separated at a position where the rack main body 43 driven by the loading motor 30 completes the ejecting operation. In other words, the ejection completion detecting switch 80 is a switch which detects what the rack main body 43 has reached a point of time of the completion of the ejecting operation.

As described above, the loading completion detecting switch 81 is pressed at a position where the rack main body 43 driven by the loading motor 30 completes the clamping operation. In other words, the loading completion detecting switch 81 is a switch which detects what the rack main body 43 has reached a point of time of the completion of the loading operation.

As described above, the angular position detecting switch 28 has two switches consisting of the drive starting position detecting switch 28a and the intermediate position detecting switch 28b built therein.

The ejection switch 4, the ejection completion detecting switch 80, the loading completion detecting switch 81, the drive starting position detecting switch 28a and intermediate position detecting switch 28b, which are built in the angular position detecting switch 28, and the outermost circumferential position detecting switch 75 are respectively pulled up to a power supply voltage via resistors R1, R2, R3, R4, R5 and R6, and has 0 V in their ON state.

[Loading Control]

From now on, functions related to the operation of loading control will be described.

Figure 53:
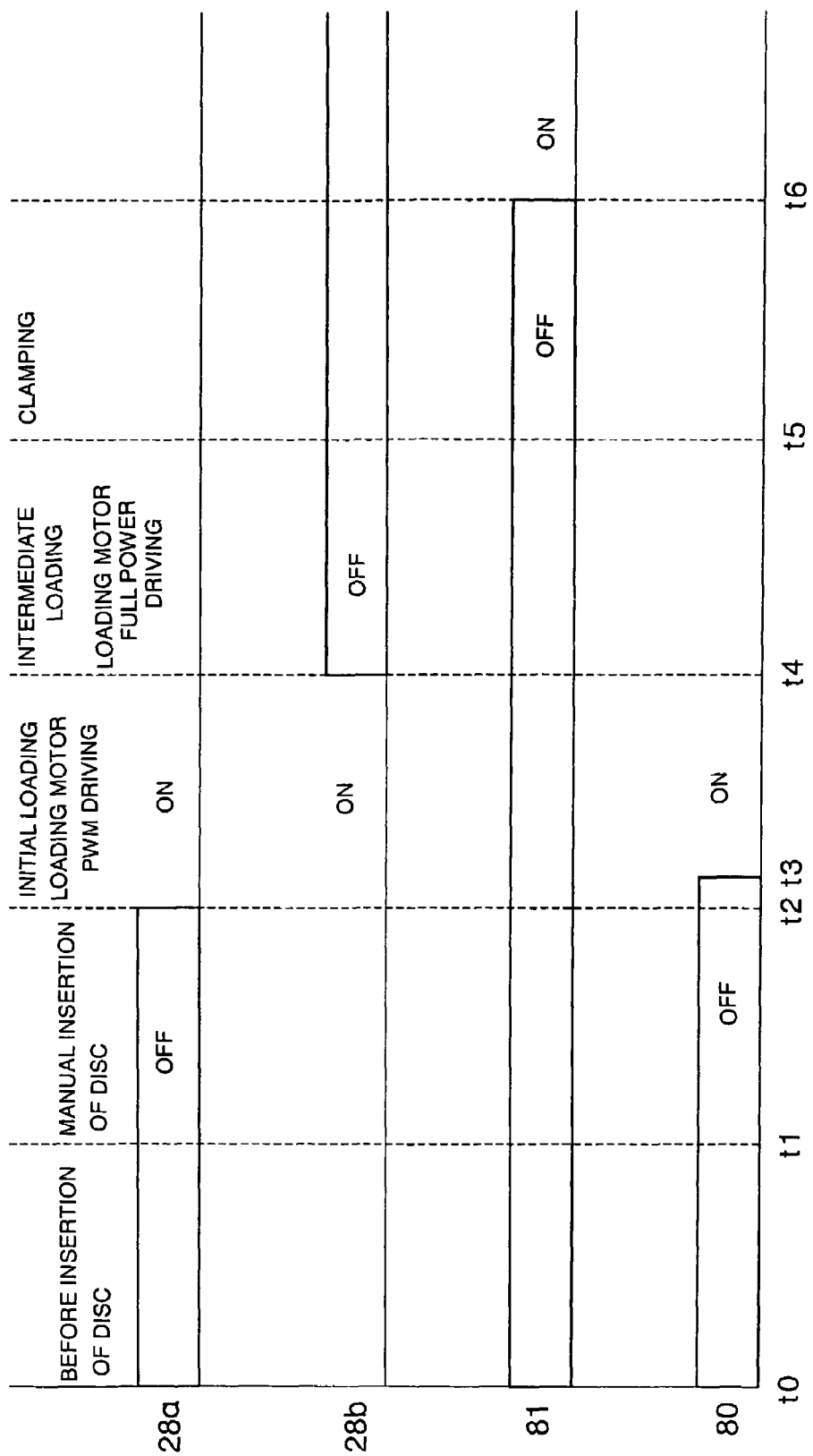
FIG. 53 is a time chart showing a change in logic of the respective detecting switches in the disc loading operation.

FIG. 53 shows a logical state between the drive starting position detecting switch 28a and the intermediate position detecting switch 28b, which are built in built in the angular position detecting switch 28, the ejection completion detecting switch 80, the loading completion detecting switch 81, when the disc D is inserted into the disc apparatus 1 to perform a loading operation.

A point of time t0 indicates a state before the disc D is inserted into the slot 3a, and a point of time t1 indicates a state in which, after the disc D is inserted into the slot 3a, the circumferential edge of the disc D comes in contact with the disc support arm 17.

Figure 48:
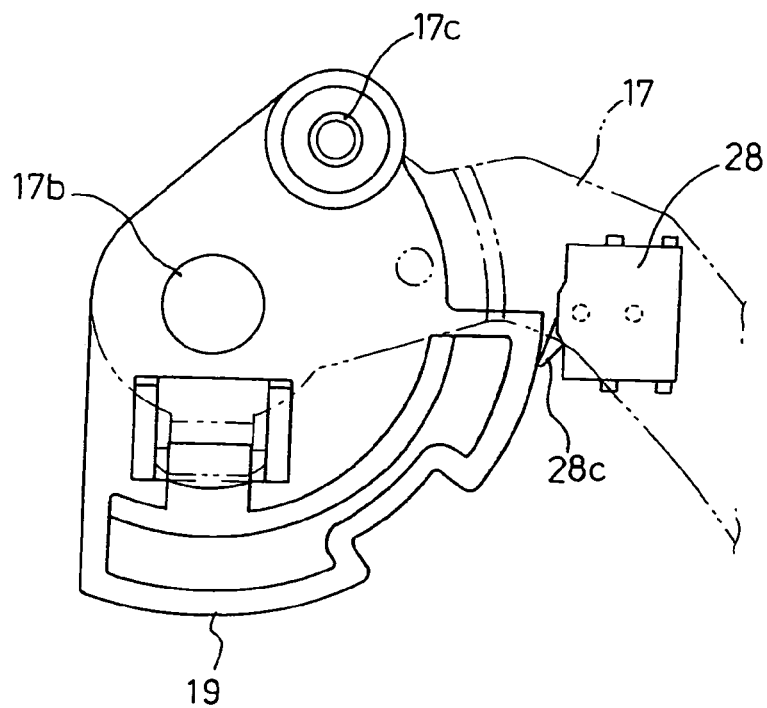
FIG. 48 is a figure showing a first step of the positional relationship between the angular position detecting switch and a cam.

A period from the point of time t0 to the point of time t1 corresponds to the "ejecting position" in FIG. 47 and the state in FIG. 48.

The ejecting position is a position where a user pushes the disc D into the disc apparatus 1, and the disc D merely touches the holder 18. In other words, the ejecting position is a position when the disc D is ejected from the disc apparatus 1, and the disc support arm 17 is swung up to complete the ejecting operation. At this position, the operating piece 28c is in contact with a first protruding portion of the support plate 19, and is swung downward in FIG. 48.

At this point of time, the drive starting position detecting switch 28a, the ejection completion detecting switch 80 and the loading completion detecting switch 81 are turned off, and the intermediate position detecting switch 28b is turned on.

During a period immediately before a point of time t2 from the point of time t1, a user further pushes the disc D into the disc apparatus 1 from the state in FIG. 48, to thereby rotate the disc support arm 17, while the operating piece 28c comes in contact with the first protruding portion of the support plate 19 to continue to be in sliding contact therewith.

Up to this point of time, the logical states of the respective switches do not change from the state at the point of time t1.

Figure 49:
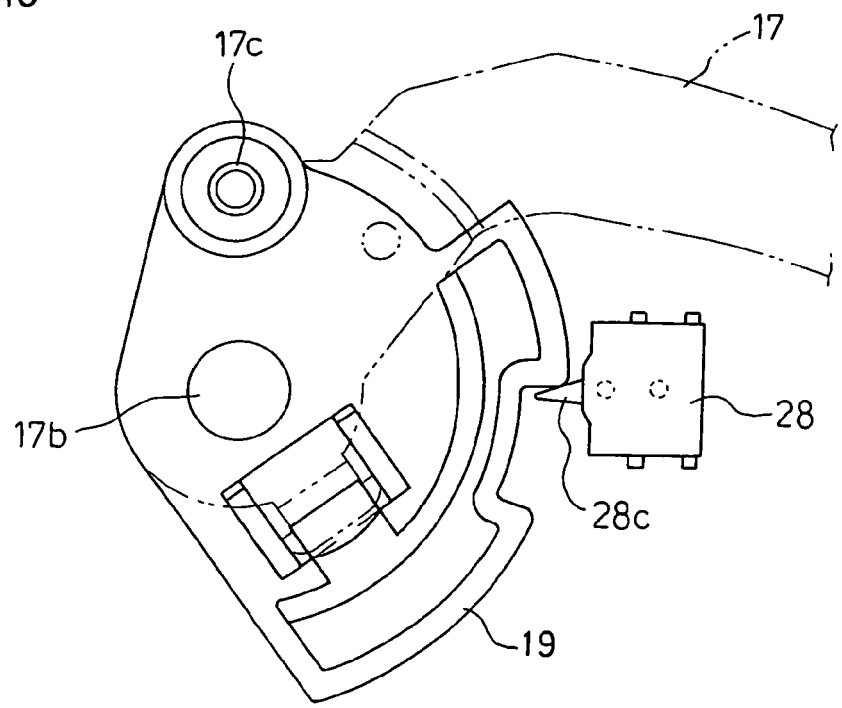
FIG. 49 is a figure showing a second step of the positional relationship between the angular position detecting switch and the cam.

The point of time t2 indicates a state in which the disc D pushes in the disc support arm 17 and the drive starting position detecting switch 28a is turned on, and corresponds to the "drive starting position" in FIG. 47 and the state in FIG. 49.

In other words, at the point of time t2, a user further pushes the disc D into the disc apparatus 1 from the state in FIG. 48, and the disc D pushes in the disc support arm 17 via the holder 18.

Thereby, the support plate 19 rotates, and the operating piece 28c reaches the recessed portion of the support plate 19.

Since the recessed portion of the support plate 19 is constructed so as not to narrowly come in contact with the operating piece 28c, the support plate 19 and the operating piece 28c is brought in no contact with each other.

In FIG. 49, the operating piece 28c keeps its middle position.

At this point of time, the drive starting position detecting switch 28a is switched from OFF to ON.

Meanwhile, the ejection completion detecting switch 80 and the loading completion detecting switch 81 are in their OFF state, and the intermediate position detecting switch 28b remains turned-on.

In response to the drive starting position detecting switch 28a being turned on, the microcomputer 70 supplies driving control signals in pulses to the motor driver 71. In other words, PWM control is carried out. In this embodiment, the PWM control is carried out using pulses having a duty ratio of 10%. As a result, an electric power whose source power is limited up to about 10% is supplied from the motor driver 71 to the loading motor 30.

Then, the loading motor 30 begins to rotate with a weak current, and the rack main body 43 is driven. In response to this operation, the leading arm 50 is driven. After a while, the roller 60 at the tip of the leading arm 50 comes in contact with the outer edge of the disc D. However, since the electric power supplied to the loading motor 30 through the PWM control by the microcomputer 70 is weak, it cannot generate an enough driving force to drive the disc D in its loaded direction or in its ejecting direction reverse to the loaded direction.

In other words, in this state, the pulling operation is substantially carried out by a force the pushes the disc D into the disc apparatus 1 with a user's hand. Then, while the roller 60 at the tip of the leading arm 50 comes in contact with the outer edge of the disc D, the disc D is entered in its loaded direction of the disc apparatus 1 by a force from the user's hand.

At this point of time, the loading motor 30 is not driven with its full power. This is because, if a force generated at a point where the roller 60 at the tip of the leading arm 50 comes in contact with the outer edge of the disc D is not turned to the loading direction of the disc apparatus 1, the force may be rather applied to the disc D in a direction that ejects the disc D.

After a while, the rack main body 43 moves, whereby the ejection completion detecting switch 80 is also turned on at a point of time t3. It is noted herein that this operation is directly related to the loading operation.

A point of time t4 indicates a state in which the disc D pushes in the disc support arm 17, and the intermediate position detecting switch 28b is turned off, and corresponds to the "intermediate position" in FIG. 47 and the state in FIG. 47.

At this point of time t4, the support plate 19 further rotates from the state in FIG. 49, and the operating piece 28c comes in contact with a second protruding portion from the recessed portion of the support plate 19.

Figure 50:
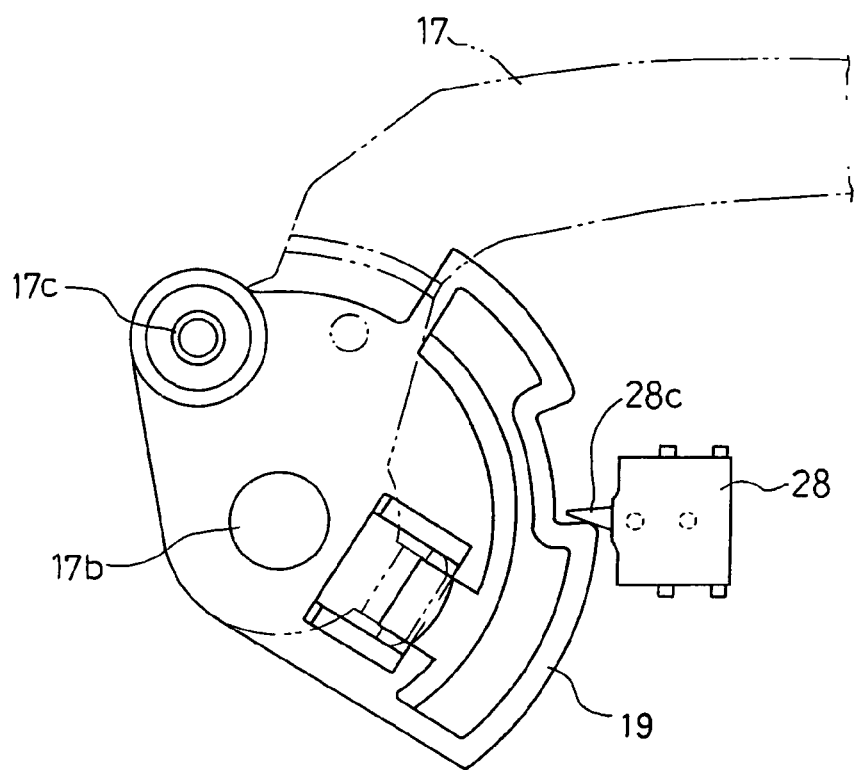
FIG. 50 is a figure showing a third step of the positional relationship between the angular position detecting switch and the cam.
Figure 51:
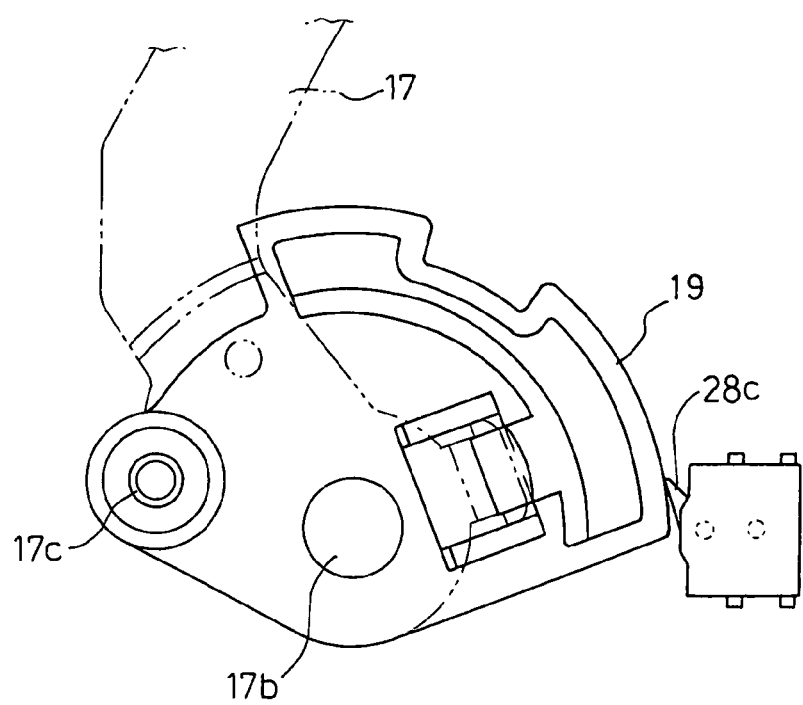
FIG. 51 is a figure showing a fourth step of the positional relationship between the angular position detecting switch and the cam.

The operating piece 28c comes in contact with the second protruding portion of the support plate 19, so that the operating piece 28c in FIG. 50 is slightly swung upward from the middle position.

At this time, a larger half of the disc D reaches the inside of the disc apparatus 1.

In response to the intermediate position detecting switch 28b being turned off, the microcomputer 70 supplies a DC driving control signals to the motor driver 71. Thereby, electric power whose source power is not limited is supplied from the motor driver 71 to the loading motor 30. Then, the loading motor 30 begins to rotate with a strong electric power, and the rack main body 43 is further driven. In response to this operation, the leading arm 50 is driven. At this point of time, since the roller 60 at the tip of the leading arm 50 has already come in contact with the outer edge of the disc D, the disc D is driven in its loaded direction.

Immediately before reaching a point of time t5, the circumferential edge of the disc D pushes the tongue piece 72b of the stopper 72. This allows the mechanical shift of the rack main body 43 to the clamping operation.

The point of time t5 indicates s a state in which the center of the disc D coincides with the clamping head 7 provided in the spindle motor 11, and the clamping operation begins, and the support plate 19 further rotates from the state in FIG. 50. In this state, the angular position detecting switch 28 does not have any logical change.

When the clamping operation proceeds from the point of time t5, the rack main body 43 turns on the loading completion detecting switch 81 at a point of time t6. This state corresponds to the "loaded position" in FIG. 47 and the state in FIG. 51.

In response to the loading completion detecting switch 81 being turned on, the microcomputer 70 controls to prohibit the supply of electric power to the motor driver 71. Then, the rotation of the loading motor 30 stops, thereby completing the loading operation. That is, the clamping operation is completed.

Figure 54:
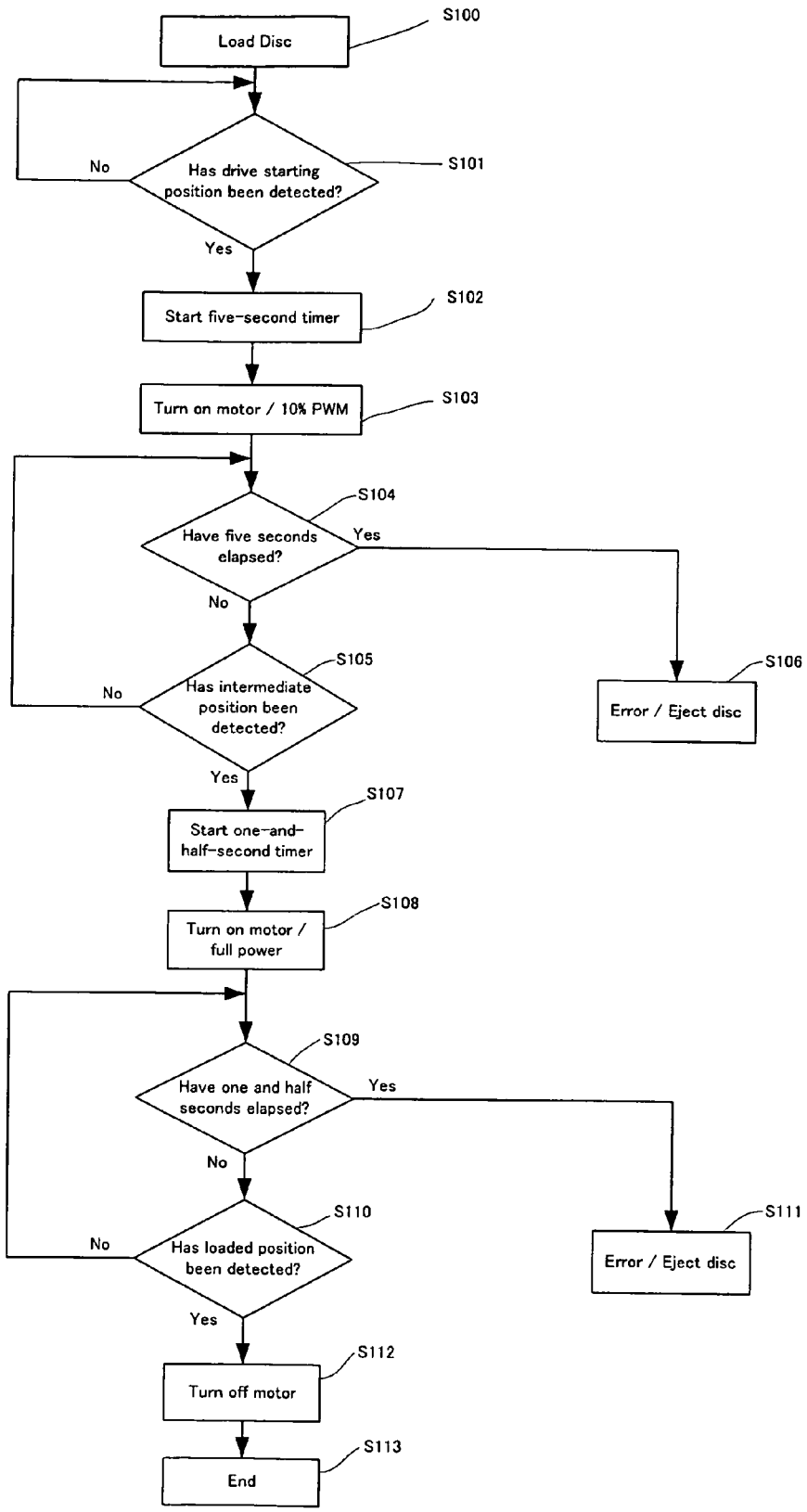
FIG. 54 is a flowchart for explaining the disc loading operation.

FIG. 54 is a flowchart of a disc loading operation that is performed by a microcomputer 70. A program related to this operation is stored in a ROM (not shown) which is located in the microcomputer 70.

In Step S100, the disc loading operation program starts. Then, in Step S101, it is determined whether or not the drive starting position detecting switch 28a is turned on. Polling is performed until the drive starting position detecting switch 28a is turned on.

When an operator inserts the disc D into the disc apparatus 1 with his/her hand, the circumferential edge of the disc D touches the holder 18 at the tip of the disc support arm 17, and the disc D is further pushed in, the drive starting position detecting switch 28a is turned on. If the drive starting position detecting switch 28a is turned on, a software timer that measures five seconds in Step S102 is started.

Next, in Step S103, the loading motor 30 is driven by the PWM driving of 10%. The loading motor 30 is rotationally driven with a weak electric power, the rack main body 43 is driven, and the leading arm 50 begins to be driven. After a while, the leading arm 50 follows the speed at which a user inserts the disc D, and the roller 60 at the tip of the leading arm 50 comes in contact with the rear end of the disc D. +ere, since the electric power applied to the loading motor 30 is weak, the leading arm 50 does not have an enough driving force to pushes in the disc D.

Next, in Step S104, while reading a value of a five-second timer, it is determined whether or not five seconds have elapsed from the point of time when the timer started, i.e., from the point of time when the disc D reached a drive starting position. If five seconds have not elapsed in Step S104, it is determined in next Step S105 that the intermediate position detecting switch 28b is turned off.

When the disc D is further pushed in from the point of time in Step S101 by the operation of inserting the disc D with a user's hand, the disc support arm 17 finally reaches an angular position that makes the intermediate position detecting switch 28b turned off. The microcomputer 70 returns to Step S104 and then monitors a five-second timer until the intermediate position detecting switch 28b is turned off in Step S105. If five seconds have elapsed, factors such as whether the loading operation by an operator's hand was too slow, or whether the operator pulled out the disc in the course of the loading operation or stopped the loading operation are considered. Thus, in Step S106, error processing that ejects the disc D is carried out, which completes the whole process.

If it is detected in Step S105 that the intermediate position detecting switch 28b is turned off, a software timer that measures one and half seconds is started in Step S107. Meanwhile, there is time of five seconds in Step S102 because of the loading operation is a manual loading operation, but there is time of one and half seconds because the loading operation is an automatic loading operation.

Next, in Step S108, the loading motor 30 is driven with its full electric power of 100%. The loading motor 30 is rotationally driven with this strong power, and the rack main body 43 is driven, and the leading arm 50 continues to be driven accompanying a strong driving force. Thereby, the leading arm 50 pushes in the rear end of the disc D with the strong driving force.

Next, in Step S109, while reading a value of an one-and-half timer, it is determined whether or not one and half seconds have elapsed from the point of time when the timer started, i.e., from the point of time when the disc D reached an intermediate position. If one and half seconds have not elapsed in Step S109, it is determined in next Step S110 that the loading completion detecting switch 81 is turned on.

When the disc D is pushed in by the leading arm 50 and reaches a clamping position, the circumferential edge of the disc D pushes in the tongue piece 72b of the stopper 72, which allows the mechanical shift of the rack main body 43 to the clamping operation. Then, the loading operation proceeds, thereby performing the clamping operation of the disc D without delay, and the front end of the rack main body 43 reaches a position which makes the loading completion detecting switch 81 turned on. In Step S110, the microcomputer returns to Step S109 and monitors the one-and-half timer until the loading completion detecting switch 81 is turned on in Step S110. If the rack main body 43 advances while the stopper 72 is not released due to when an operator pulled out the disc in the course of the loading operation, and the rack main body 43 becomes a state in FIG. 43 that collides with the stopper 72, one and half seconds may elapse. Thus, in Step S111, the loading motor 30 is rotated in a reverse direction, and error processing that ejects the disc D is carried out, which completes the whole process.

In Step S110, if it is determined that the loading completion detecting switch 81 has been turned on during one and half seconds, the loading motor 30 is controlled to be turned off in Step S112, and the loading operation is completed in Step S113.

[Ejection Control]

From now on, the function related to the operation of ejection control will be described.

A program that provides an ejection control processing function and an "ejection preparation required" determination function that determines whether the ejection preparation is required or not in a ROM (not shown) is stored in the microcomputer 70.

Further, various commands received from the host system through the ATAPI interface are input to the microcomputer 70 via the data processing unit 76.

In the disc apparatus 1 related to the present embodiment, in order to eject the disc D clamped by the clamping head 7, the clamping of the central hole Da of the disc D should be released from the state clamped by the clamping head 7.

Specifically, in order not to obstruct the up-and-down movement of the spindle motor 11 in releasing the clamping, the carrier block 13 should be moved to the outermost circumferential position of the disc prior to the clamping releasing operation.

When the ejecting operation of the disc D is performed, the microcomputer 70 first detects whether the carrier block 13 is located at the outermost circumferential position of the disc using the outermost circumferential position detecting switch 75.

If it is determined that the carrier block 13 is not located at the outermost circumferential position of the disc from the results of detection by the outermost circumferential position detecting switch 75, the microcomputer 70 controls the thread motor 16 to move the carrier block 13 to the outermost circumferential position of the disc.

If the microcomputer 70 continues to monitor the detection results of the outermost circumferential position detecting switch 75 while the thread motor 16 is controlled to move the carrier block 13 to the outermost circumferential position of the disc, and then determines that the carrier block 13 is located at the outermost circumferential position of the disc from the detection results of the outermost circumferential position detecting switch 75, the microcomputer 70 controls the motor driver 71 to drive the loading motor 30.

The disc apparatus 1 is made supposing that it is assembled into a well-known personal computer that is a host system.

The personal computer is powered on or off according to a user's intention. Accordingly, the disc apparatus 1 cannot grasp a chance that the power supply of the personal computer is intercepted.

As can be clear from the above description, if the carrier block 13 is not located at the outermost circumferential position of the disc when the disc apparatus 1 is intercepted from power supply, the carrier block 13 obstruct the up-and-down movement of the spindle motor 11, as a result of that the emergency ejection mechanism cannot be activated.

Thus, in the present invention, in case in which a possibility that the host system requires the disc apparatus 1 to immediately access becomes low, or in case in which the host system explicitly requires the disc apparatus 1 to be shifted to its standby state is clearly required from the host system, the processing that moves the carrier block 13 to the outermost circumferential position of the disc is carried out.

In other words, in a state in which the central hole Da of the disc D is clamped by the clamping head 7, the disc apparatus 1 is brought into a state in which the disc D is not ejected, but the carrier block 13 is located at the outermost circumferential position of the disc which can eject the disc D soon.

Hereinafter, the above state is referred to as an ejection preparation state.

Similarly, a state in which the central hole Da of the disc D is not clamped by the clamping head 7 is referred to as a "disc ejection state". Also, a state in which the central hole Da of the disc D is clamped by the clamping head 7, and the carrier block 13 is not located at the outermost circumferential position of the disc which cannot eject the disc D immediately is referred to as a disc reproduction state.

In other words, in order to eject the disc D from the disc reproduction state, the disc apparatus 1 according to the present invention is shifted via the ejection preparation state once to the disc ejection state.

Figure 55:
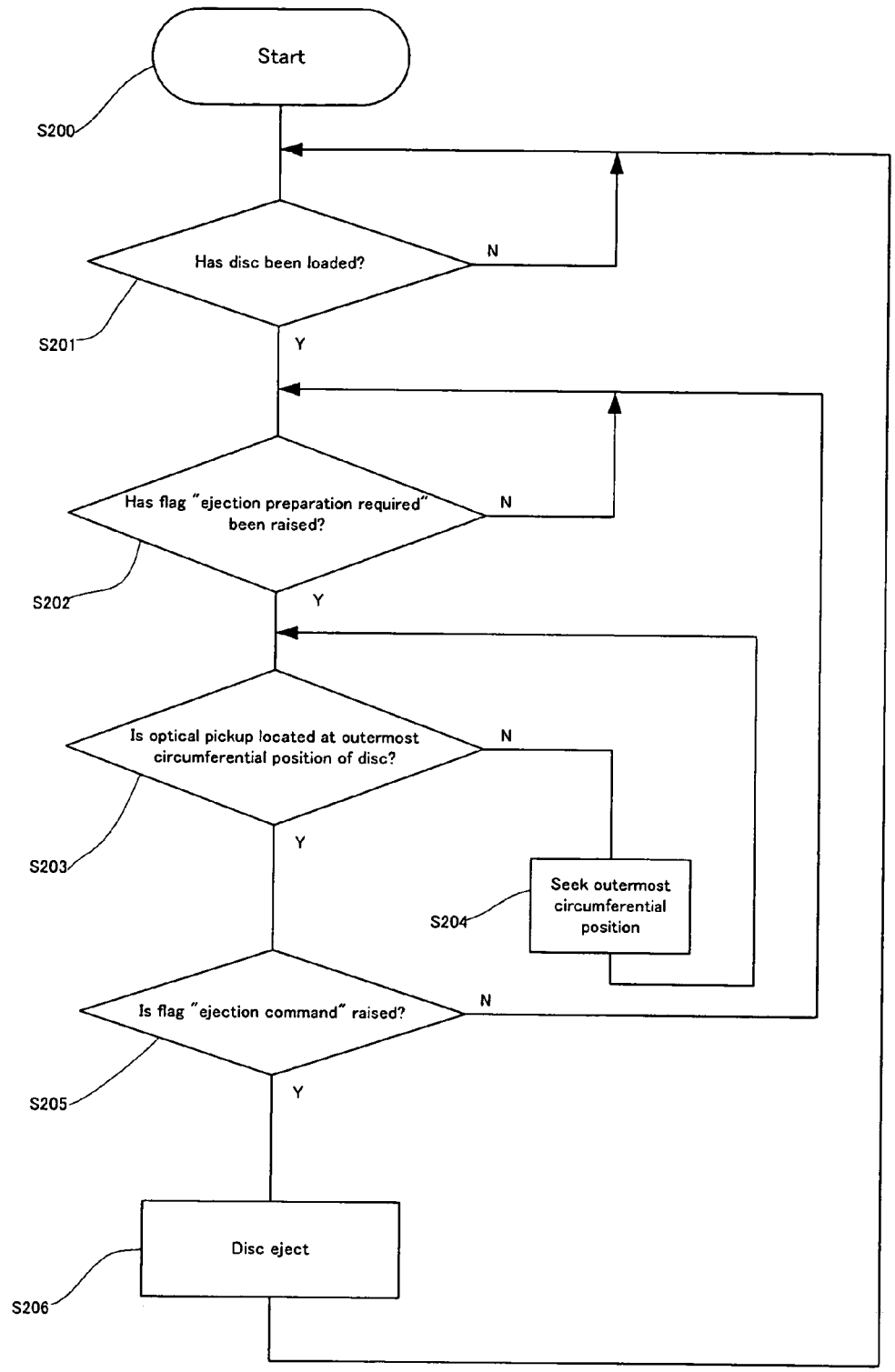
FIG. 55 is a flowchart for explaining the disc ejecting operation.
Figure 56:
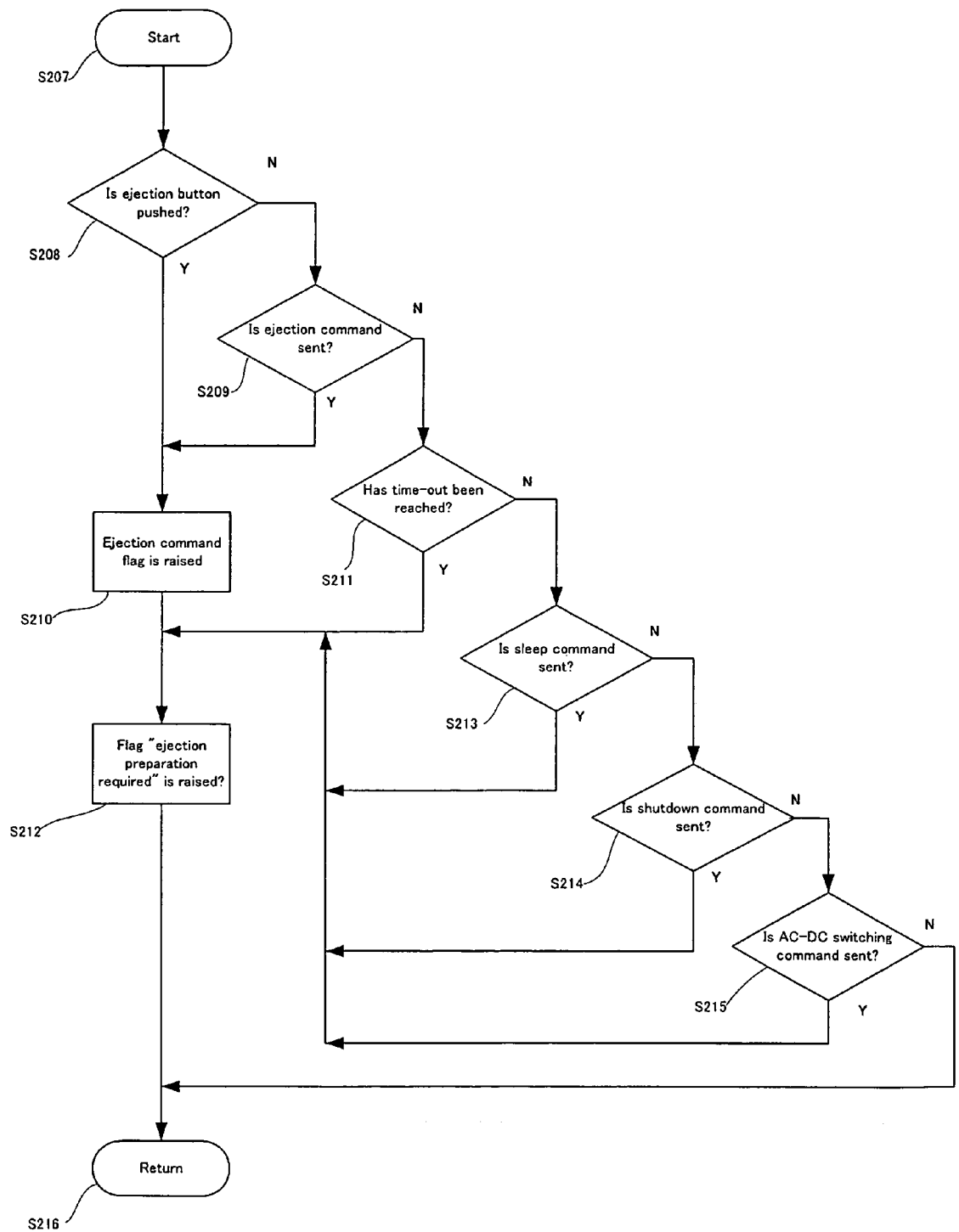
FIG. 56 is a flowchart for explaining setting of flags that determines the disc loading operation.

FIG. 55 is a flowchart describing a control operation of the microcomputer 70 related to the present invention, and FIG. 56 is a flowchart describing an operation that checks the state of the disc apparatus 1, and that operates in synchronization with the control operation in FIG. 56.

Hereinafter, the control operation in FIG. 55 will be described.

The control operation starts in Step 200. In Step 201, the disc D is first guided into the disc apparatus 1 by the loading mechanism, and it is then verified whether the central hole Da of the disc D is clamped by the clamping head 7. At the time of the completion of the loading operation, in response to the loading completion detecting switch 81 being pushed by the rack main body 43, the microcomputer 70 determines whether the disc D is loaded or not. If the disc D is not loaded, the microcomputer 70 continues to determine whether the disc D is loaded or not until the disc D is loaded.

If the disc D is loaded in Step S201, it is determined in Step S202 whether a flag "ejection preparation required" is raised or not. The processing that raises the flag "ejection preparation required" will be described later with reference to FIG. 56. If the flag "ejection preparation required" is not raised, the microcomputer 70 continues to determine whether the flag "ejection preparation required" is raised or not until the flag "ejection preparation required" is raised.

If the flag "ejection preparation required" is raised in Step S202, it is determined via the outermost circumferential position detecting switch 75 in Step S203 that the carrier block 13 whether or not the carrier block 13 is located at the outermost circumferential position of the disc. If it is determined that the carrier block 13 is not located at the outermost circumferential position of the disc, in order to make the carrier block 13 seek the outermost circumferential position of the disc in Step S204, the thread motor 16 is driven to rotationally drive the lead screw 79.

The rotational driving control of the lead screw 79 is continued until the outermost circumferential position detecting switch 75 detects that the carrier block 13 has reached the outermost circumferential position of the disc.

If the carrier block 13 is located at the outermost circumferential position of the disc in Step S203, it is determined in Step S205 whether a flag "ejection command" is raised or not. If the flag "ejection command" is raised, the ejecting operation is carried out in Step S206, whereas if not, the microcomputer 70 returns to Step S202, and continues to determine whether or not the flag "ejection command" is raised until the flag "ejection command" is raised.

In the flowchart in FIG. 55, if the determination results in Step S202 and Step S205 are false "No", the microcomputer 70 may perform processing returning to the head in Step S202 in addition to processing returning to the head in Step S201.

Meanwhile, the flag "ejection preparation required" and the flag "ejection command" are lowered when the ejecting operation of the disc D is completed.

Further, even in a state in which the disc D is loaded, and the flag "ejection preparation required" is raised, when a reproduction command is sent to the disc apparatus 1 from the host system, the carrier block 13 is moved toward the internal circumference of the disc, and the flag "ejection preparation required" is lowered.

Hereinafter, the determination operation of the "ejection preparation required" in FIG. 56 will be described.

When a determination routine is stared in Step S207, it is determined in Step S208 whether or not the ejection button is pushed or the ejection switch 4 is turned on. If the ejection switch 4 has been turned on, an ejection command flag is raised in Step S210.

If the ejection switch 4 is not turned on in Step S208, it is determined in Step S209 whether or not an ejection command is sent from the host system. If the ejection command has been sent, the ejection command flag is raised in Step S210.

If an ejection command is not sent from the host system in Step S209, it is determined in Step S211 that the time-out has been reached.

The microcomputer 70 operates a software timer (not shown) having a program, receives commands sent from the host system via the data processing unit 76, and clears the software timer to set the timer's value to zero whenever the commands are sent.

The software timer measures predetermined time, for example, eight minutes. If eight minutes has elapsed, it is shifted to a time-out state.

In Step S211, if it is determined that eight minutes has elapsed from the point of time when a command has been finally sent from the host system, it is determined in Step S213 whether or not a sleep command is sent from the host system, that is, whether or not the shift to a standby state is commanded.

If it is determined in Step S213 that a sleep command is not sent from the host system, it is determined in Step S214 whether or not a shutdown command is sent from the host system.

If it is determined in Step S213 that the sleep command is sent from the host system, the shift to Step S212, which will be described later, is carried out.

If shutdown is caused in the host system, since the power supply to the disc apparatus 1 is intercepted after a while from that time, shifting to the ejection preparation state is required.

If it is determined in Step S214 that a shutdown command is sent from the host system, it is determined in Step S215 whether a command indicating whether or not the power source of the host system is switched from an external power source to a built-in power source, that is, from an AC power source to a DC power source is sent.

If the host system is, for example, a notebook computer, and a power supply means is switched from an AC adapter to a DC battery, it is considered that there is a possibility that an emergency situation cased by, for example, interruption of power supply occurred.

Similarly, even when an interruptible power supper (UPS) for interruption of power supply is connected to a desktop PC or a server, it is necessary to receive a control signal issued from the UPS at the time of interruption of power supply, and perform the same measures.

Meanwhile, the commands in Step S214 and S215 are commands that do not exist in specification of Standard ATAPI, and that are commonly referred to as "commands unique to vendor".

In the disc apparatus 1 according to the present invention, a flash memory, a jumper switch and the like in the microcomputer 70, which are not shown, are manipulated according to delivery destinations after the completion of manufacture and immediately before shipping of products, so that the commands in Step S214 and S215 can be validated or invalidated.

If it is determined in Step S214 that a shutdown command has been sent from the host system, shifting to Step S212, which will be described later, is carried out.

If the determination results in Step S211, S213, S214 and S215 are true (Y), after the processing in Step S210, the flag "ejection preparation required" is raised in Step S212.

If the determination results are false (N) even after a subroutine that is started from Step S208 and passes through Step S213, Step 214 or Step 215 has been carried out, the subroutine is completed in Step S216 without raising the abovementioned flag "ejection command" and flag "ejection preparation required".

The subroutine that is started from Step 207 and is completed in Step S216 is repeatedly executed in short cycles.

As described above, the disc apparatus 1 related to the present invention operates as follows:
(a) When the intermediate position detecting switch 28b detects that the disc D has reached the intermediate position after the insertion of the disc D, the leading arm 50 pulls in the disc D to the clamping position with a strong force.
(b) When the disc D has reached the clamping position, the circumferential edge of the disc D pushes in the stopper 72, and the shift of the rack main body 43 to the clamping operation is mechanically allowed.
(c) When the loading completion detecting switch 81 detects that the loading operation of the disc D has been normally completed, the loading motor 30 stops.
(d) In the above operation, if the loading completion detecting switch 81 cannot detect the completion of the loading operation even when one and half seconds have elapsed after the intermediate position detecting switch 28b detected that the disc D had reached intermediate position, it is considered that the clamping operation fails due to a factor or the like that the shift of the rack main body 43 to the clamping operation is not allowed due to the action of the stopper 72. Then, the loading motor 30 is reversely rotated to perform the ejecting operation of the disc D.

Second Embodiment

Figure 57:
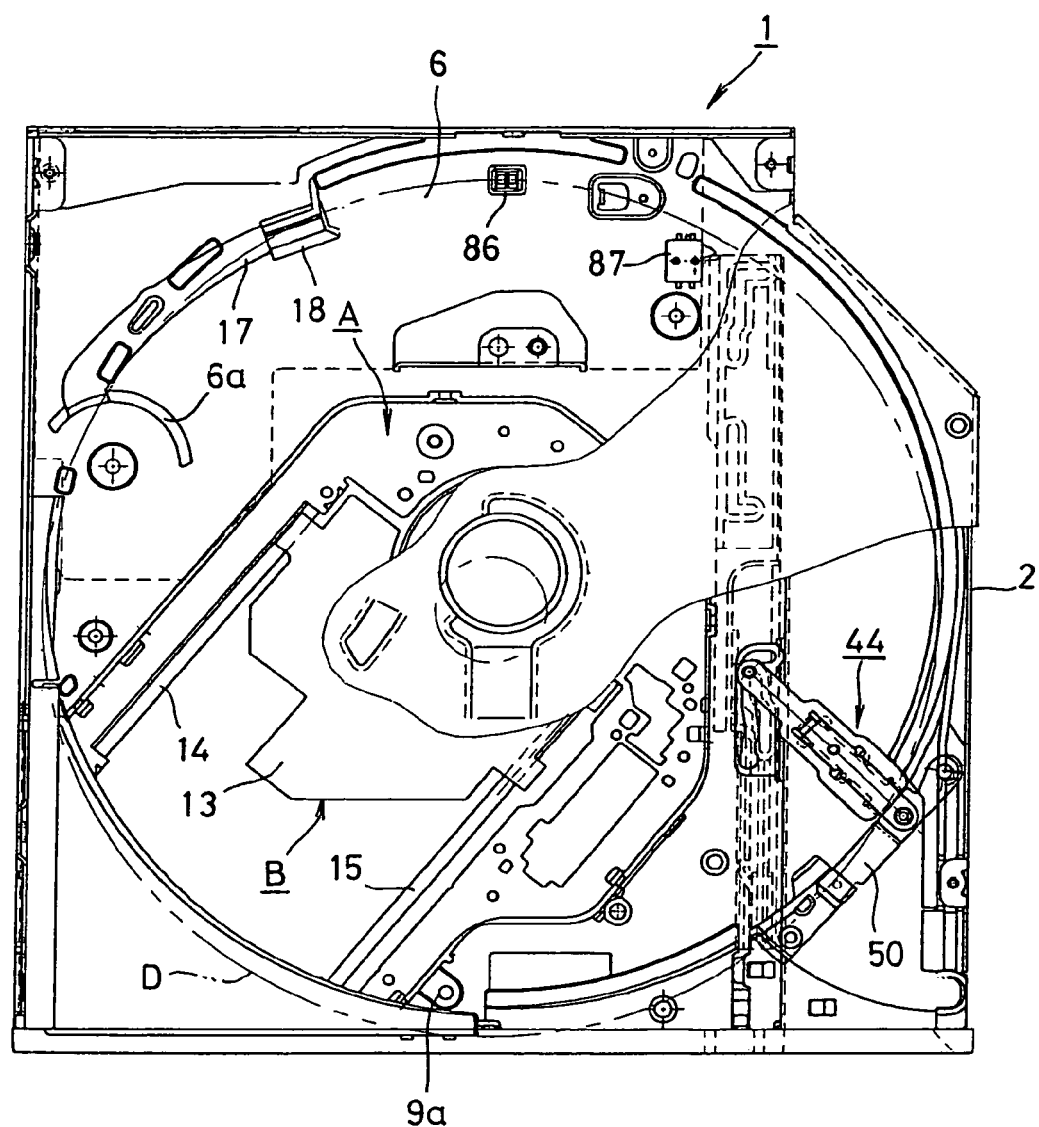
FIG. 57 is a plan view of a disc apparatus related to a second embodiment of the present invention.
Figure 58:
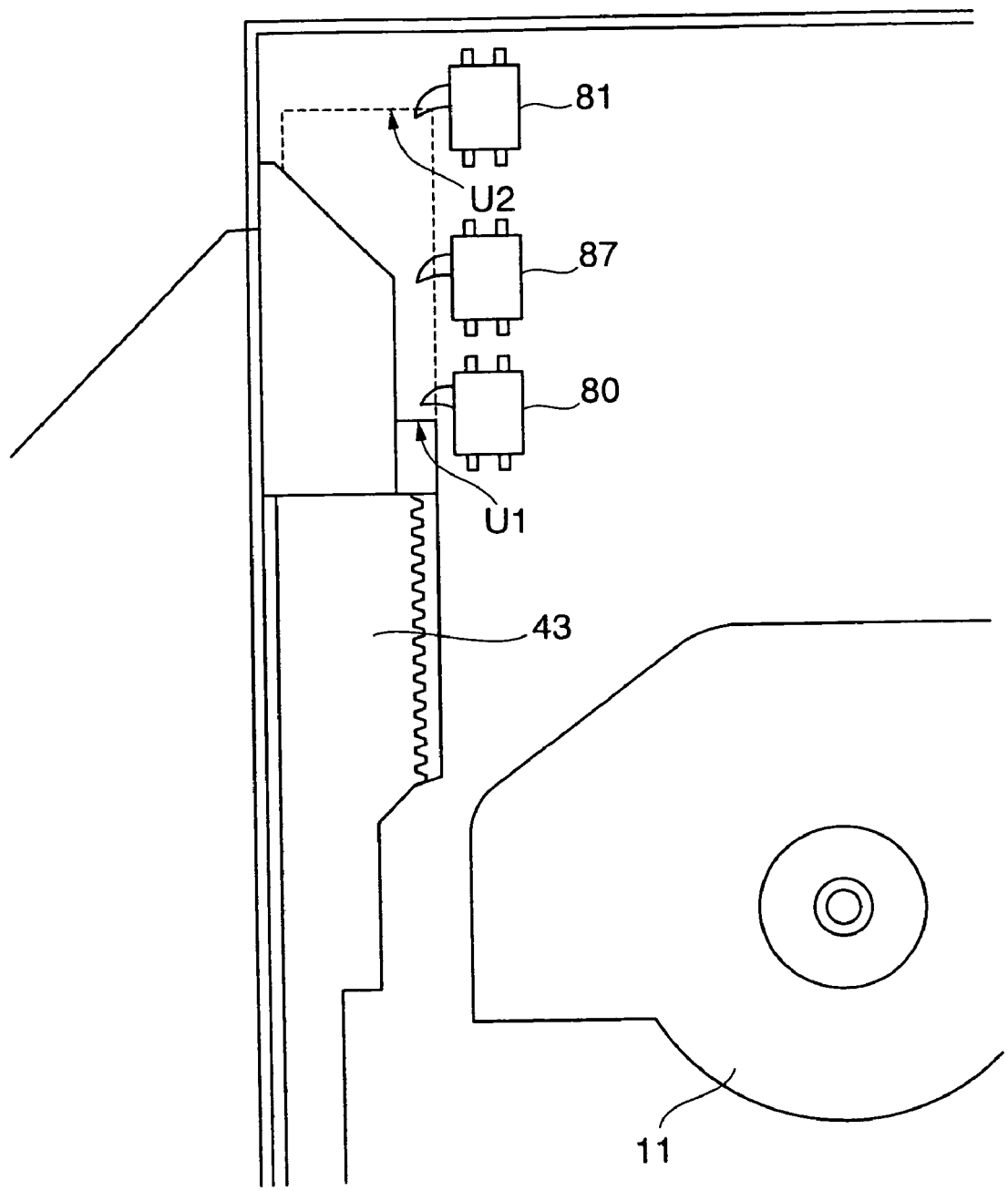
FIG. 58 is a partially enlarged view of FIG. 4 showing the positional relationship between an ejection completion detecting switch, a loading completion detecting switch and a clamping position detecting switch of the rack main body in the disc apparatus in FIG. 57.

FIG. 57 is a plan view of an internal structure of a disc apparatus 1' related to a second embodiment of the present invention, and FIG. 58 is a partially enlarged view of the disc apparatus 1' as seen from the rear side thereof.

FIG. 57 is almost the same as FIG. 2. However, instead of the stopper 72, the leaf spring 83, etc. of the disc apparatus 1, a photo-interrupter 86 is provided inside the disc apparatus 1'.

The photo-interrupter 86 is a known reflective optical sensor comprising a set of a photodiode and a phototransistor, and is provided at a position that is covered by an outer peripheral portion of the disc D at a position where the disc D can be clamped.

When the disc D gets closer to its clamping position, the light of the photodiode is reflected by a recording surface of the circumferential portion of the disc D, the reflected light is radiated onto the phototransistor to turn on the phototransistor, so that the existence of the disc D can be detected.

Meanwhile, an antireflection film (not shown) for preventing erroneous detection caused by a reflected light from the case 2 when the disc D is not inserted is adhered to a portion of the rear face of the disc apparatus 1' which faces the photo-interrupter 86.

The antireflection film is subjected to surface treatment in a color, which does not reflect most of light from the photodiode, such as black or green subjected to delustering.

FIG. 58 is almost the same as FIG. 44. However, as a switch for detecting the position of the rack main body 43, a clamping position detecting switch 87 serving as a pull-in completion detecting means is provided between the ejection completion detecting switch 80 and the loading completion detecting switch 81.

The clamping position detecting switch 87 is provided to be turned on when the leading arm 50 begins to reach a position which can clamp the disc D by means of the movement operation of the rack main body 43. In the process of the normal clamping operation, the clamping position detecting switch 87 is provided at a position where it is turned on after the turned-on operation of the photo-interrupter 86.

Specifically, when the clamping position detecting switch 87 has been turned on, if the photo-interrupter 86 is in its turned-on state, it can be determined that the disc D has reached a normally clamping position. On the contrary, if the photo-interrupter 86 is in its turned-off state, it can be determined that the disc D has not reached the normally clamping position.

The photo-interrupter 86 and the clamping position detecting switch 87 are also connected to the microcomputer 70, similarly to the first embodiment, the microcomputer 70 executes control over the loading operation and the ejecting operation.

Figure 59:
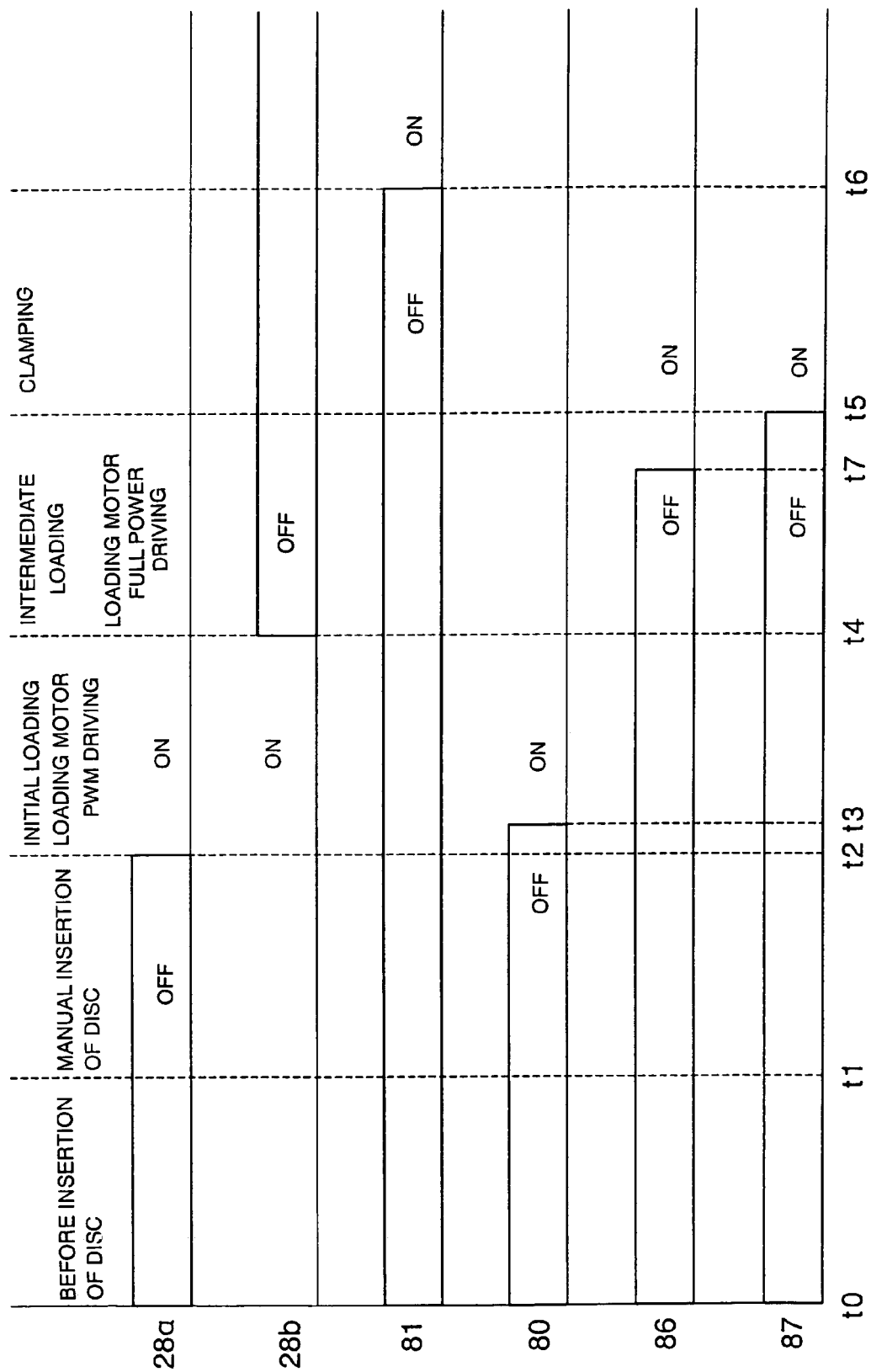
FIG. 59 is a time chart showing changes in logics of the respective detecting switches and sensors in the disc loading operation.
Figure 60:
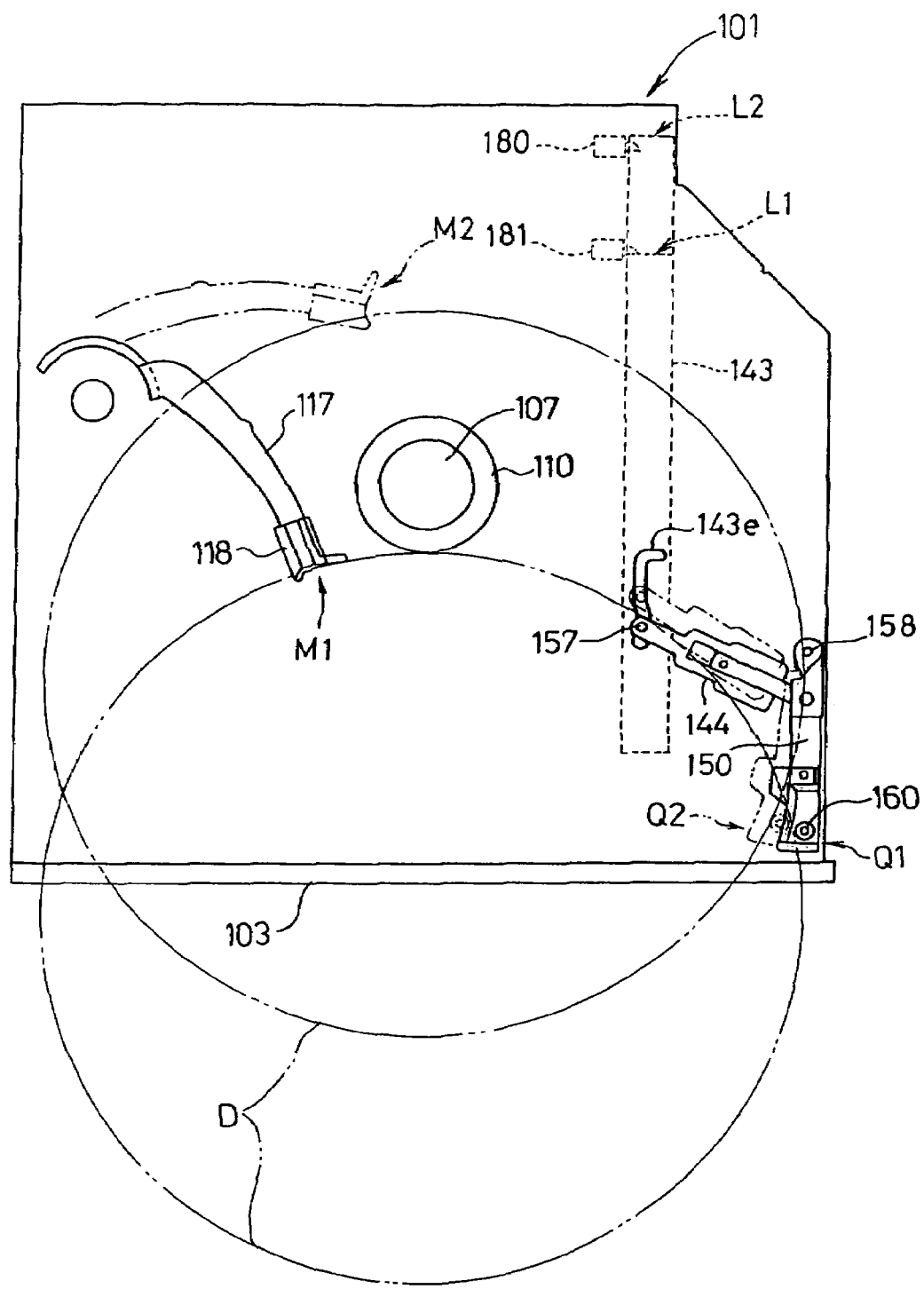
FIG. 60 is a plan view showing an internal structure of a conventional disc apparatus.

FIG. 59 shows logical states of the drive starting position detecting switch 28a and the intermediate position detecting switch 28b, which are built in the angular position detecting switch 28, the ejection completion detecting switch 80, the loading completion detecting switch 81, the photo-interrupter 86, and the clamping position detecting switch 87, when the disc D is inserted into the disc apparatus 1' to perform a loading operation.

FIG. 59 is almost the same as FIG. 53. However, logical states of the photo-interrupter 86 and the clamping position detecting switch 87 are added.

In FIG. 59, the operation in the second embodiment is the same as that in the first embodiment until the loading motor 30 begins to rotate with a strong electric power at the point of time t4, and the disc D id driven in its loaded direction.

When the disc D gets closer to a position where it can be clamped, at a point of time t7, the photo-interrupter 86 detects the disc D to be turned on.

After a while, at a point of time t5, the clamping position detecting switch 87 is turned on by the movement of the rack main body 43.

If the photo-interrupter 86 is in its turned-on state when the clamping position detecting switch 87 is turned on, the microcomputer 70 determines that the disc D has reached the normally clamping position, and continues the control over the rotation of the loading motor 30.

On the contrary, if the photo-interrupter 86 is in its turned-off state when the clamping position detecting switch 87 is turned on, the microcomputer 70 determines that the disc D has not reached the normally clamping position, and immediately performs control for reversing the direction that loading motor 30 rotates.

The present invention is not limited to the above embodiments, and various modifications can be exemplified as follows.

(1) The ejecting operation at the time of error detection in Step 106 and S111 is directed to returning of the lever arm 44 shown in FIGS. 37 and 38. If a disc is inserted again while this ejecting operation is not completed, this is not preferable because there is a possibility that a recording surface of the disc may be damaged, or fatal breakage of mechanical parts of the disc apparatus 1 may be followed. Thus, during the period of the ejecting operation when an error is detected, a construction in which the microcomputer 70 controls the indicator 5 provided in the bezel 3 to be turned on or off can be employed.

(2) The position of the stopper 72 is also not limited to that in the above embodiments, and can be changed to a position that can detect the circumference of the disc D inside the disc apparatus 1 from the center of the disc D when the disc D is located at its clamping position. Briefly, only for the time when the disc D is located at its clamping position, a construction which allows the rack main body 43 to be shifted to the clamping operation may be employed.

(3) Similarly, the photo-interrupter 86 can be appropriately modified, not limited to the above embodiments, as long as it can be located at a position that can detect the existence of the disc D inside the disc apparatus 1 from the center of the disc D when the disc D has reached its clamping position.

What is claimed is:

1. A disc apparatus comprising:
   a loading mechanism for performing a pulling operation for pulling a disc to a clamping position where a clamping operation for the disc is performed, by moving a rack main body inside the disc apparatus by a loading motor, and for performing a clamping operation for clamping the disc by further moving the rack main body after the pulling operation; and
   a rotatable stopper,
   the rotatable stopper comprising:
      an actuating means driven by an outer circumferential portion of the disc at a time of the disk being pulled by the loading mechanism to the clamping position; and
      a prohibiting means for prohibiting the clamping operation at a time of the actuating means not being driven by the outer circumferential portion of the disc, and for permitting the clamping operation at a time of the actuating means being driven by the outer circumferential portion of the disc.

2. The disc apparatus according to claim 1,
   wherein the actuating means is a disc abutment member, and
   the prohibiting means releases the loading mechanism from prohibiting the clamping operation in response to the disc abutment member being driven while abutting on the outer circumferential portion of the disc.

3. The disc apparatus according to claim 2,
   wherein, at the time of the clamping operation, the disc abutment member guides the disc to prevent a shift in the position of the disc.

4. The disc apparatus according to claim 1, further comprising:
   a control means for controlling the loading mechanism to eject the disc when the disc being not carried to the clamping position after a lapse of predetermined time from the beginning of the pulling operation by the loading mechanism;
   a clamping completion detecting means provided in the loading mechanism for detecting a completion of the clamping operation by the loading mechanism,
   wherein the control means controls the loading mechanism to eject the disc when the completion of the clamping operation is not detected by the clamping completion detecting means after a lapse of predetermined time from the beginning of the pulling operation by the loading mechanism.

5. A disc apparatus comprising:
   a loading mechanism for performing a pulling operation for pulling a disc to a clamping position where a clamping operation for placing the disc on a turntable is performed after the pulling operation;
   an actuating means driven by an outer circumferential portion of the disc pulled to the clamping position; and
   a prohibiting means for prohibiting the clamping operation when the disc is not located at the clamping position, and for permitting the clamping operation in response to the activating means being driven when the disc is located at the clamping position; and
   a control means for controlling the loading mechanism to eject the disc when the disc being not carried to the clamping position after a lapse of predetermined time from the beginning of the pulling operation by the loading mechanism.

6. The disc apparatus according to claim 5,
   wherein the actuating means is a disc outer circumferential portion detector,
   wherein the prohibiting means has the disc outer circumferential portion detector, and a pulling completion detecting means provided in the loading mechanism for detecting a completion of the pulling operation by the loading mechanism, and
   wherein the clamping operation of the loading mechanism is permitted when the pulling completion detecting means detects a completion of the pulling operation by the loading mechanism, and the disc outer circumferential portion detector detects the outer circumferential portion of the disc pulled to the clamping position.

7. The disc apparatus according to claim 6,
   wherein the disc outer circumferential portion detector is a reflective photo-interrupter, and an antireflection film for preventing erroneous detection when the disc is not located at the clamping position is provided at a position of a rear face of a case for the disc apparatus that faces the reflective photo-interrupter.

8. The disc apparatus according to claim 7, further comprising a control means for controlling the loading mechanism to eject the disc when the disc outer circumferential portion detector is not able to detect the outer circumferential portion of the disc pulled to the clamping position when the pulling completion detecting means detects that the completion of the pulling operation by the loading mechanism.

9. The disc apparatus according to claim 6, further comprising a control means for controlling the loading mechanism to eject the disc when the disc outer circumferential portion detector is not able to detect the outer circumferential portion of the disc pulled to the clamping position when the pulling completion detecting means detects that the completion of the pulling operation by the loading mechanism.

10. The disc apparatus according to claim 6, further comprising:
   a control means for controlling the loading mechanism to eject the disc when the disc being not carried to the clamping position after a lapse of predetermined time from the beginning of the pulling operation by the loading mechanism;
a clamping completion detecting means provided in the loading mechanism for detecting a completion of the clamping operation by the loading mechanism,
wherein the control means controls the loading mechanism to eject the disc when the completion of the clamping operation is not detected by the clamping completion detecting means after a lapse of predetermined time from the beginning of the pulling operation by the loading mechanism.

11. The disc apparatus according to claim 5, further comprising a clamping completion detecting means provided in the loading mechanism for detecting a completion of the clamping operation by the loading mechanism,
wherein the control means controls the loading mechanism to eject the disc when the completion of the clamping operation is not detected by the clamping completion detecting means after a lapse of predetermined time from the beginning of the pulling operation by the loading mechanism.

* * * * *

UNITED STATES PATENT AND TRADEMARK OFFICE
CERTIFICATE OF CORRECTION

PATENT NO. : 7,533,392 B2  Page 1 of 2
APPLICATION NO. : 11/019682
DATED : May 12, 2009
INVENTOR(S) : Shinichi Fujisawa et al.

It is certified that error appears in the above-identified patent and that said Letters Patent is hereby corrected as shown below:

Column 2, line 49, "that." should read --that--; and

Column 7, line 12, "serves" should read --serve--;

Column 8, line 38, "pint" should read --point--;

Column 8, line 40, "+ead" should read --head--;

Column 9, line 15, "doubles" should read --double--;

Column 9, line 48, "according the" should read --according to the--;

Column 11, line 11, "pins" should read --pin--;

Column 12, line 51, "starting." should read --starting--.

Column 12, line 51, "pint" should read --point--;

Column 12, line 67, "pint" should read --point--;

Column 13, line 38, "contacts" should read --contact--;

Column 13, line 65, "enable" should read --enables--;

Column 14, line 6, "word," should read --words,--;

Column 14, line 19, "rocks" should read --rock--;

Column 14, line 29, "has" should read --have--;

Column 14, line 36, "has" should read --have--;

Column 17, line 20, delete the word "being";

Column 17, line 27, "contacts" should read --contact--;

Column 17, line 36, delete the word "being";

Column 17, line 53, "serves" should read --serve--;

Column 18, line 27, "enlarged of" should read --enlarged view of--;

Signed and Sealed this

Eighth Day of June, 2010

David J. Kappos
*Director of the United States Patent and Trademark Office*

Column 20, line 53, "built in built in" should read --built in--;

Column 22, line 37, "indicates s" should read --indicates--;

Column 23, line 9, "+ere," should read --Here,--;

Column 23, line 11, delete the word "an";

Column 23, line 12, "pushes" should read --push--;

Column 24, line 60, "obstruct" should read --obstructs--;

Column 26, line 61, "cased" should read --caused--;

Column 27, line 20, "Step 214 or Step 215" should read --Step S214 or Step S215--;

Column 27, line 24, "207" should read --S207--;

Column 28, line 9, "of light" should read --of the light--; and

Column 28, line 50, "id" should read --is--.